US008781927B2

(12) United States Patent
Killian et al.

(10) Patent No.: US 8,781,927 B2
(45) Date of Patent: Jul. 15, 2014

(54) PASSIVE RFID POSTAGE STAMPS AND METHOD OF USING THE SAME

(75) Inventors: Thomas Killian, Westfield, NJ (US); Cynthia Price Killian, Westfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 359 days.

(21) Appl. No.: 12/653,028

(22) Filed: Dec. 7, 2009

(65) Prior Publication Data

US 2011/0137775 A1 Jun. 9, 2011

(51) Int. Cl.
*G07F 19/00* (2006.01)

(52) U.S. Cl.
USPC ............ 705/34; 705/336; 705/337; 705/338; 705/339; 340/12.51; 340/13.26

(58) Field of Classification Search
None
See application file for complete search history.

(56) References Cited

U.S. PATENT DOCUMENTS 7,457,760 B1 * 11/2008 Harris et al. .................... 705/60
7,559,471 B2 * 7/2009 Lu et al. .................. 235/462.01
2003/0225711 A1 12/2003 Paping
2005/0116047 A1 * 6/2005 Lu et al. ........................ 235/487
2006/0180647 A1 * 8/2006 Hansen ......................... 235/375
2010/0283584 A1 * 11/2010 McAllister .................. 340/10.1

* cited by examiner

*Primary Examiner* — Fateh Obaid

(57) ABSTRACT

A system and method for postage payment utilizes passive RFID tags as postage "stamps", with the amount of the postage automatically billed to a previously-established customer account. The tags are stored in a separate stamp database and are "enabled" by linking the individual tag to a customer account. The use of the RFID stamps eliminates the need for the customer to know the proper postage beforehand. The existence of a customer account with a proper return address reduces the likelihood of a dead letter. Also, a special category of stamps may be used for automatic reply mail. By virtue of using an RFID tag, the mailed item's progress through the postal delivery system may be tracked from dispatch to delivery.

20 Claims, 54 Drawing Sheets

FIG. 2(a) Continued

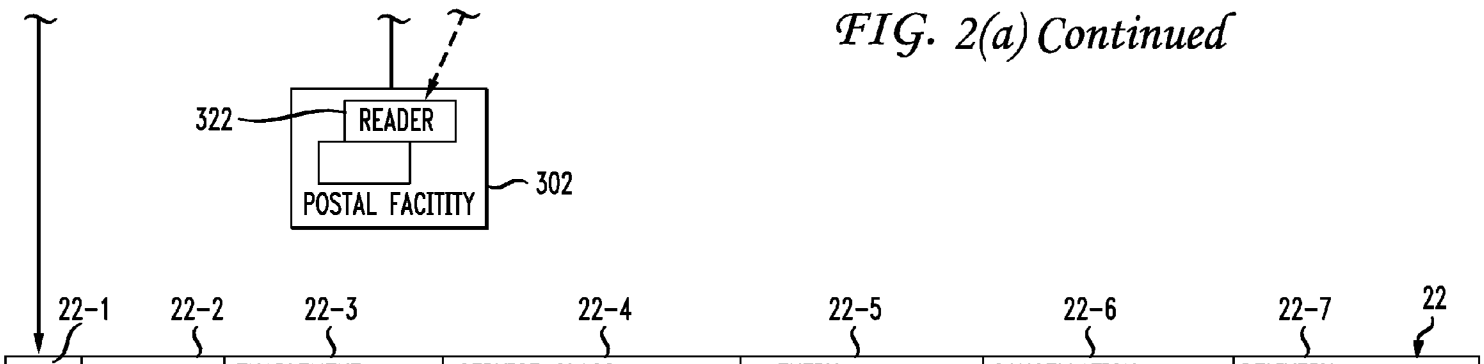

| TAG ID | ZIP+4 | ENABLEMENT: TIME & LOC. (DEFAULT NULL) | SERVICE CLASS TIME & LOC. (+ OPT. SVCS.) | ENTRY: TIME & LOC. | CANCELLATION: TIME & LOC., WGT. & CHARGE | DELIVERY: TIME & LOC. |
|---|---|---|---|---|---|---|
| 100-1 | 77777-7777 | | 1st CLASS DEFAULT PREPAID 111313 16:18:20-5 00000-1357BY | 040414 11:12:13-5 TRUCK #0123456@GPS 40.123456-74.567890 | 040514 14:15:16-5 PO @55555-4321-005 0.8 oz, DEFAULT 0.44 | 040714 10:11:12-6 Tr #7654321@GPS 30.567890-98.123456 |
| 100-2 | 33333-3333 | 041314 01:02:03-5 ONLINE @ IP 10.9.8.7 | EXPRESS 041414 10:20:30-5 ONLINE @ IP 10.9.8.7 | 0415114 09:10:11-5 POSTAL KIOSK @ 11111-1111-001 | 041514 10:40:01-5 PO @11111-1111-100 3 lb 0 oz, bill 17.30 | 041514 15:16:17-5 Ex Tr #1234567@GPS 40.484543-73.023990 |
| 100-3 | CUST. ENTERED 44444-4444 | 041314 01:02:03-5 ONLINE @ IP 10.9.8.7 | PRIORITY, INS. HOME PICKUP, ZIP+4 042114 09:08:07-5 ONLINE @ IP 172.16.15.14 | 042214 13:12:11-5 TRUCK #0126543@GPS 40.123456-74.456789 | | |
| 100-4 | | 042814 09:18:27-5 ONLINE @ IP 172.16.15.16 | | | | |

| TAG ID | TIME & LOC | EVENT TYPE | EVENT DETAIL |
|---|---|---|---|
| 100-1 | 101013 12:13:14-6 STMPWRX | MANUFACTURED | STD. RFID STAMP LOT NO. 314159 |
| | 102013 14:13:12-6 STMPWRX | SHIP TO POSTAL ENTITY DISTRIBUTION CENTER | TRUCK ID xyzzy TO DIST. CENTER 07000 |
| | 102113 9:10:11-5 DIST. CTR. 07000 | POSTAL ENTITY RFID INVENTORY REGISTRATION | REGISTERED @ AUTH. STATION NO. 271828 |
| | 111213 10:11:12-5 DIST. CTR. 07000 | SHIP TO AUTH. RETAILER | TRUCK ID pqrst TO AUTH. RETAILER 1357BY |
| | 111313 16:18:20-5 00000-1357BY | RCV'D BY AUTH. RETAILER | TRUCK ID pqrst DELIVERY MADE |
| | 111313 16:43:44-5 00000-1357BY | POSTAL ENTITY ACTIVATES RFID TAG PER RETAILER | LOADS INTO KIOSK 1357BY |
| | 033114 09:10:11-5 00000-1357BY | PURCHASE ANON. CASH | 1st cl. DEFAULT $0.44 |
| | 040414 11:12:13-5 @ GPS 40.123456-74.567890 | ENTRY @ LEGACY MAIL COLLECTION BOX | TRUCK #0123456 |
| | 040514 14:15:16-5 PO@ 55555-4321-005 | CANCELLATION ZIP CODE ENTERED | 1st cl. DEFAULT $0.44 0.8 oz, 77777-7777 |
| | 040714 10:11:12-6 @ GPS 30.567890-98.123456 | DELIVERY | TRUCK #7654321 |
| 100-2 | 101013 12:13:14-6 STMPWRX | MANUFACTURED | STD. RFID STAMP LOT NO. 314159 |
| | ⋮ | (same as for 100-1) | ⋮ |
| | 033114 09:10:11-5 00000-1357BY | PURCHASE ANON. CASH | 1st cl. DEFAULT $0.44 |
| | 041314 01:02:03-5 Online @IP 10.9.8.7 | Enabled | Acct. no. 76543 Credit $0.44 |
| | 041414 10:20:30-5 Online @IP 10.9.8.7 | Service selection | Express mail |
| | 041514 09:10:11-5 Postal kiosk @ 11111-1111-001 | Enrty @ postal kiosk | 11111-1111-001 |
| | 041514 10:40:01-5 Postal office @ 11111-1111-001 | Cancellation Zip code entered | Express bill $17.30 3lb 0 oz 33333-3333 |
| | 041514 15:16:17-5 @ GPS 40.484543 -73.023990 | Express Delivery | Ex. Truck #1234567 |

| | | | |
|---|---|---|---|
| 100-3 | 101013 12:13:14-6 STMPWRX | MANUFACTURED | STD. RFID STAMP LOT NO. 314159 |
| | ⋮ | (same as for 100-2) | ⋮ |
| | 041314 01:02:03-5 Online @IP 10.9.8.7 | Enabled | Acct. no. 76543 Credit $0.44 |
| | 042114 09:08:07-5 Online @IP 172.16.15.14 | Service selection Cust. entered zip | Priorty insured Home pickup 44444-4444 Zip discount -$0.05 |
| | 042214 13:12:11-5 @ GPS 40.123456-74.456789 | Pickup and entry | Truck #0126543 |
| 100-4 | 101013 12:13:14-6 STMPWRX | MANUFACTURED | STD. RFID STAMP LOT NO. 314159 |
| | ⋮ | (same as for 100-2) | ⋮ |
| | 041314 01:02:03-5 Online @IP 10.9.8.7 | Enabled | Acct. no. 76543 Credit $0.44 |
| | 042114 09:08:07-5 Online @IP 172.16.15.14 | Disabled | Acct. no. 76543 Debit $0.44 |
| | 042814 09:08:27-5 Online @IP 172.16.15.14 | Enabled | Acct. no. 91011 Credit $0.44 |

FIG. 5(a)-1 (Continued part1)
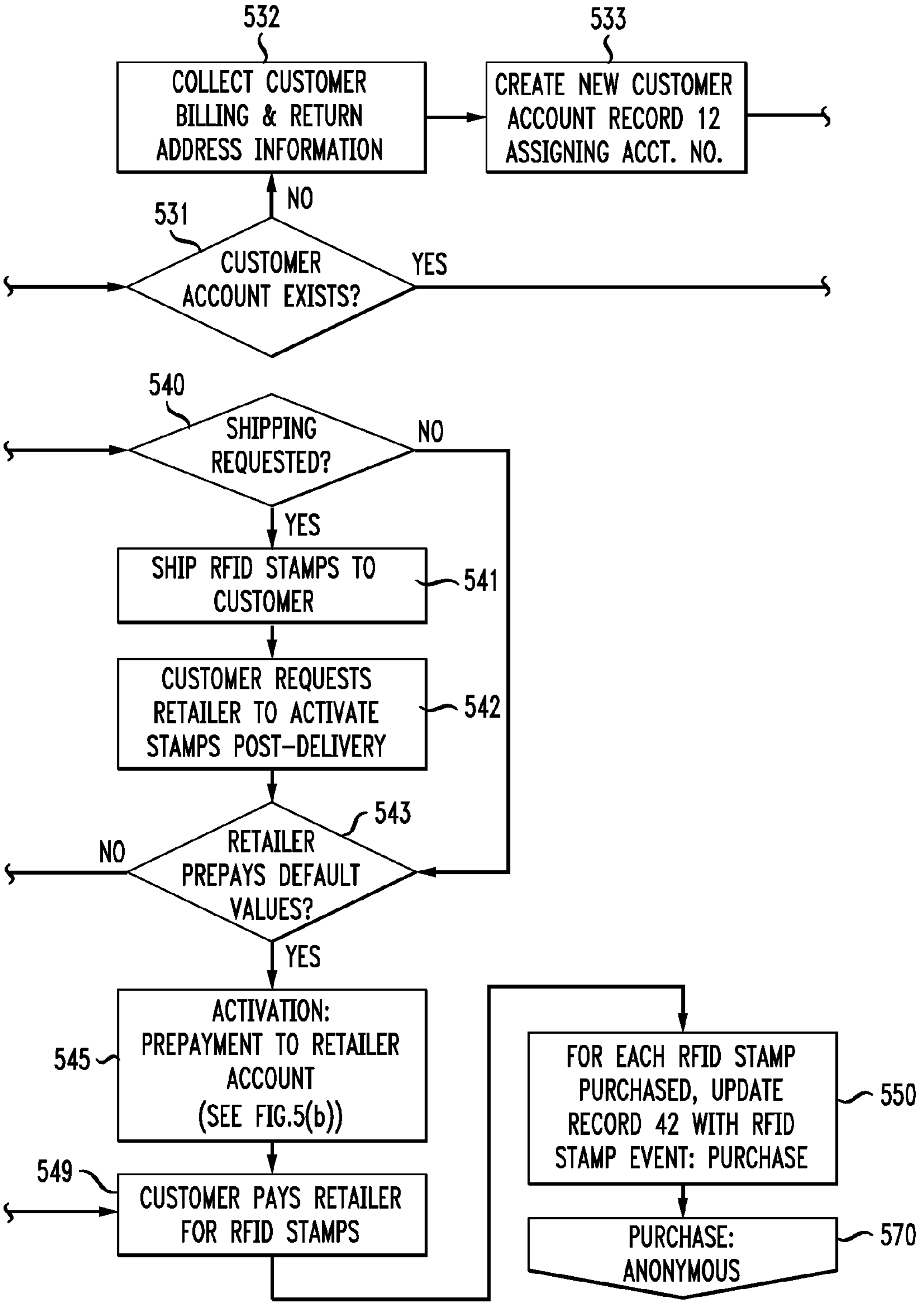

FIG. 5(a)-1 (Continued part2)
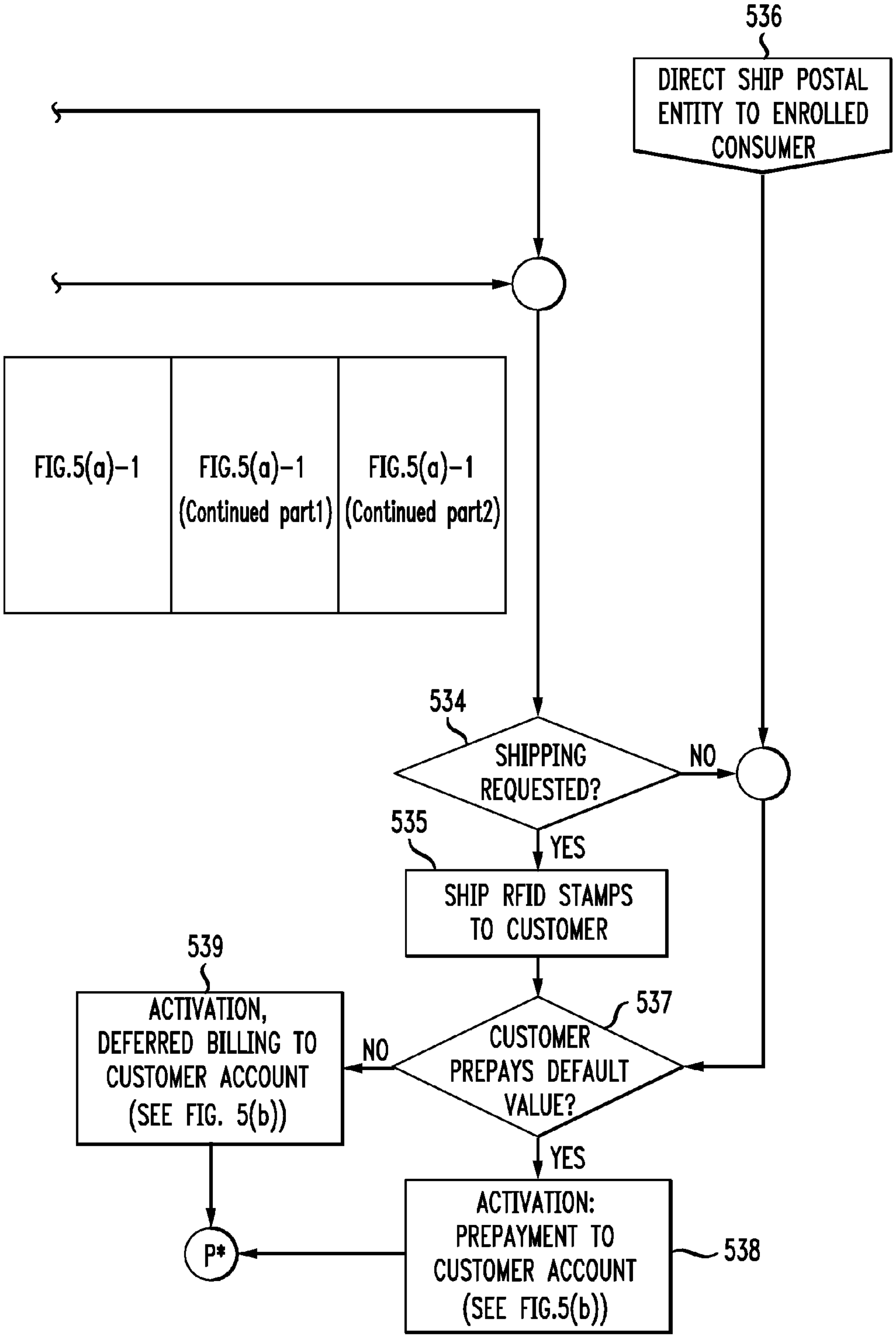

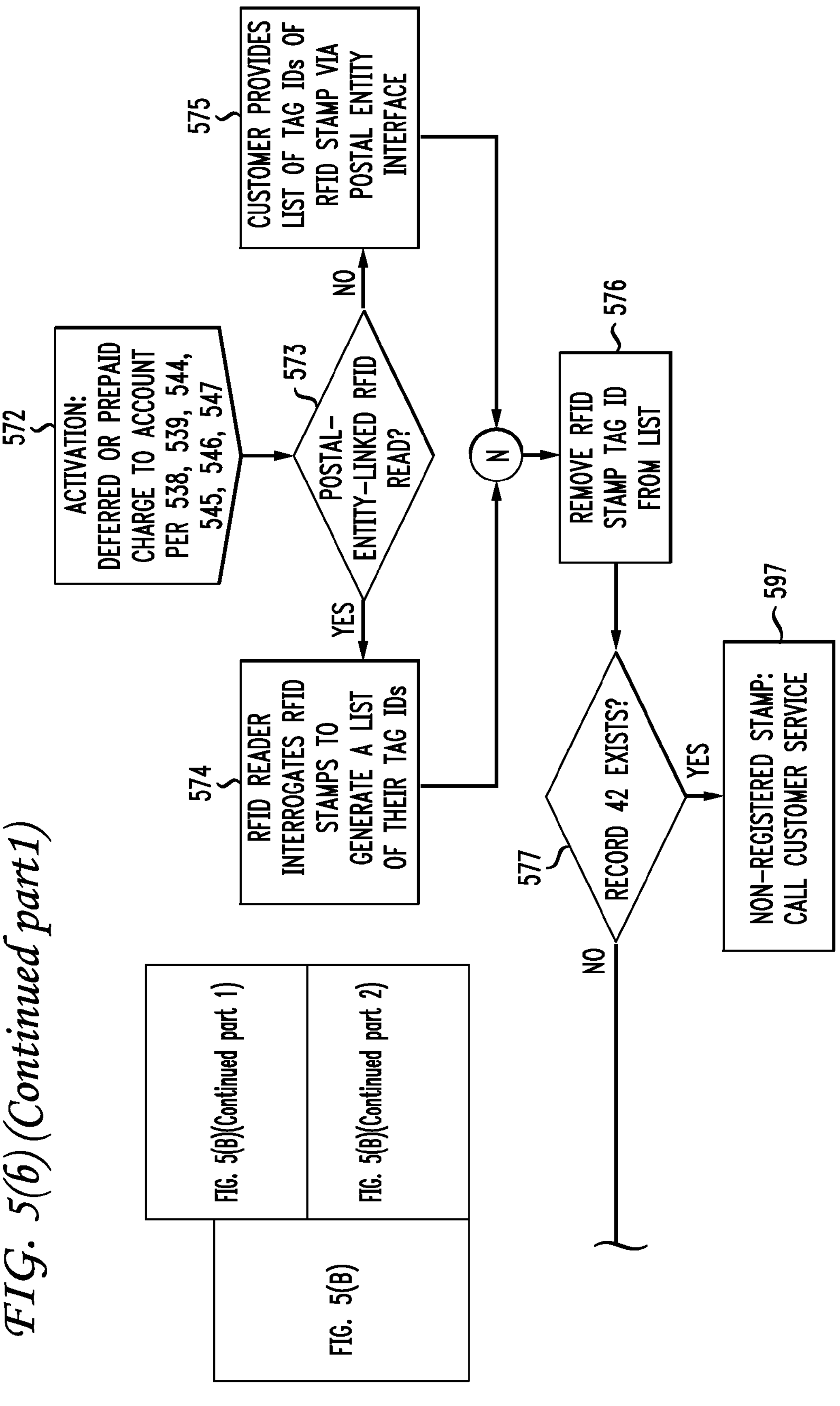
*FIG. 5(b) (Continued part1)*

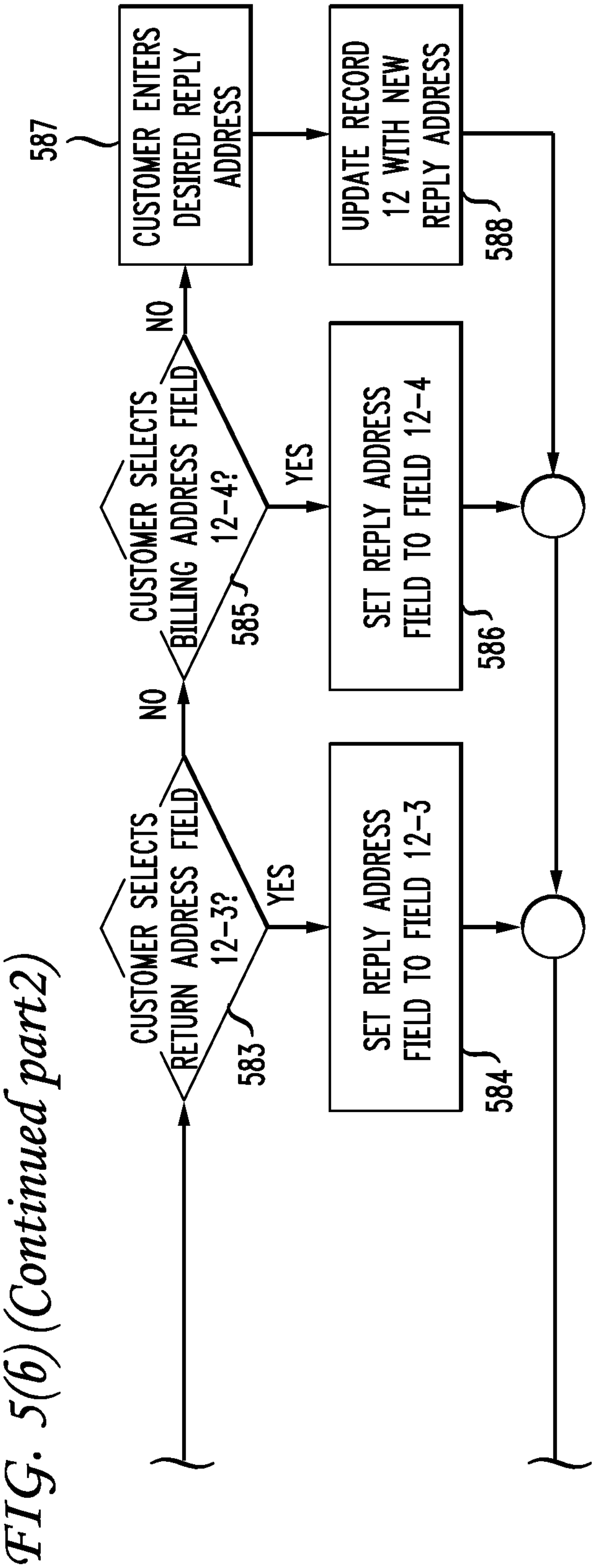
*FIG. 5(b) (Continued part2)*

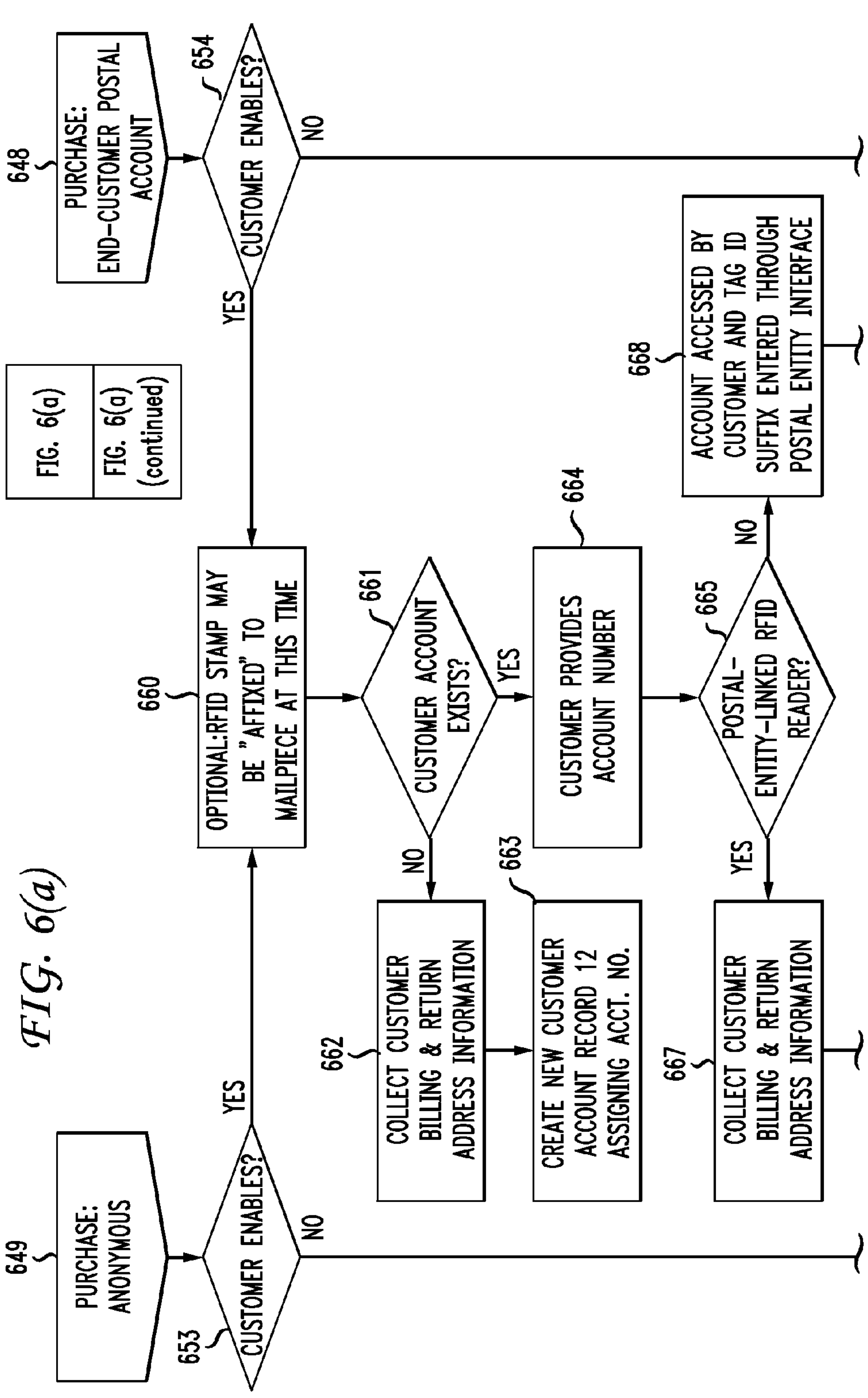
FIG. 6(a)
FIG. 6(a)
FIG. 6(a) (continued)
648
PURCHASE: END-CUSTOMER POSTAL ACCOUNT
654
CUSTOMER ENABLES?
YES
NO
649
PURCHASE: ANONYMOUS
653
CUSTOMER ENABLES?
YES
NO
660
OPTIONAL:RFID STAMP MAY BE "AFFIXED" TO MAILPIECE AT THIS TIME
661
CUSTOMER ACCOUNT EXISTS?
YES
NO
662
COLLECT CUSTOMER BILLING & RETURN ADDRESS INFORMATION
663
CREATE NEW CUSTOMER ACCOUNT RECORD 12 ASSIGNING ACCT. NO.
664
CUSTOMER PROVIDES ACCOUNT NUMBER
665
POSTAL-ENTITY-LINKED RFID READER?
YES
NO
667
COLLECT CUSTOMER BILLING & RETURN ADDRESS INFORMATION
668
ACCOUNT ACCESSED BY CUSTOMER AND TAG ID SUFFIX ENTERED THROUGH POSTAL ENTITY INTERFACE

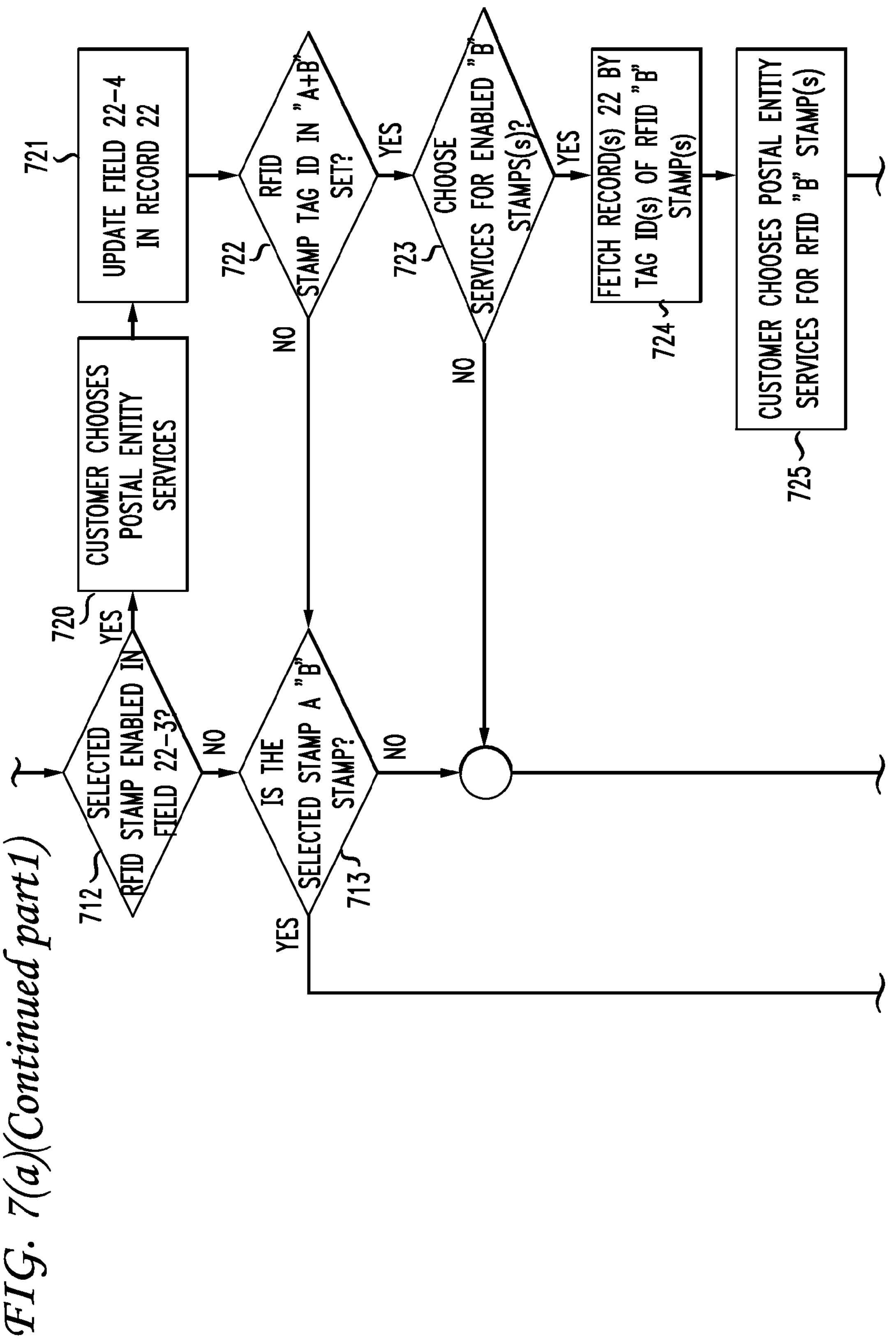
*FIG. 7(a)(Continued part1)*

FIG. 7(a)(Continued part2)
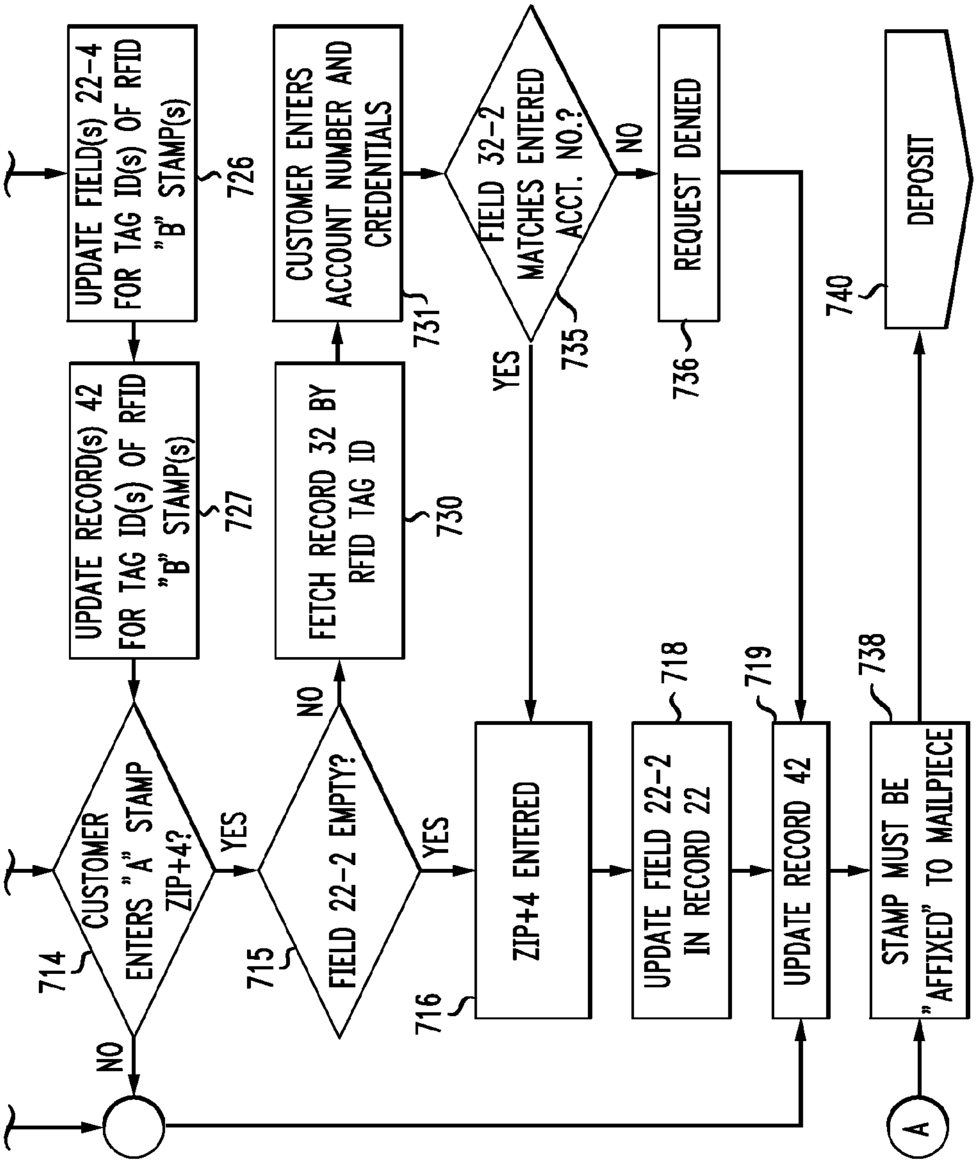

*FIG. 7(b)(Continued part1)*
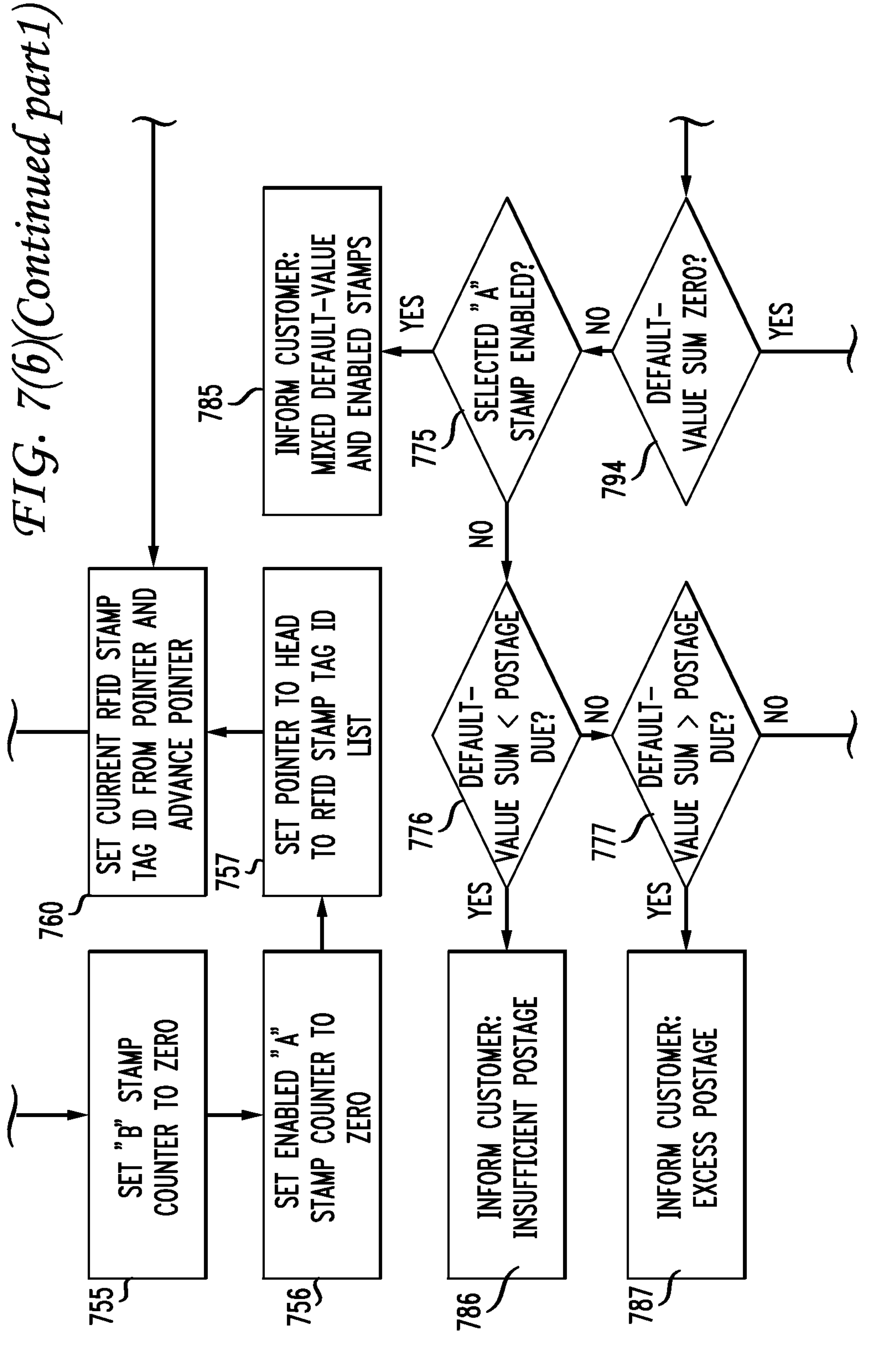

FIG. 7(b)(Continued part2)
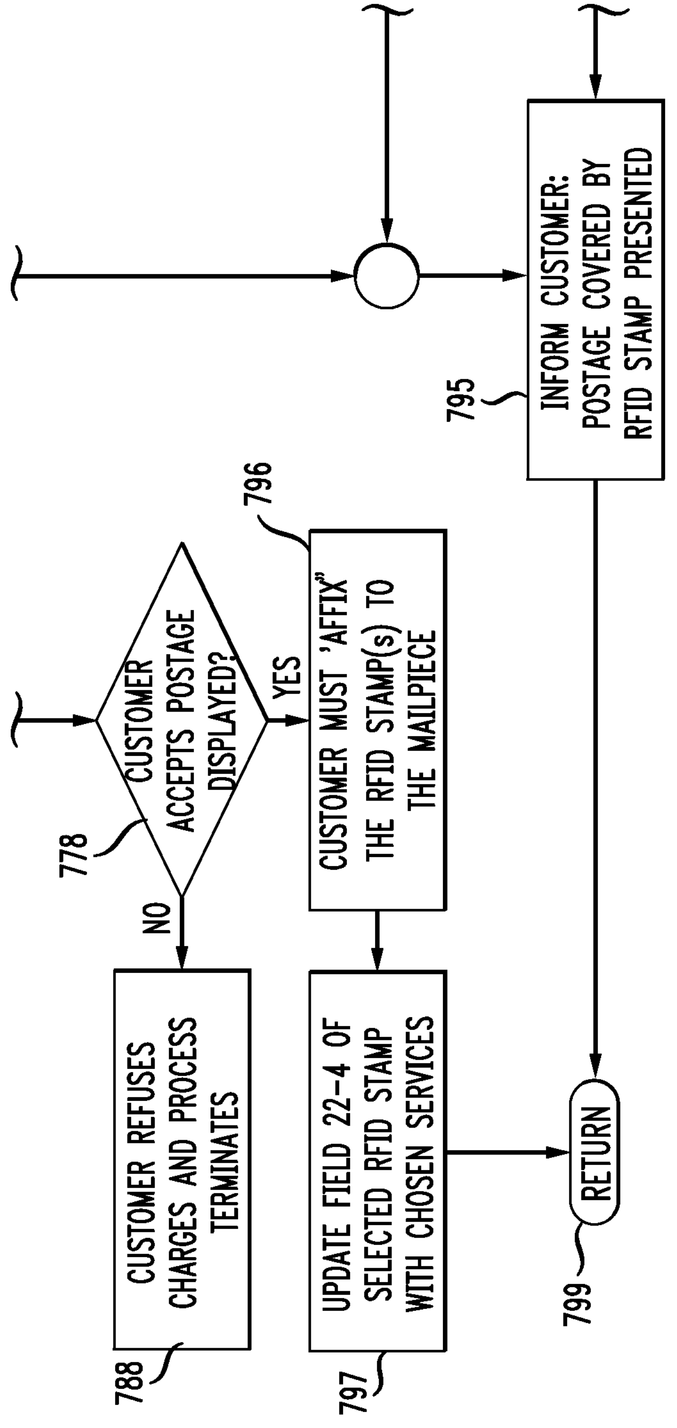

FIG. 7(b)(Continued part3)
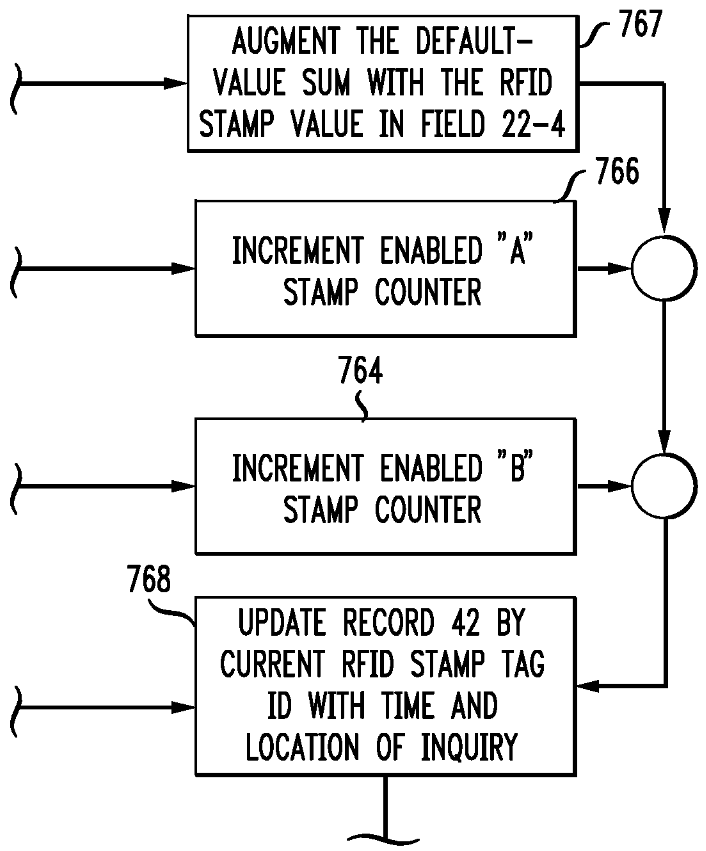
| | |
|---|---|
| FIG. 7(b) | FIG. 7(b) (continued part3) |
| FIG. 7(b) (continued part1) | FIG. 7(a) (continued part4) |
| FIG. 7(b) (continued part2) | FIG. 7(a) (continued part5) |

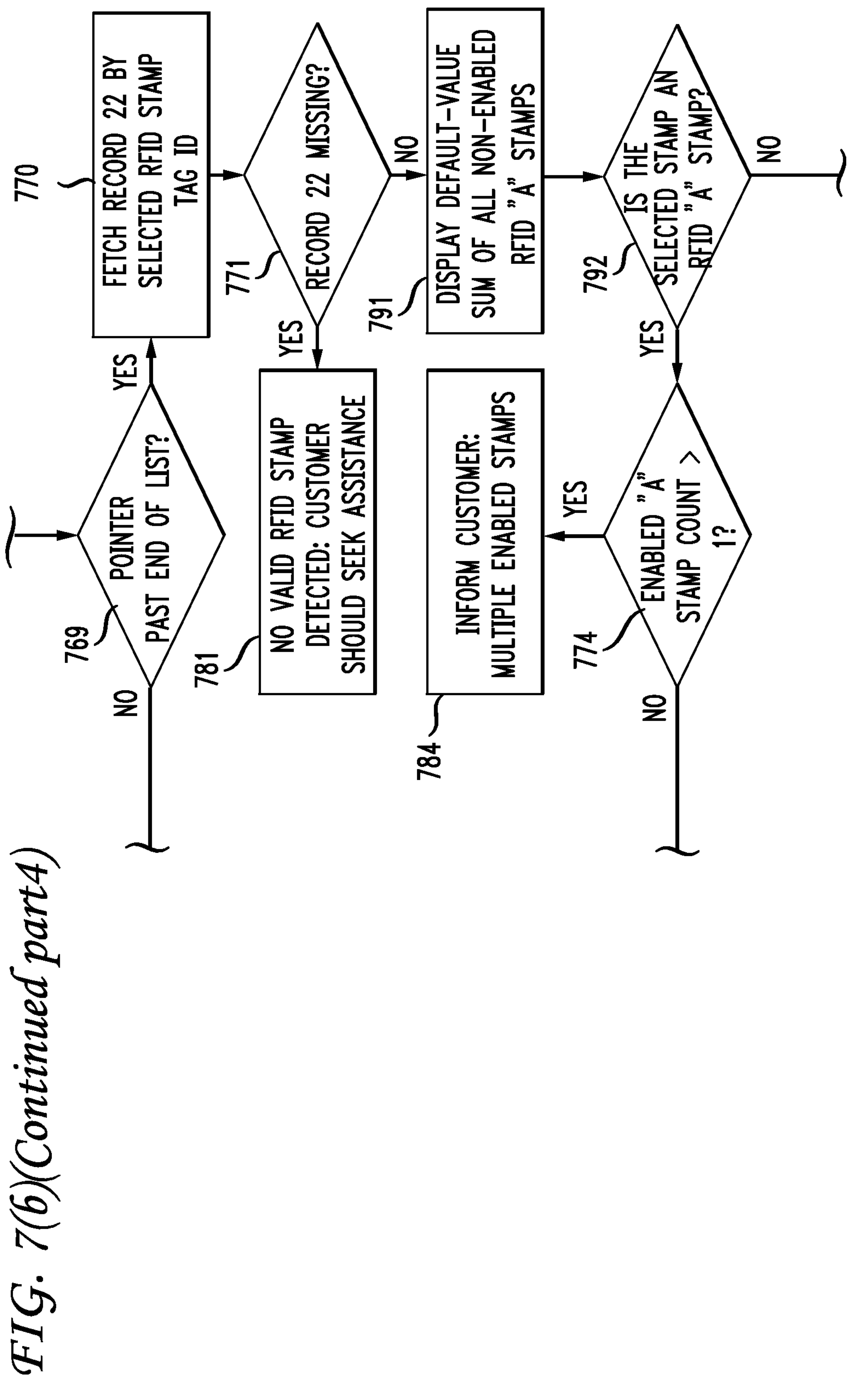
*FIG. 7(6)(Continued part4)*

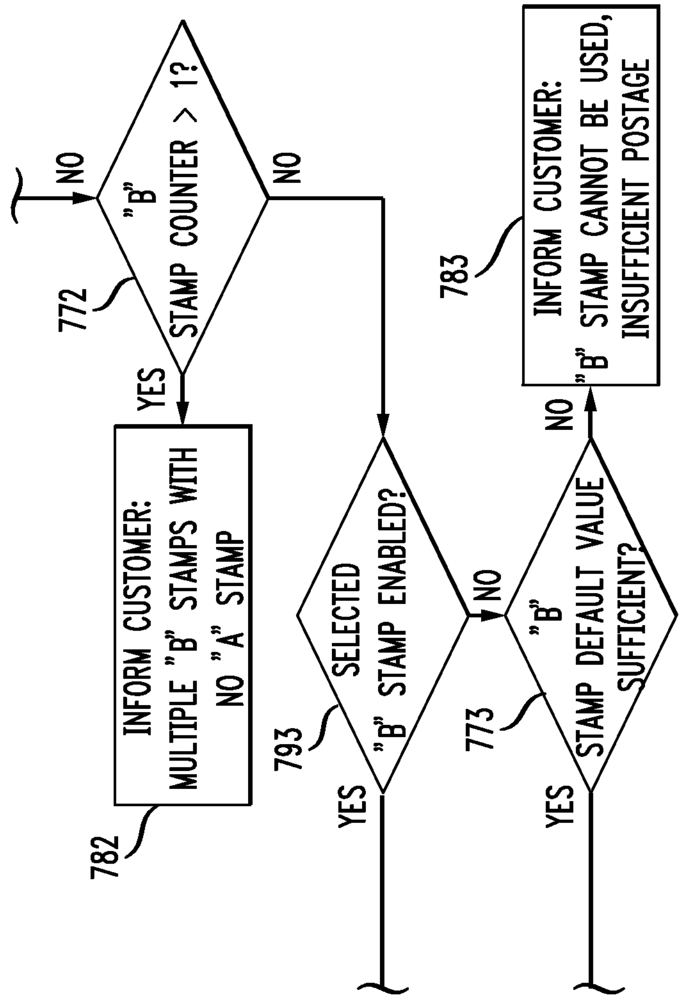
FIG. 7(b)(Continued part5)

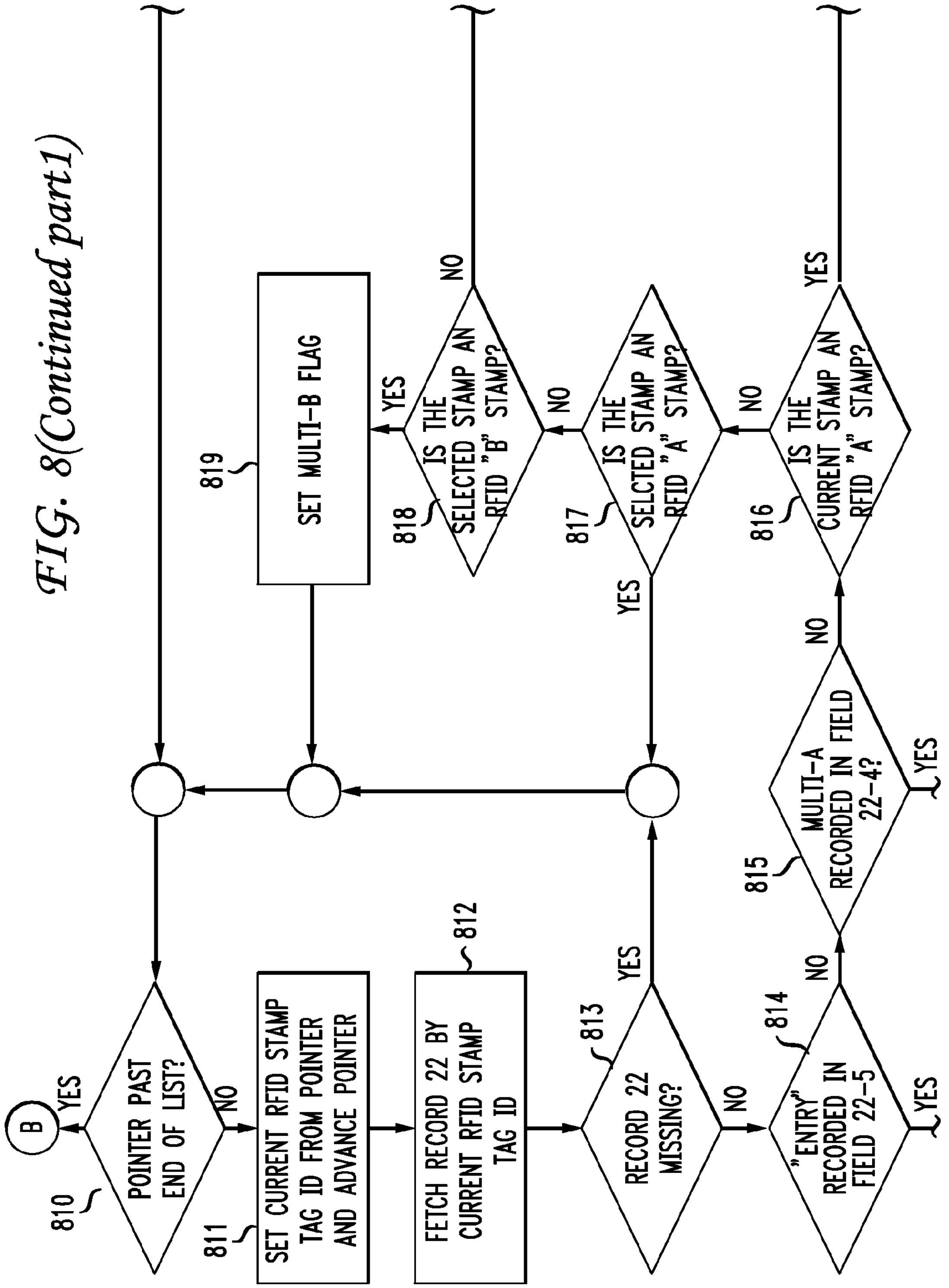
FIG. 8(Continued part1)

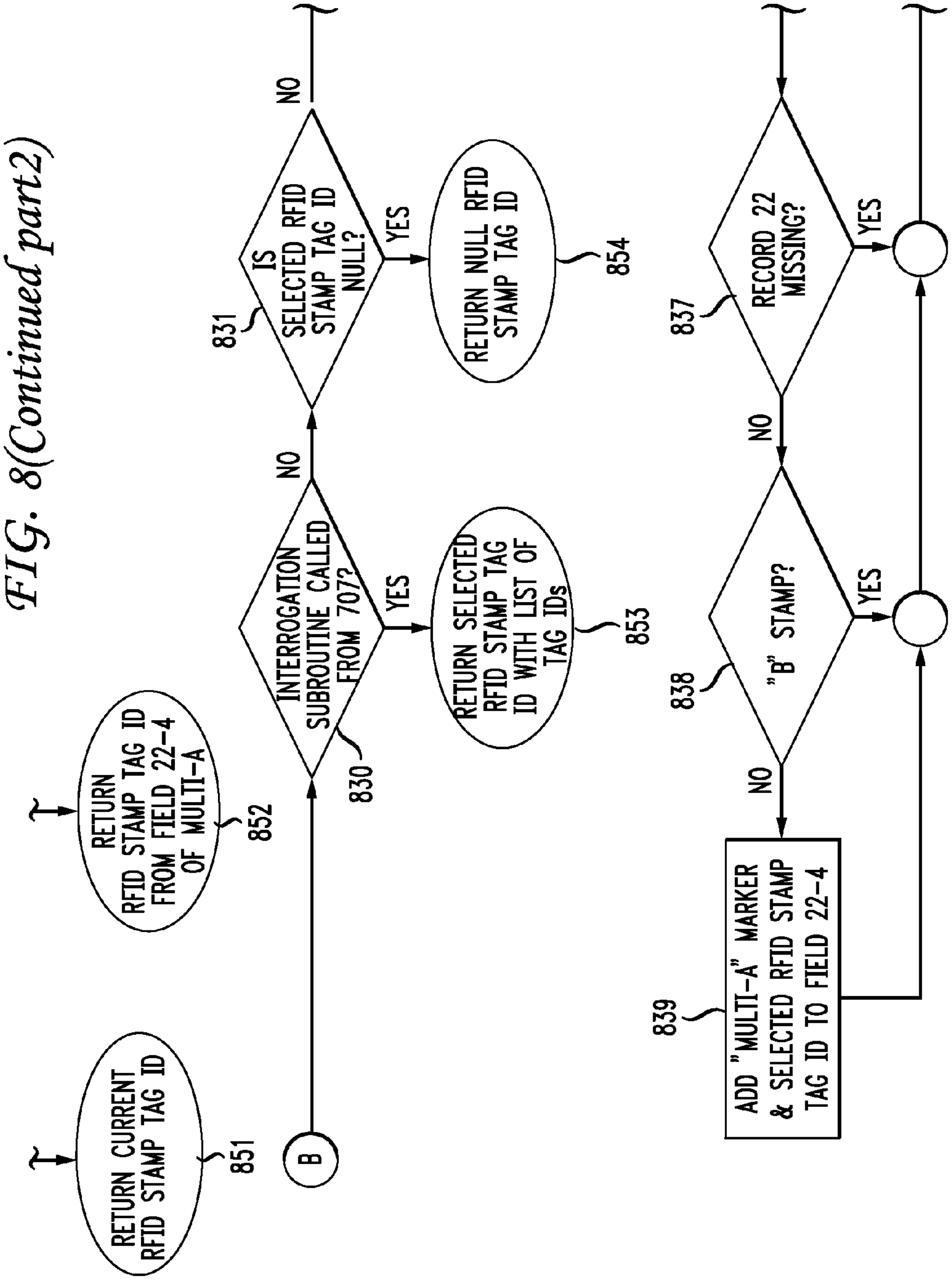
*FIG. 8(Continued part2)*

FIG. 8(Continued part3)
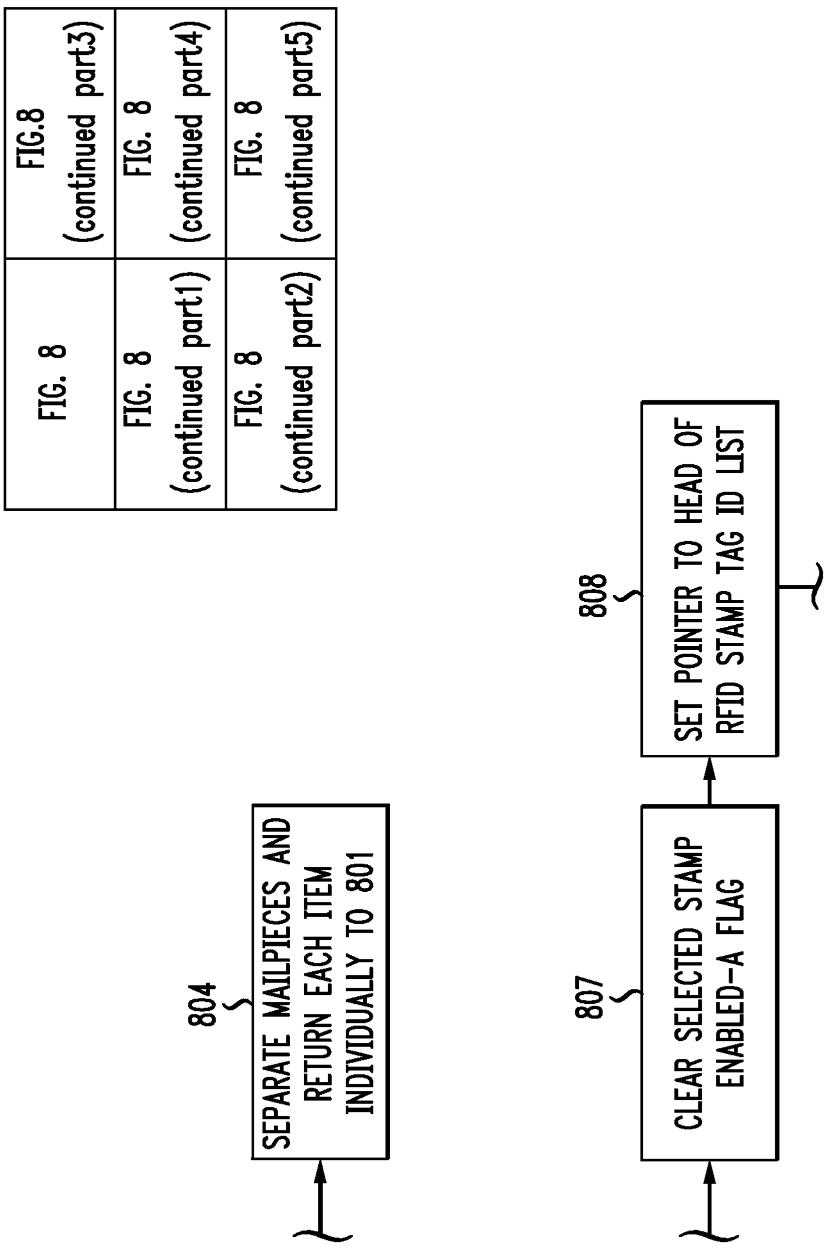

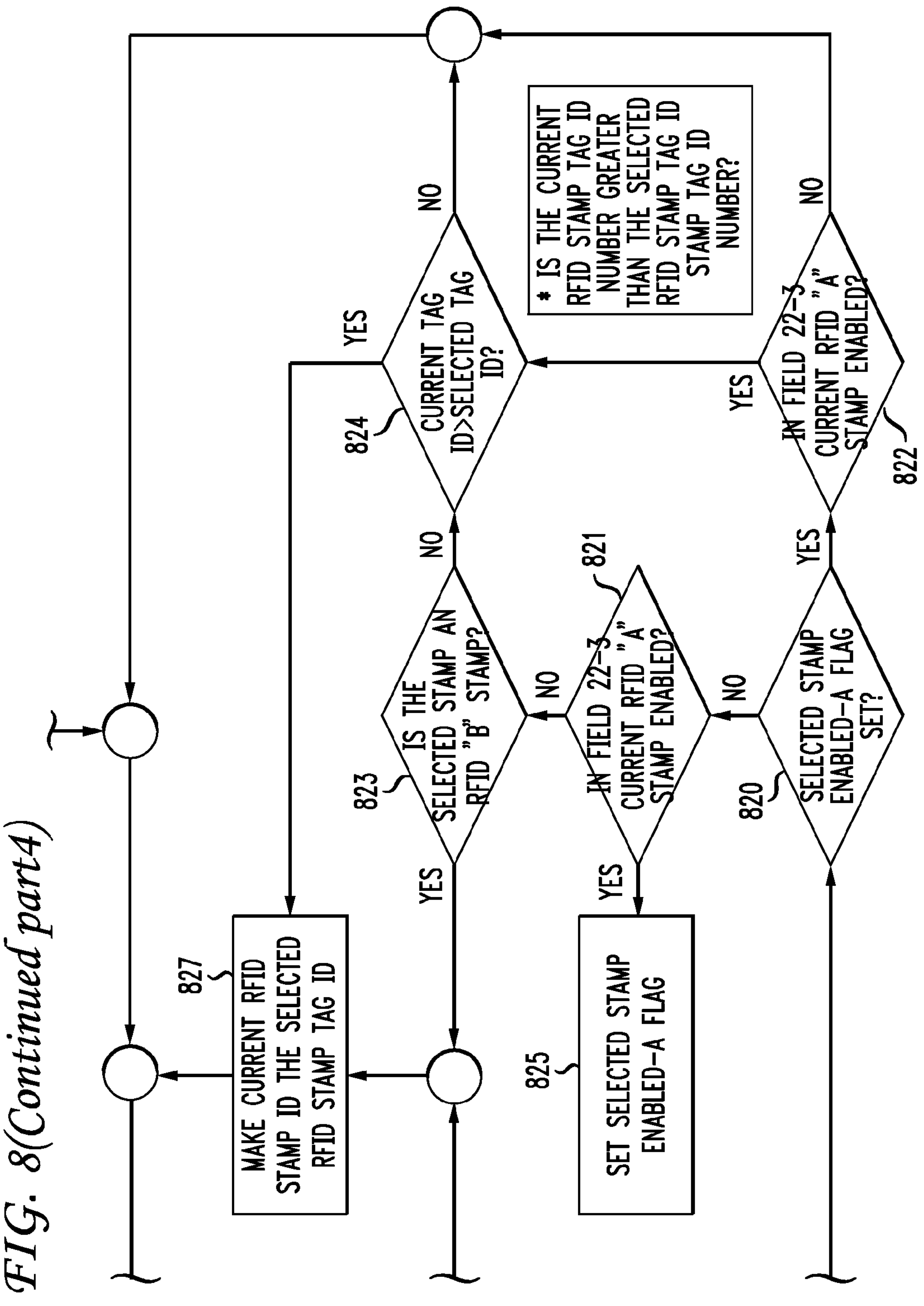
*FIG. 8(Continued part4)*

FIG. 8(Continued part5)
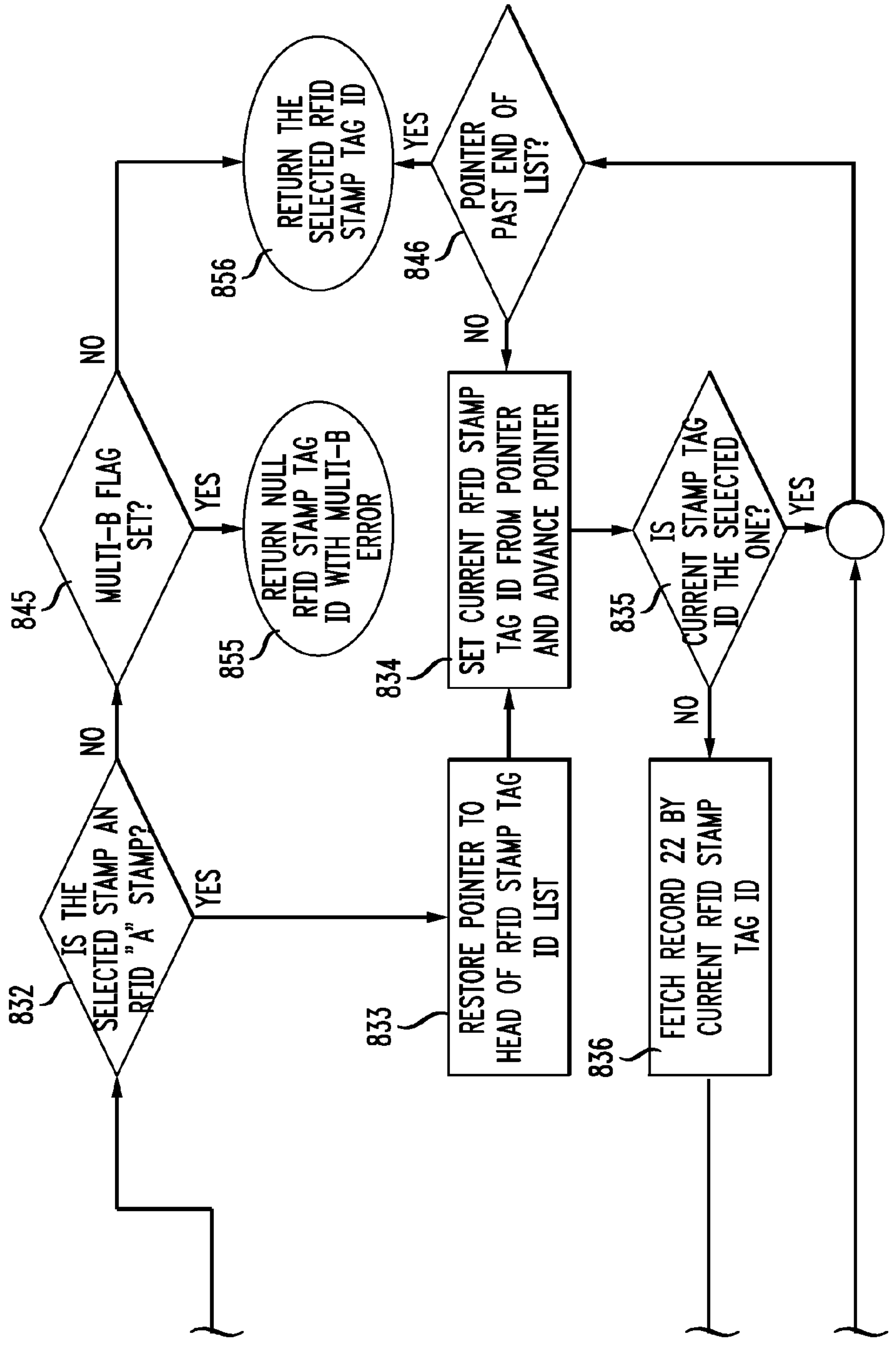

FIG. 9(a)(Continued part1)
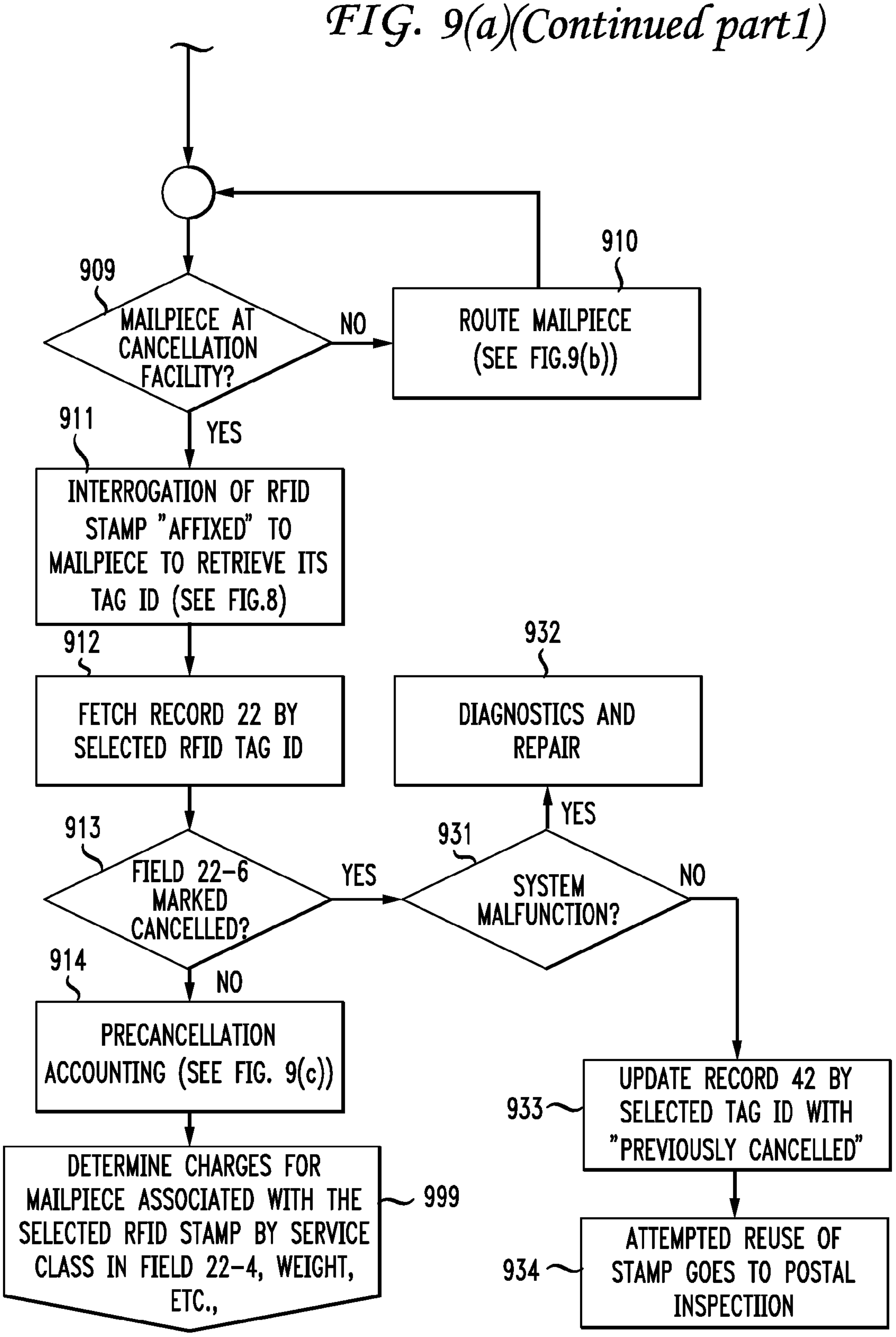

*FIG. 9(a)(Continued part2)*
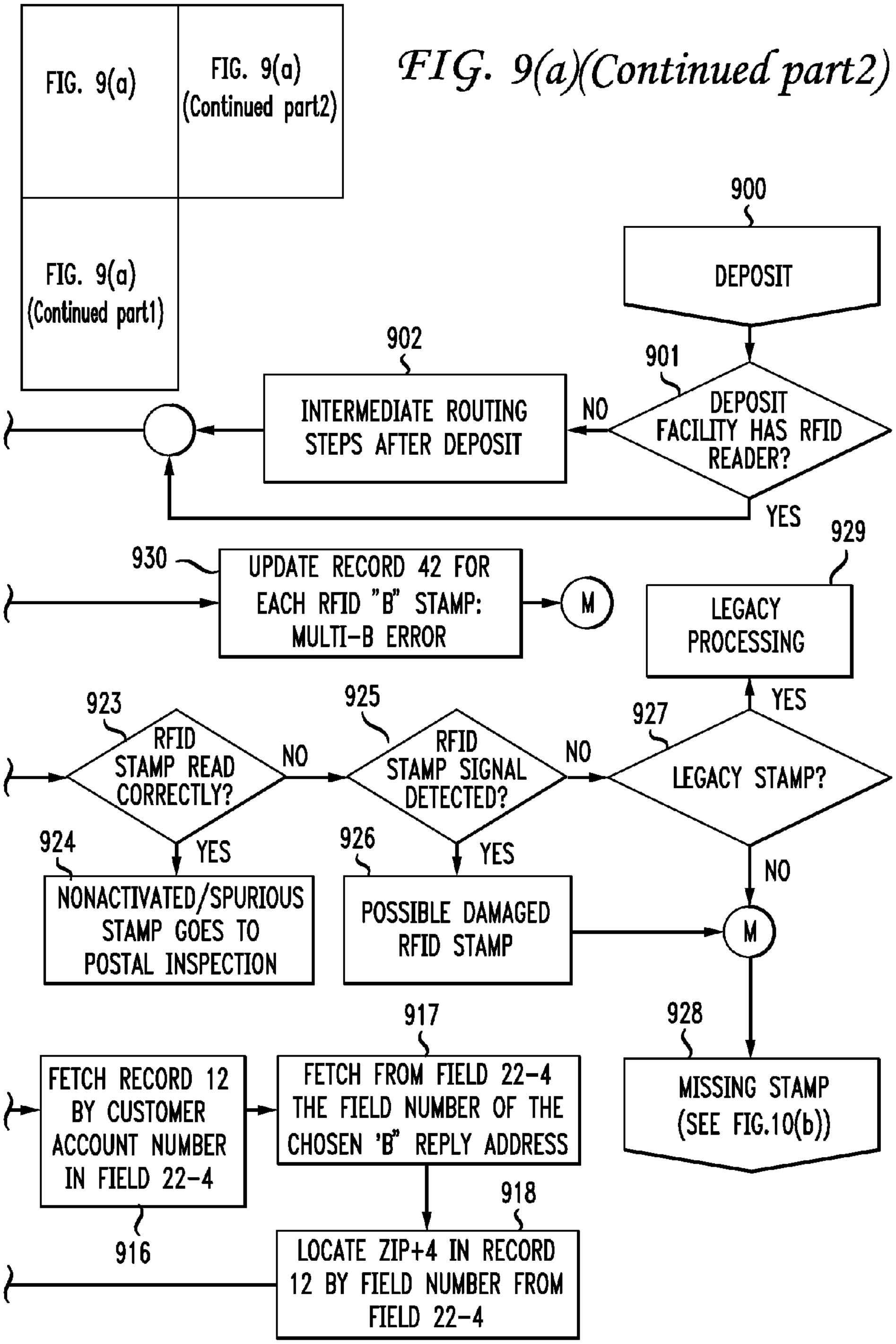

FIG. 9(b)(Continued part2)
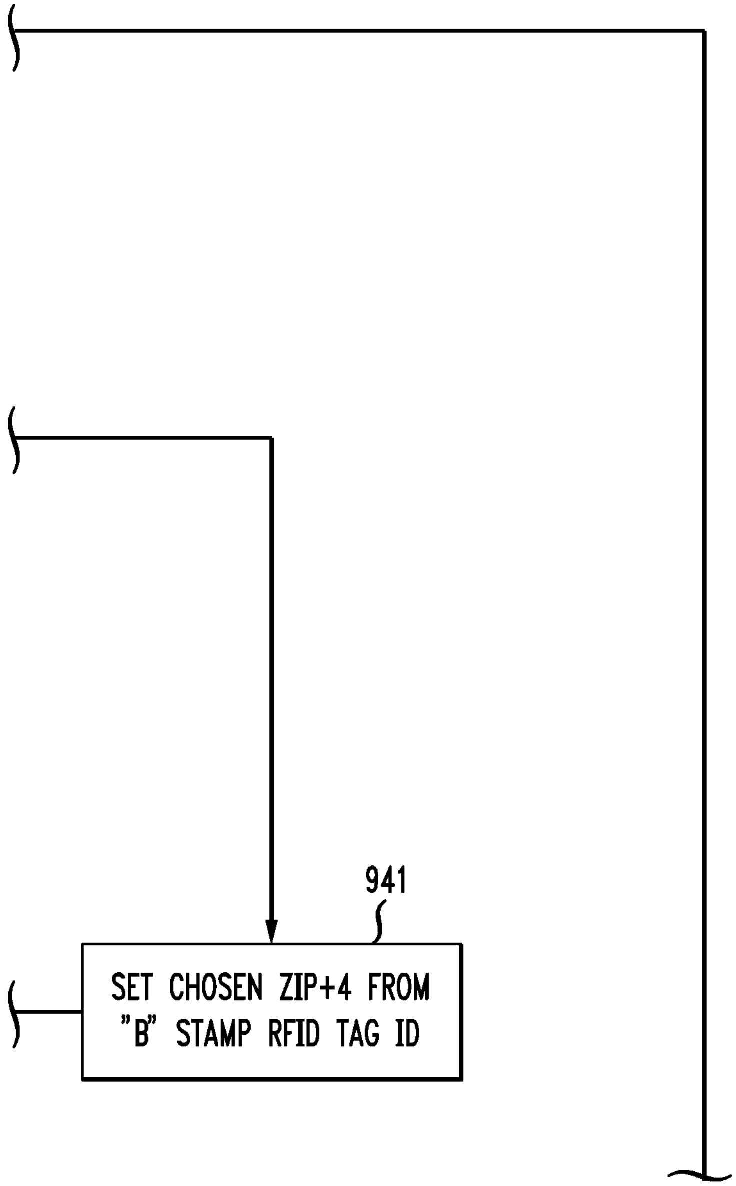

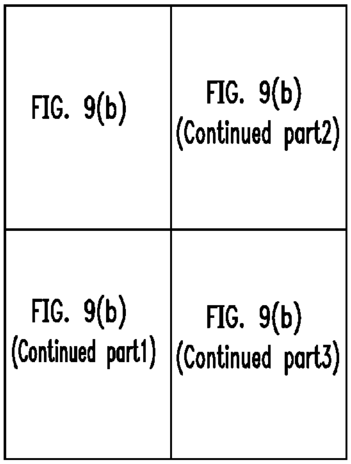
*FIG. 9(b)(Continued part3)*
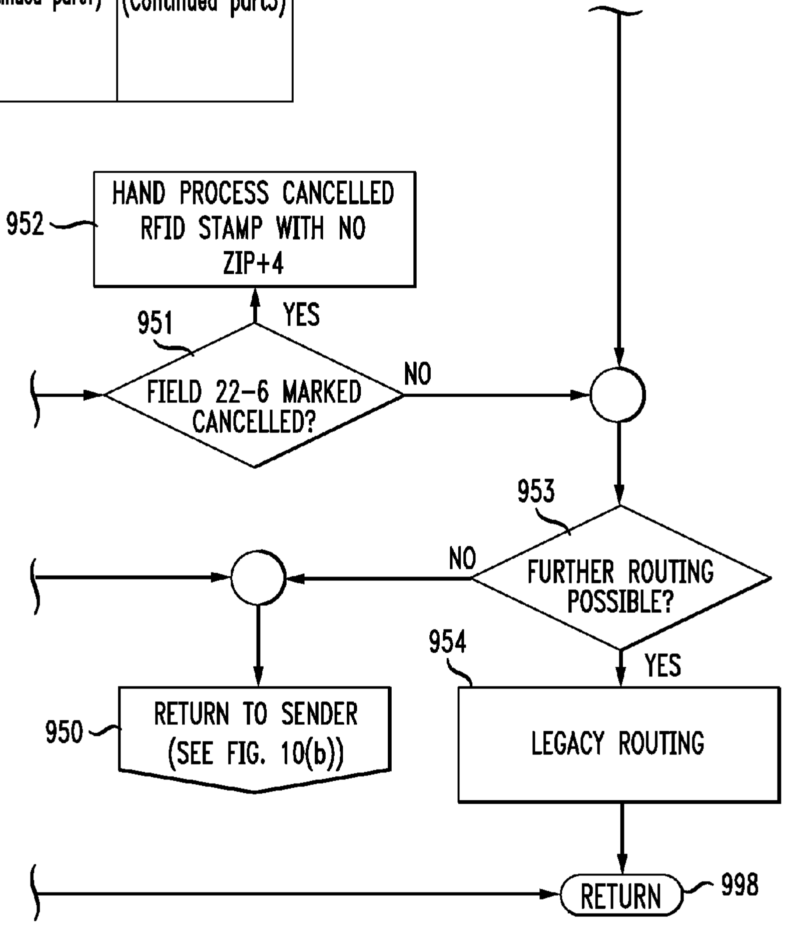

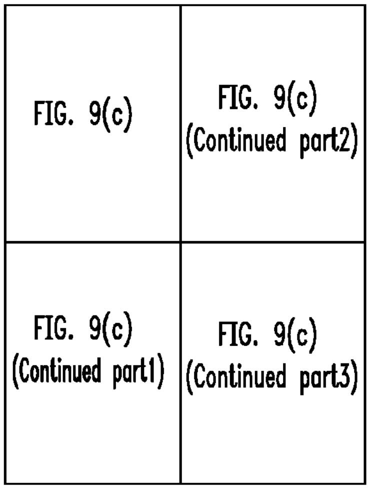
*FIG. 9(c)(Continued part1)*
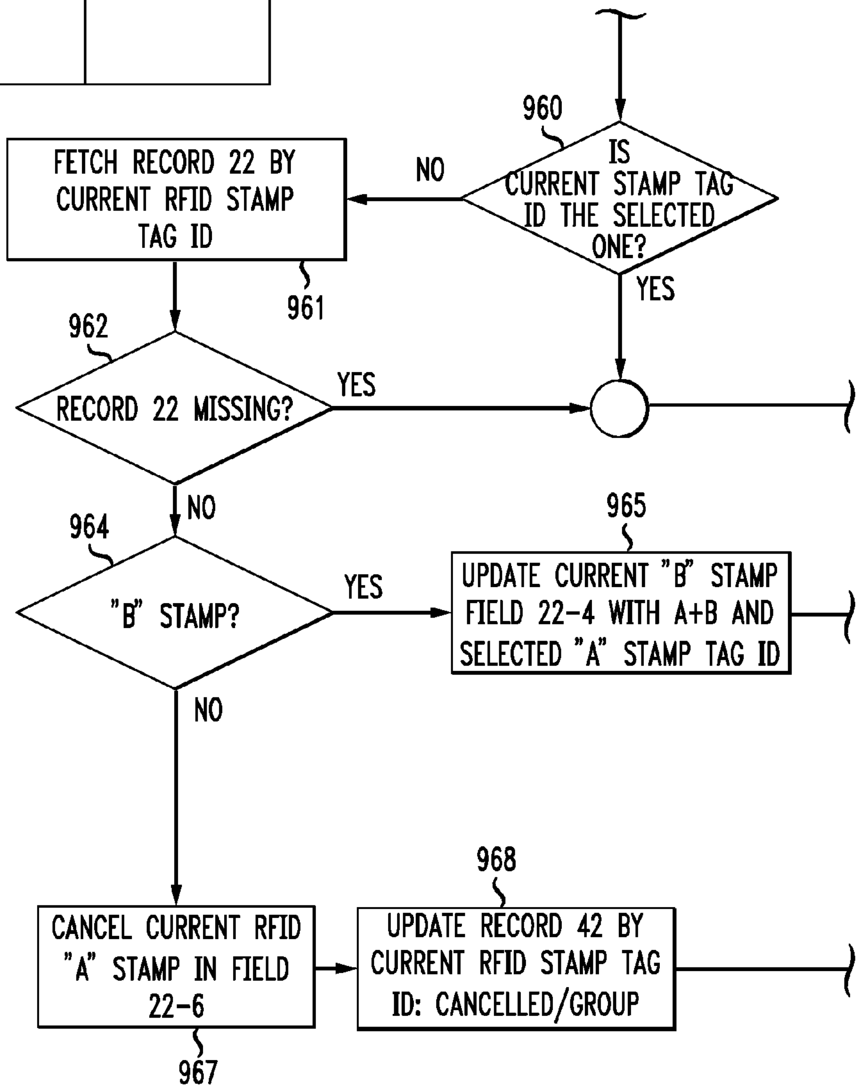

FIG. 9(c)(Continued part2)
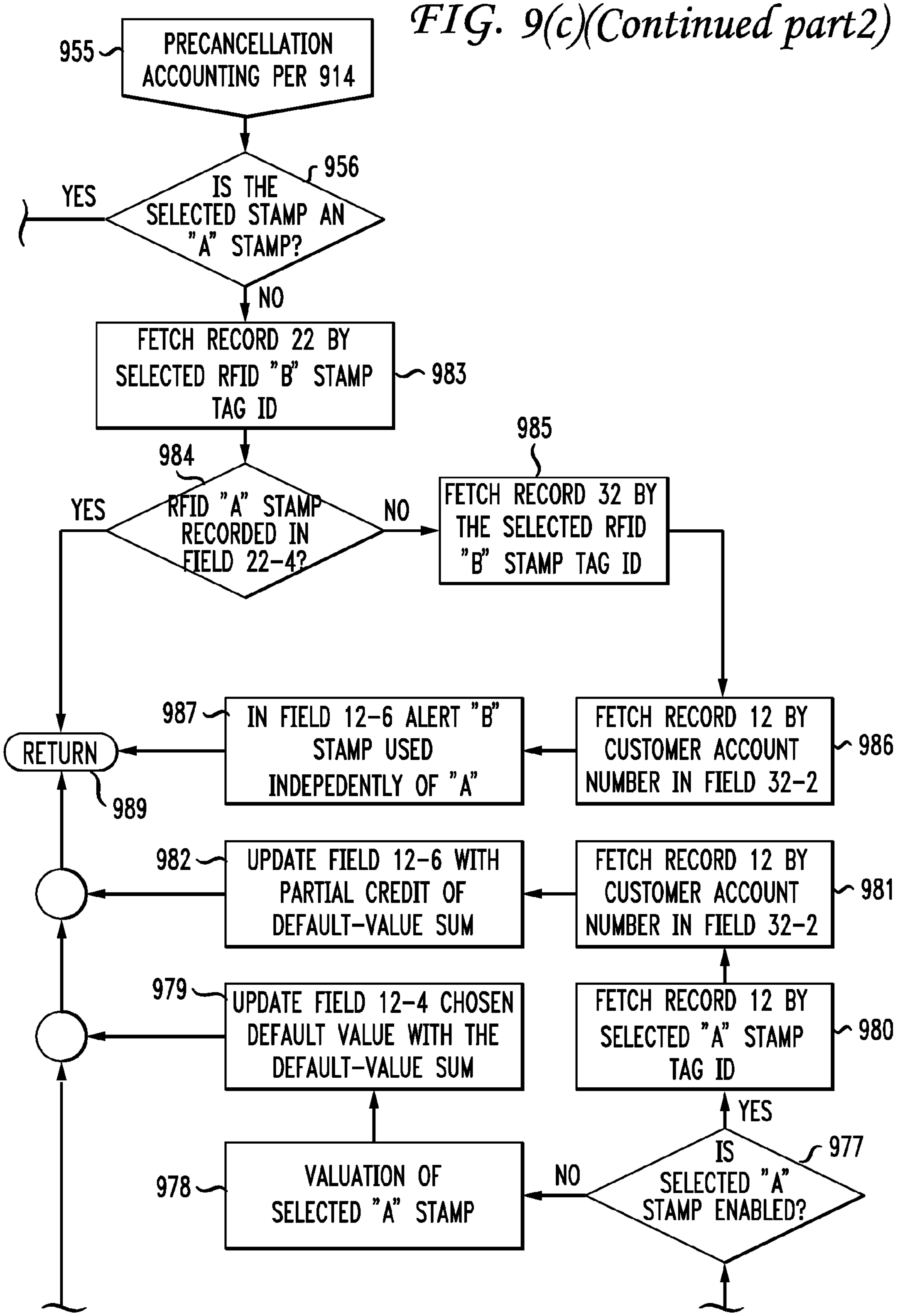

FIG. 9(c)(Continued part3)
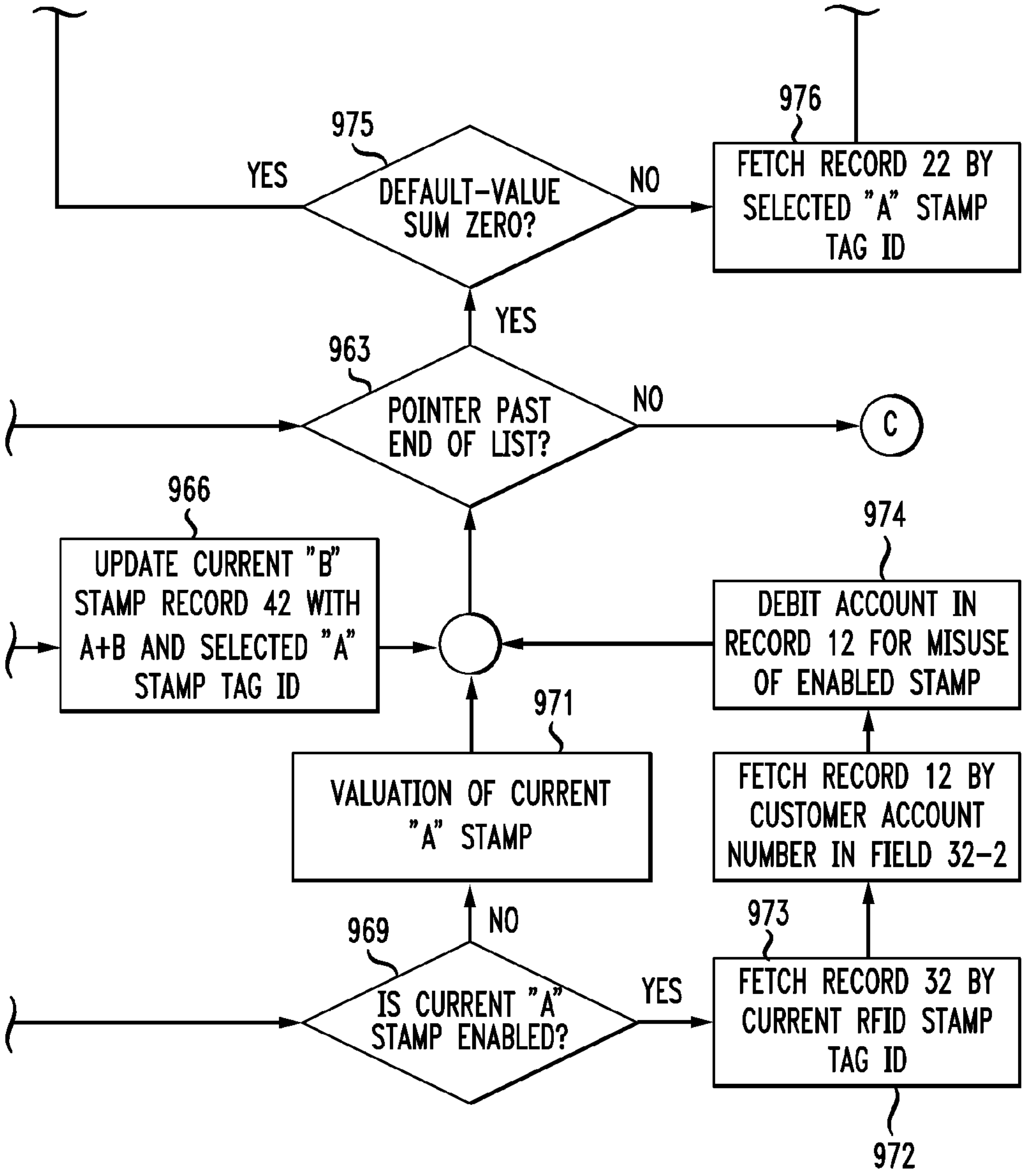

FIG. 10(a)(Continued part1)
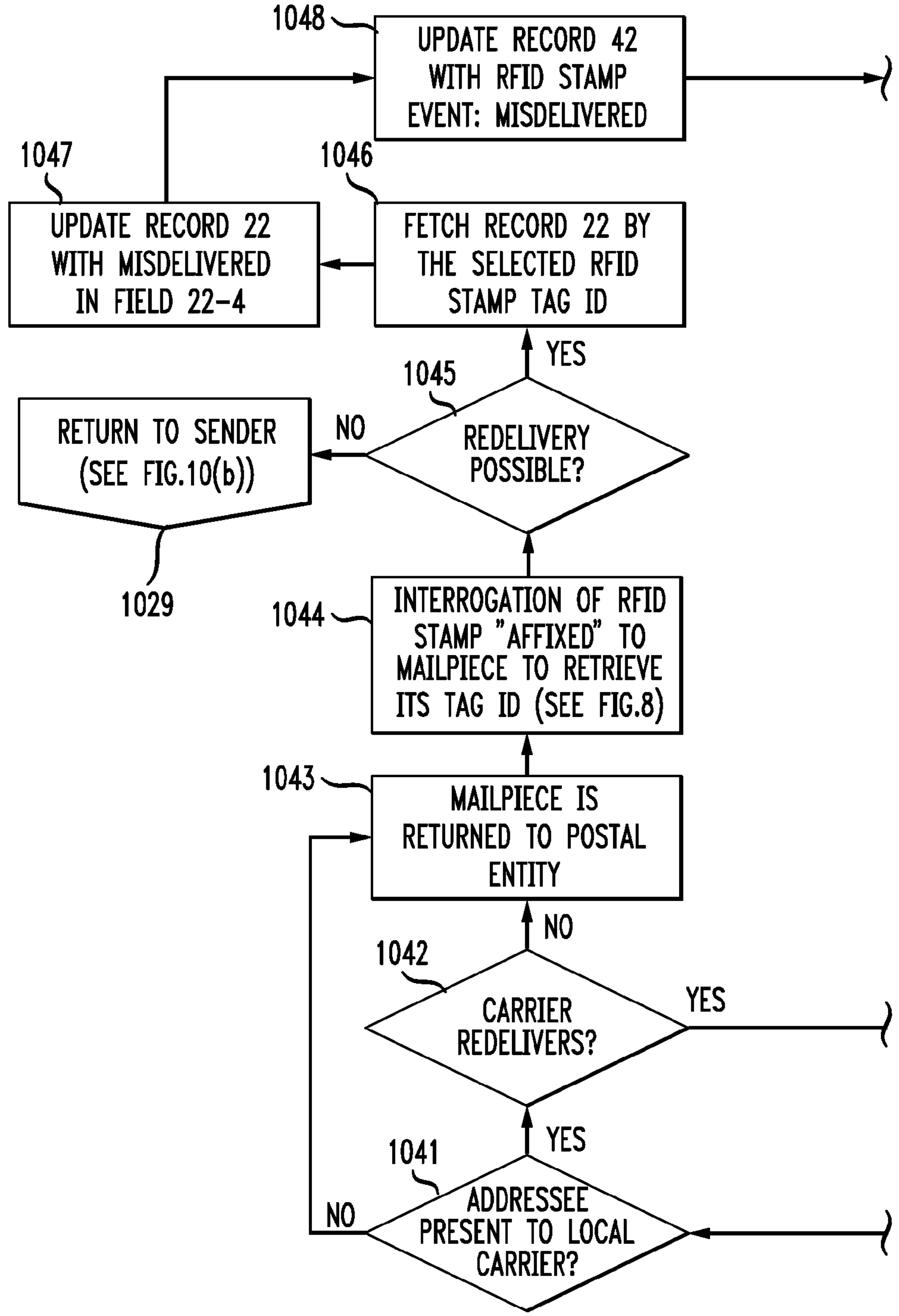

FIG. 10(a)(Continued part2)
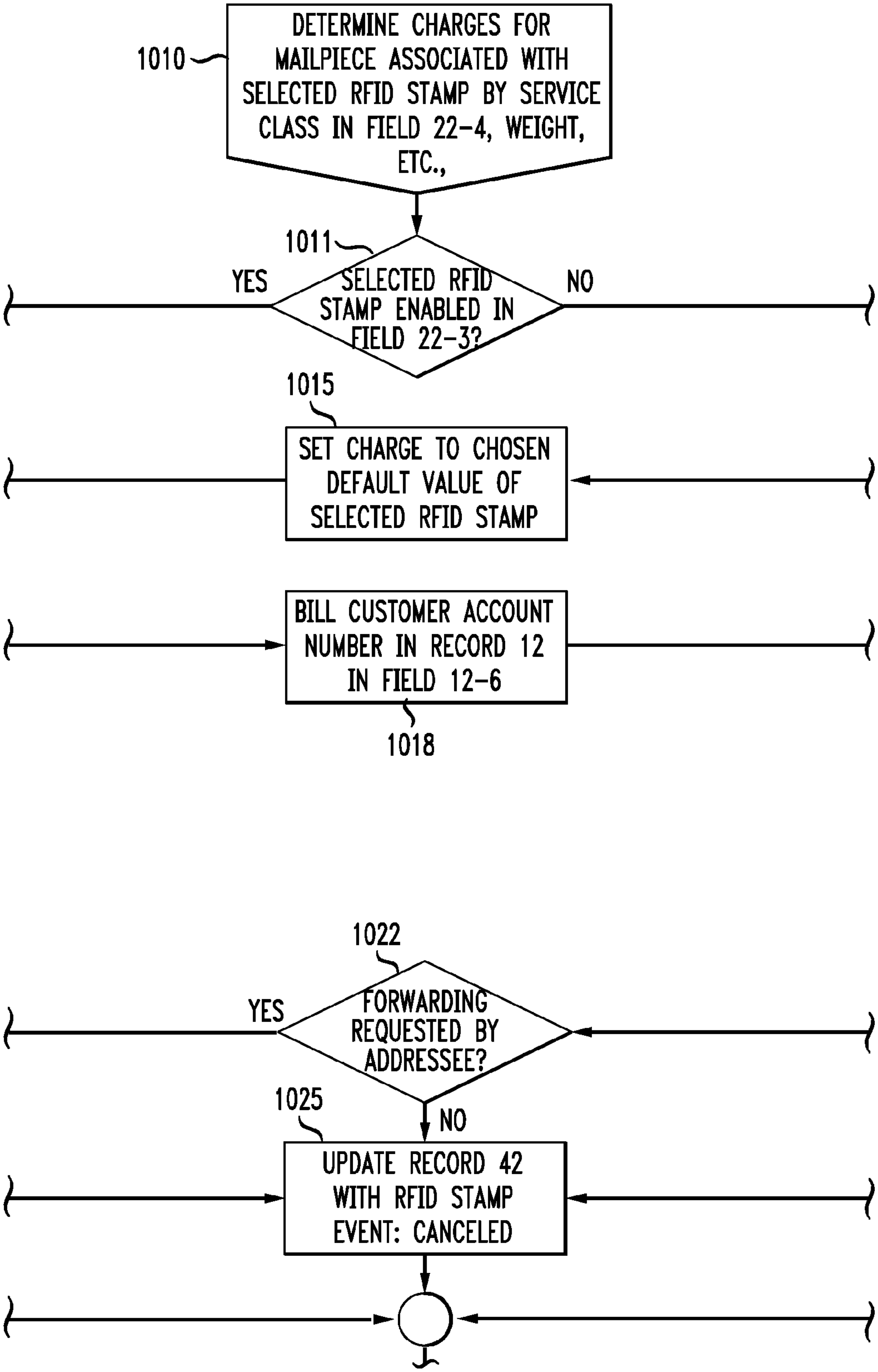

(Continued part3)

FIG. 10(a)(Continued part4)
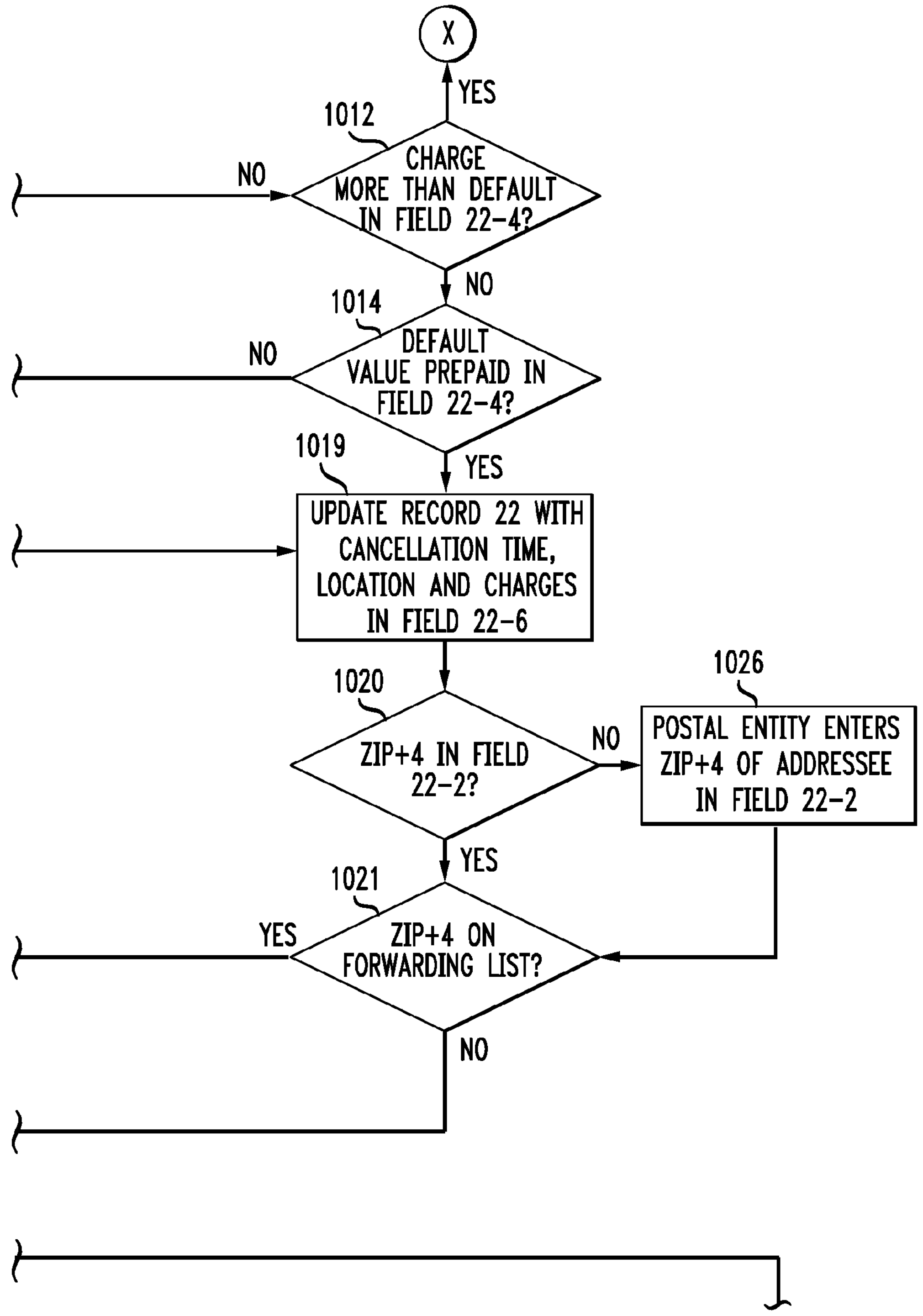

FIG. 10(a)(Continued part5)
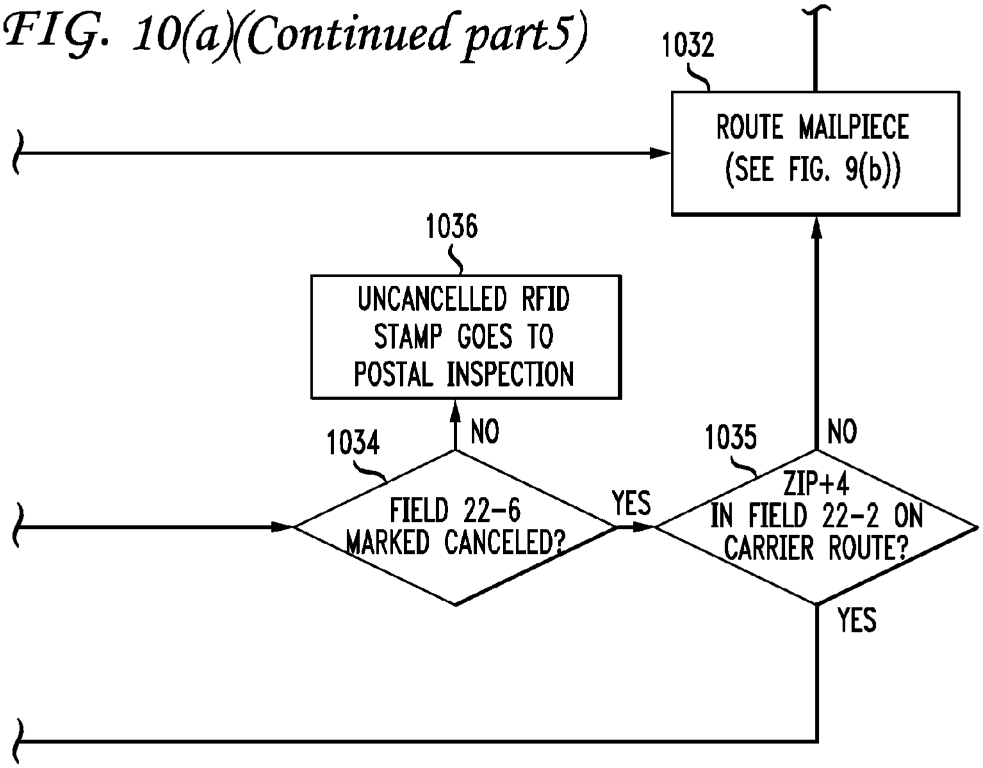
| | | |
|---|---|---|
| FIG. 10(a) | FIG. 10(a) (Continued part2) | FIG. 10(a) (Continued part4) |
| FIG. 10(a) (Continued part1) | FIG. 10(a) (Continued part3) | FIG. 10(a) (Continued part5) |

*FIG. 10(b)(Continued part1)*
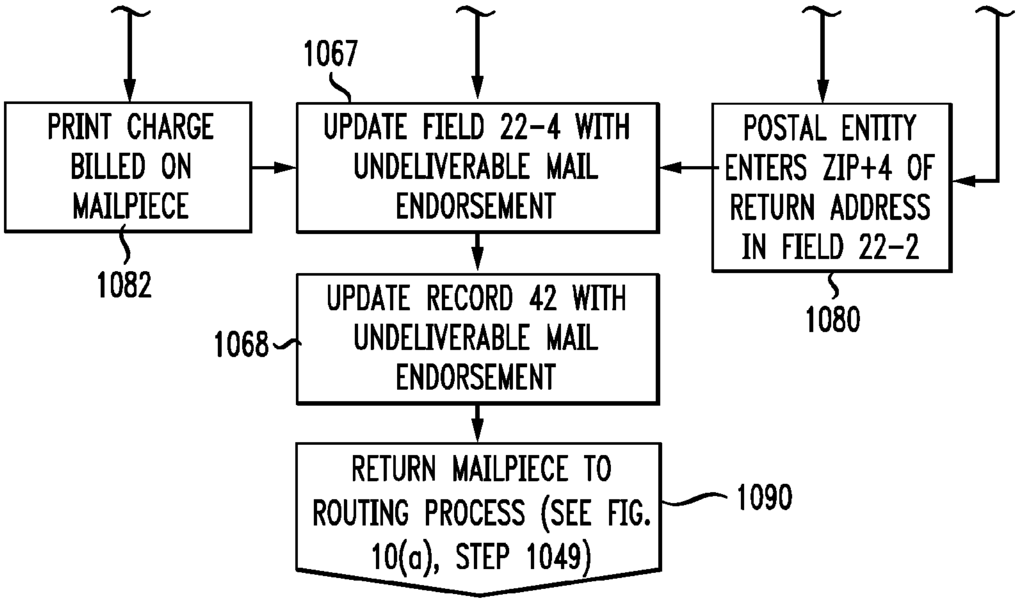
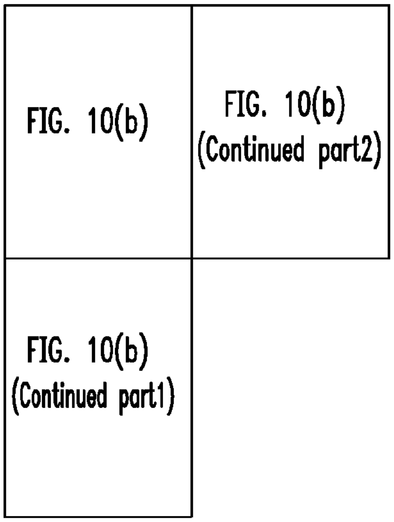

FIG. 10(b)(Continued part2)
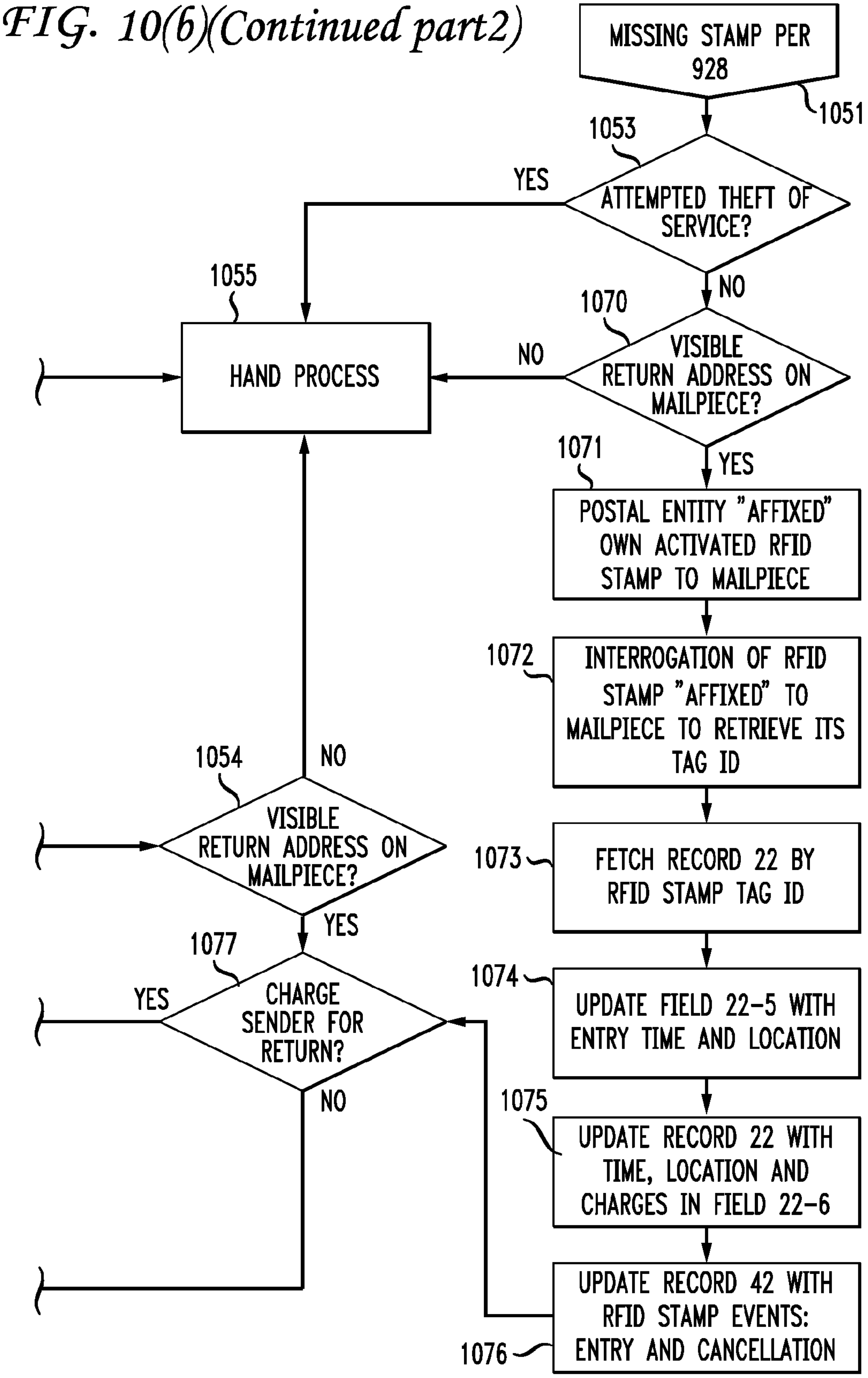

PASSIVE RFID POSTAGE STAMPS AND METHOD OF USING THE SAME

TECHNICAL FIELD

The present invention relates to a system and method for postage payment and, more particularly, to the utilization of passive RFID tags as postage "stamps", with the amount of the postage billed to a customer account associated with the RFID tag.

BACKGROUND OF THE INVENTION

Customers are often unable to determine the proper postage required for an item being mailed, whether through a government-based organization (such as the US Postal Service) or a private messenger company (such as the United Parcel Service). Indeed, it is possible for an individual to mail an item with insufficient postage, causing inconvenience and expense for both the customer and the postal entity. Furthermore, government-associated postage rate hikes have become more frequent, resulting in the need to purchase small denominations (e.g., one-, two-, or three-cent) stamps to use with all previously-purchased first class stamps (although this situation has been somewhat ameliorated with the introduction of the first-class "forever" stamp). Inasmuch as postage fees tend to be a function of the weight of the item to be mailed (regardless of delivery service), often a customer must first have the item weighed, and then affix the proper amount of postage. Indeed, even the size and shape of items being mailed are becoming factors in determining the necessary postage. The US Postal Service does offer a Priority Mail Flat Rate Box, although the convenience comes at higher cost to the consumer than if the item were actually weighed. In the event that the postage is insufficient, or if the destination address is "undeliverable", a return address is required to re-route the item to the originator. However, since the return address itself is not routinely verified (or may even be omitted), some of these items will not be able to be returned to the original sender.

No matter how careful an individual may be when attempting to estimate the proper postage, the US Postal Service remains obligated to weigh each item and confirm that a sufficient amount of postage is affixed, commensurate with the desired class of delivery service, including any requested enhanced services (e.g., insurance, certified delivery and the like). Subsequently, each item must be oriented, aligned, sorted and routed. In order to avoid repetitive stress injuries, postal employees are limited in how much time they may spend on such tasks, for example, typing delivery point barcodes. There has heretofore been no way to avoid the need for these repetitive tasks to be performed on each piece of mail. Further, tracing mailpieces as they pass through the postal system is useful for service monitoring, but is very labor intensive; retrospective tracing for forensic purposes is virtually impossible.

U.S. Pat. No. 5,497,140 issued to J. R. Tuttle on Mar. 5, 1996 discloses an electrically-powered postage stamp (or shipping label) which includes a radio frequency identification (RFID) device and system mounted between the opposing major surfaces of the stamp. The RFID device and system includes an integrated circuit transceiver chip which is connected to and powered by a thin flat battery cell. The transceiver chip is operated in association with a thin RF antenna, all of which are mounted in a side-by-side relationship on a thin base support layer of the stamp/label. These thin, flat components are mounted in an essentially two-dimensional planar configuration that is well-suited for incorporation into the conventional planar structure of a postage stamp or mailing label. As disclosed therein, the Tuttle RFID system is used to provide tracking information from dispatch to delivery. The Tuttle system uses an "active" RFID device, requiring each stamp/label to include batteries (albeit relatively small, planar batteries). Further, no system for determining postage or using the Tuttle system for customer billing of postage is disclosed or suggested.

A method and apparatus for providing postal user identification and billing is disclosed in US Patent Application Publication 2003/0225711, authorized by M. Paping and published on Dec. 4, 2003 (hereinafter "Paping"). As described therein, a franking module is provided that allows a postal customer to apply "unique indicia" to an item of mail for authorizing postal transactions. The indicia does not include postage, and the franking module has no capability of storing and accounting for postage. The identification data represented by the indicia includes a customer account number that is registered with the postal service for authorization and billing. The indicia is read and the postage value calculated by a post office processor remote from the franking module, with the amount of postage thereafter debited to the customer's account when the mail item clears the initial processing. The Paping method and apparatus is limited inasmuch as the franking module is required to be purchased by a customer in the first instance, in much the same style as a postage meter. Moreover, once the Paping system is used for postage billing, there is no further interaction with the mailpiece and no system to provide the tracking thereof.

US Patent Application Publication 2005/0116047, published to Binh T. Lu et al. on Jun. 2, 2005 (hereinafter "Lu"), discloses a 'trackable' postage stamp including a passive tracking device (usually a passive RFID tag) including stamp identification (ID) information. In the Lu et al. arrangement, the stamp ID information is stored in a centralized database in association with specific information about the item being mailed (for example, a "rare" book with an insurance value of $1500 is being sent from Bookstore A to Buyer B, mailed on Dec. 12, 2012). The stamp can therefore be interrogated anywhere along its delivery path to provide the sender (and perhaps the receiver) current information regarding the mail's location. While the use of a passive RFID tag is considered to be an advance in the art in terms of providing mailpiece tracking, the Lu arrangement does not suggest the inclusion of any type of billing arrangement with the trackable stamp. US Patent Application Publication 2005/0216319, published to G. C. Rebin on Sep. 29, 2005 discloses a similar "retail stamp with tracking" arrangement utilizing passive RFID tags. Again, no discussion of incorporating customer billing into the tracking mechanism is disclosed or suggested by Rebin.

Thus, a need remains in the art for an automated postage billing and tracking system that allows for selection of delivery service class and enhanced services (if any), while eliminating the need for a customer to know/have available the proper postage prior to mailing an item.

SUMMARY OF THE INVENTION

These and other limitations of the state of the art are addressed by the present invention, which relates to a system and method for postage payment and, more particularly, to the utilization of passive RFID tags as postage "stamps" (hereinafter simply referred to as "RFID stamps"), with the amount of the postage automatically billed to a customer account associated with the RFID tag, eliminating the need for the customer to know the proper postage beforehand. In addition, the customer may request that enhanced services (such as, but not limited to, insurance, certified, or the like) may be billed through the RFIF tag. Also, by virtue of using an RFID tag, the mailed item's progress through the postal delivery system may be tracked from dispatch to delivery. Indeed, a customer may request tracking information on any mailpiece with an RFID stamp, without prior arrangement; of course, the postal entity could impose an extra charge if not already covered in the class of service. Furthermore, inventory management, process monitoring, customer services, etc., may all be integrated through the postal entity's databases for RFID stamp tracking and subsequent data mining.

In accordance with the present invention, passive RFID tags are used in a variety of different applications as a substitute for traditional, fixed-rate postage. The unique identification information embedded within each tag (hereinafter referred to as the tag "ID") is linked in a one-to-one relationship with a customer account through a collection of centralized databases that maintains a record of all the postal entity's RFID stamps. A separate class of customer account databases contains the customer-sensitive billing information regarding RFID stamp services; this information is therefore not retrievable by postal employees who would only access the databases related to service fulfillment. In a preferred embodiment, the unique association between the tag ID and the customer account number is recorded in an RFID stamp account database.

In an exemplary embodiment, as a mailpiece passes through the postal system, all details of its progress and handling are recorded in the RFID stamp event database. The subset of events directly related to the service requested by the customer is also stored in a mailpiece history database. When a customer presents a mailpiece with an "affixed" RFID stamp, the postal entity records at an RFID-capable reception point that the item has "entered" the system. The item may then pass through other designated nodes within the postal system where its transit can be recorded until it reaches the primary postal entity sorting facility. There, the necessary amount of postage is calculated and the postage fee billed to the customer account. The tag itself is then recorded as "cancelled" in the mailpiece history database so that it cannot be repeatedly used.

In accordance with the present invention, during processing, the postal entity may store a routing code in the mailpiece history database, associated with the tag ID, that may supplement or supplant the use of routing codes or barcodes printed on the mailpiece. In the exemplary embodiments presented herein, the routing code recorded in the database will be referred to as "ZIP+4", but it is to be understood that other codes, such as international postal codes, may be used. Simultaneously, tracking information is automatically recorded in the RFID stamp event database. At subsequent nodes in the postal system, such as routing or processing, the path of the mailpiece can be recorded through delivery.

It is to be understood that an advantage of the present invention is that the RFID stamp does not need to be literally affixed to the outside of the mailpiece. Indeed, the RFID stamp may simply be disposed somewhere inside the letter/package. The radio waves used to "read" the stamp will transmit through the enveloping material and, moreover, do not require a "line of sight" transmission. Thus, while this discussion may refer to "affixing" postage to a mailpiece, this is to be understood in its broadest terms as associating an RFID postage stamp with a mailpiece in a one-to-one relationship.

Advantageously, the RFID stamp of the present invention can be read with the mailpiece in any orientation during the automatic mail routing process. Also, if two or more mailpieces become stuck together in handling, this condition may be easily detected by recognizing the presence of two (or more) unique tag IDs. Furthermore, if ZIP+4 is recorded by the customer in the RFID stamp databases, a postal employee is no longer required to perform manual data entry to encode the delivery point barcode on the mailpiece. Also, at several points in the journey of a mailpiece, its RFID stamp can be interrogated simultaneously with many others at the same stage of processing, such as when a bag or a postal flat arrives at a sorting facility, or when a group of mailpieces passes through the final route sort and is then directed to its regional destination. Consistency checks can be made at each interrogation point, to ensure that a mailpiece has not been misdirected. Such checks can improve service reliability without increasing time or labor in handling the mail. These are considered to be only exemplary instances in which the use of the inventive RFID stamps improves the efficiency of the sorting process by a reduction in the postal employee workload.

It is an advantage of the present invention that the postal entity may elect to give a discount to postal account customers who enter ZIP+4 information themselves. The postal entity may also offer postal account customers a finer grained rate schedule for what are presently fixed-rate classes of service. For example, a first-class letter that weighs significantly less than the maximum weight of one ounce could be charged less than the default first-class rate. This could discourage consumers from sending the maximum weight of material per mailpiece at the selected flat rate postage. Implementing this option would not reduce volume for the postal entity but could reduce gross weight carried, thus leading to energy savings.

It is a further advantage of the present invention that a customer account database also stores a preferred customer "return address", so that if the mailpiece is undeliverable, the return address information can be retrieved by again reading the tag, retrieving the customer account number from the RFID stamp account database, and then finding the associated address in the customer account database.

In one embodiment of the present invention, a customer may purchase one or more RFID stamps and have them immediately "enabled" (that is, linked with his/her postal customer account number), providing both billing and return address information to set up a postal account if one does not already exist. Upon purchase, each RFID stamp is immediately interrogated to retrieve its unique tag ID, where the tag ID is then stored in an RFID stamp database in association with the customer's postal account number. As the RFID stamps are used, the necessary postage is billed to the customer's postal account and the postal entity records the RFID stamp as "cancelled". As a result, there is no need for the customer to predetermine the proper amount of postage before mailing an item. In addition, various billing arrangements (e.g., third-party credit card accounts) are possible.

In an alternative embodiment, a customer may purchase one or more "anonymous" RFID stamps and allow them to remain non-enabled (i.e., not 'enabled' at time of purchase). This is a likely scenario at a retail point of sale. In the "anonymous" transaction, the purchased RFID stamps are not immediately associated with a customer account, but remain 'non-enabled' and are useable only for their purchased face value (presumably, a first-class postage stamp). Such a purchase is likely in situations where an individual is purchasing stamps for others to use. If the RFID stamp is never enabled (i.e., never associated with an end-customer account), it merely retains its first-class value and is used in a conventional manner by the customer. In accordance with the present invention, an individual using an anonymous RFID stamp will have the option, at any time prior to its deposit into the postal system, to enable the RFID stamp, linking its tag ID with her/his customer account (or if she/he does not have a pre-existing account, one may be created); at this point, the RFID stamp is no longer anonymous. When the postage is determined for the mailpiece to which said RFID stamp is "affixed", an RFID reader will again interrogate the RFID stamp, retrieve the tag ID and associated account number, and then query the customer account database to bill the proper customer account. The RFID stamp itself is then recorded as "cancelled" by the postal entity.

In a preferred embodiment, a customer postal account number is stored on a personal customer device (referred to hereinafter as a 'postal account card' or PAC). The PAC information may be stored on a conventional magnetic strip, in an embedded RFID tag, as an optical barcode, or by other means known in the art. The customer may present the PAC when RFID stamps are purchased, and/or at a later time when stamps are to be enabled, allowing the postal service to retrieve the proper customer account information (and thus, interrogate the customer account database to authorize the proper billing at the time of cancellation).

It is presumed that mail collection boxes could be equipped with RFID readers so as to allow for mailpieces containing non-enabled RFID stamps to be recorded as having entered the postal system by direct deposit into a collection box. In situations where a customer has a postal account card, that card may also be read by the collection box to retrieve the customer account number and allow the RFID stamp to be enabled by linking the tag ID with the retrieved customer account number.

Additionally, at any time prior to a mailpiece entering the postal system, the customer may associate the ZIP+4 information of the destination with the "affixed" RFID stamp by means of a variety of interfaces. This information is then linked with the tag ID in the RFID stamp databases and thus eliminates the need for a postal worker to manually enter the delivery point barcode on the mailpiece during sorting operations.

In yet another embodiment of the present invention, the RFID stamps may be used in a paired arrangement (hereinafter referred to as an A+B pair), where a customer purchases an A+B pair with the tag IDs on each RFID stamp in the pair being linked together by, for example, a special numbering system. The customer then uses the "A" RFID stamp to send a first mailpiece, with the "B" RFID stamp included within the mailpiece and "affixed" to a reply envelope, in the form of a "self-addressed stamped envelope". When the A+B RFID stamp pair is interrogated, the system will know to use RFID stamp "A" as the initial stamp and RFID stamp "B" as the reply postage stamp. Advantageously, there is no need to write out the reply address since this information is already present in the customer account database and can easily be linked to RFID stamp "B" when the reply envelope is mailed. The use of such an A+B RFID stamp pair is applicable in various other situations, such as Business Reply Mail, or personal RSVP events.

In a generalization of this embodiment, an RFID stamp "A" may be associated with a plurality of RFID stamps B1, . . . , Bn, each of which functions as RFID stamp "B" above. An entity that expects regular, periodic mail from its correspondents (e.g., mortgage payments to a bank, estimated tax payments to the IRS) could use this feature.

In a further embodiment, especially for high-volume mailers, an RFID "B" stamp may have a specialized tag ID that encodes the reply ZIP+4 to expedite routing.

In another embodiment of the present invention, a comprehensive "event database" can be created and used to track the complete journey of each RFID stamp, maintaining a database of each event in the service trail from customer purchase to delivery. In additional embodiments, databases can be included to trace the manufacturing history of each RFID stamp prior to purchase, as well as various inventory-related and retail events; also, the postal service entity may "register" RFID stamps as they are received from a manufacturer, to prevent counterfeit, and, in order that they may be shipped without inadvertent cancellation, registered RFID stamps have no default value until "activated" through the postal entity.

The universe of RFID stamp data integrates traditionally segregated postal-entity products and service information into one data system combining customer-centric features with multi-level administrative data mining possibilities.

Other embodiments and features of the present invention will become apparent during the course of the following discussion and by reference to the accompanying drawings.

BRIEF DESCRIPTION OF THE DRAWINGS

Referring now to the drawings

FIG. 2(*b*) is an illustration of recording detailed, on-going processing information in a comprehensive RFID stamp event database of the present invention;

FIG. 5(*b*) is a flowchart of an exemplary activation routine, called by the process shown in FIG. 5(*a*);

FIG. 6(*b*) is flowchart of an exemplary enablement routine, called by the process shown in FIG. 6(*a*);

FIG. 7(*b*) is a flowchart of an exemplary customer interface routine called by the process shown in FIG. 7(*a*);

FIG. 9(*b*) is a flowchart of a routine for an exemplary postal entity routing method, called by the process of FIGS. 9(*a*) and 10(*a*);

FIG. 9(*c*) is a flowchart of an exemplary pre-cancellation accounting routine that may be called by the process of FIG. 9(*a*);

FIG. 10(*b*) is a flowchart of an exemplary "return to sender" routine that may be entered from the processes outlined in the flowchart of FIGS. 9(*a*) and 10(*a*).

DETAILED DESCRIPTION

In general, radio-frequency identification (RFID) is an automatic identification method that relies on storing and remotely retrieving data from a device referred to as an RFID "tag" or "transponder". An RFID tag comprises an object that may be applied to, or incorporated in, an element for the purpose of identification using radio waves. In the system of the present invention, the RFID tag takes the form of (for example) a postage stamp, or an equivalent instrument authorizing a delivery service (hereinafter generally referred to as an "RFID stamp" for sake of simplicity). An RFID "reader" or "interrogator", when located within a predetermined distance of the tag (here, RFID stamp), will energize the tag/stamp to retrieve the stored data.

Most RFID tags comprise two elements: a processor module for storing the data, and an antenna for receiving and transmitting an RF signal. The system of the present invention utilizes so-called "passive" RFID tags; that is, tags that require no internal power supply since the tag is energized by an RFID reader. In particular, the electrical current induced in the antenna by the incoming RF signal is sufficient to power-up the processor and transmit a response. Passive tags signal by backscattering the carrier wave of the incoming RF signal. This requires that the antenna be designed to both collect power from the incoming signal and also transmit the outbound scatter signal. For the purposes of the present invention, the data being transmitted is the unique ID information associated with a specific RFID tag (and in some special cases, possibly the ZIP+4 of the mailpiece). Preferably, read-only passive RFID tags would be used in the present invention, since read-only tags are less expensive than writeable tags and writeable tags would require a security infrastructure to prevent unauthorized data alteration.

Figure 1:
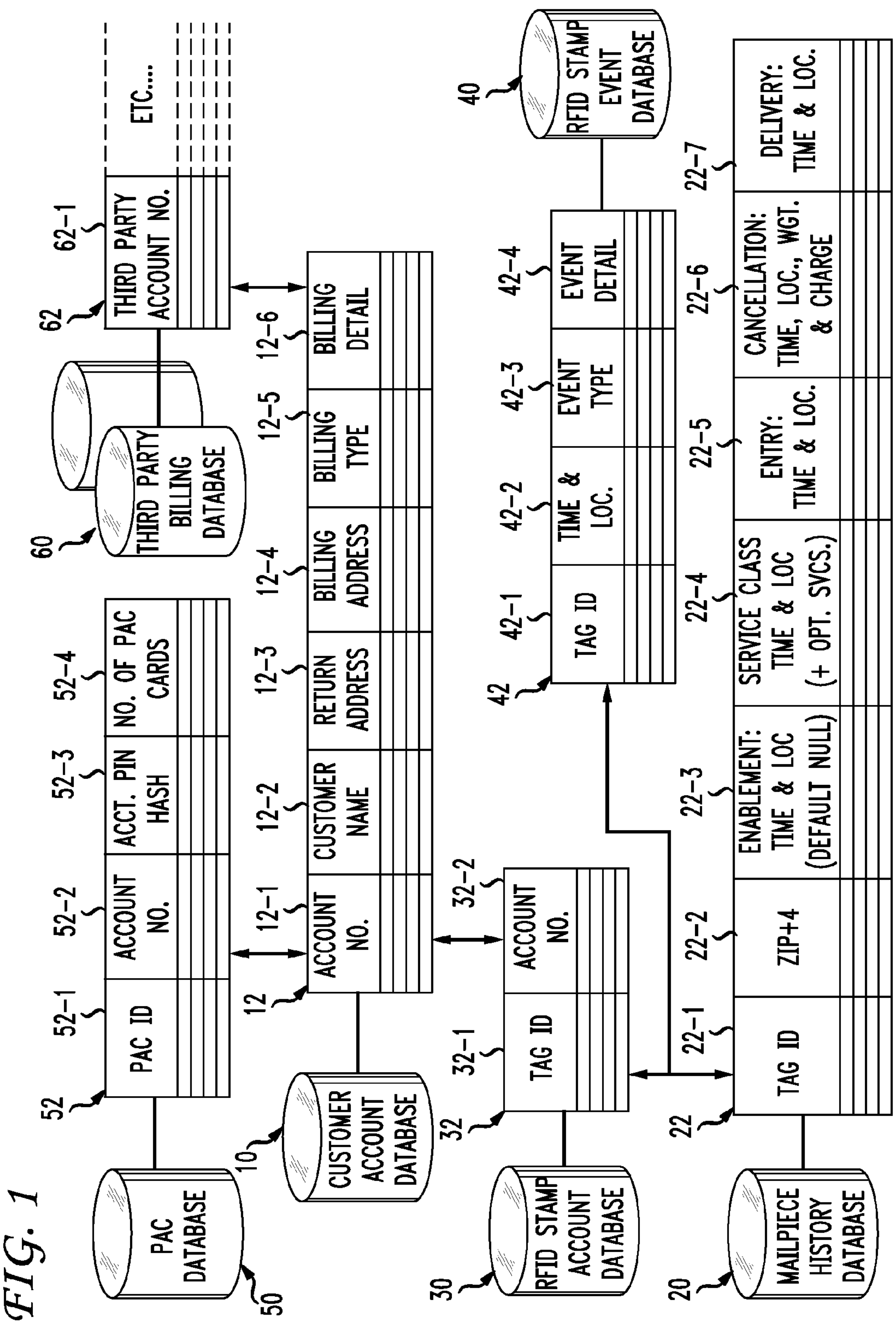
FIG. 1 illustrates an exemplary database architecture with common data fields arranged to support the use of RFID stamps in accordance with the present invention.
Figure 2A:
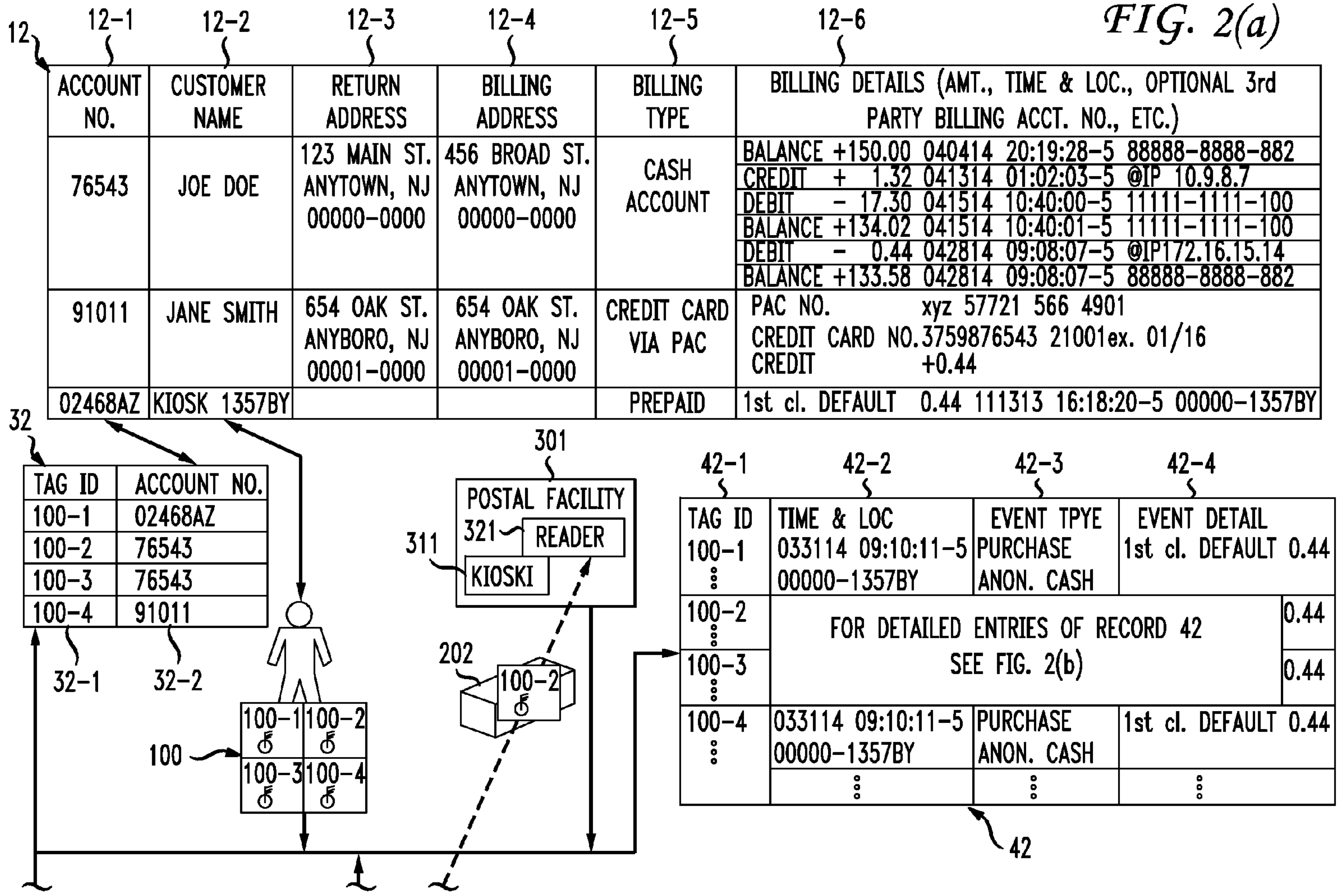
FIG. 2(*a*) is an arrangement illustrating various uses of RFID stamps in accordance with the present invention.

FIG. 1 illustrates an exemplary database architecture with common data fields arranged to support the use of RFID stamps in accordance with the present invention. As mentioned above, the utilization of RFID stamps in accordance with the present invention can eliminate the need for customers to predetermine postage fees (by instead billing an established customer account when the RFID stamp is used), provides a return address should the mail be undeliverable and also aids in expediting the routing of mail. Various other advantages of the present invention will be discussed hereinafter with reference to the following drawings.

In FIG. 1, a customer account database 10 is illustrated as forming an integral part of the inventive system. An exemplary customer record arrangement 12 of stored data is shown in conjunction with customer account database 10. Each customer record 12 includes the following fields: an account number in field 12-1 (assigned by the RFID postal entity system of the present invention), the customer's name (field 12-2), return address (field 12-3), billing address (field 12-4), billing type (field 12-5) and billing detail (field 12-6). It is to be understood that this particular configuration is exemplary only and various other arrangements of the customer account data may be used and stored in any other suitable arrangement within customer account database 10.

In this particular embodiment, the billing type field 12-5 may include the values of "cash account", "credit card", "debit card", or the like. The contents of the billing detail field 12-6 depend on the billing type. If the billing type is "cash account", a balance of the customer's account will be stored in billing detail field 12-6. In this mode, the customer will need to first deposit an amount set by the postal system as an account balance which is thereafter debited as postal charges are incurred. Preferably, the system will monitor the account balance and alert the customer when the balance drops below a predetermined threshold (for example, below $10).

Alternatively, the system could automatically bill a credit or debit card to maintain the account balance above a predetermined threshold; in this case the billing detail will include the card number as well as the cash balance. Otherwise, if the "billing type" is a credit or debit card, the billing detail field 12-6 will include the card account number. Credit or debit card charges will appear on the bill generated by the card issuer. The postal entity may use database 10 to issue periodic statements to customers, and the postal entity may provide means, such as a web portal, for customers to access their account information.

Advantageously, all purchases of RFID stamps can be recorded in the databases of FIG. 1, even in the event of an "anonymous" purchase by the end customer, i.e., non-postal entity account or physical cash transaction. The record of sale will be made through a retailer account.

Also shown in FIG. 1 is an exemplary RFID stamp mailpiece history database 20. As described above, each RFID "stamp" is in actuality a passive RFID tag, having a unique tag ID number (hereinafter referred to as a "tag ID"). When brought into the vicinity of an RFID reader, the antenna within the passive RFID tag will energize the memory element in the tag, retrieve the stored unique ID number and thereafter transmit the unique tag ID number back to the RFID reader. RFID stamp mailpiece history database 20 of the present invention is used to record certain status changes in association with all RFID stamp tag IDs, as well as the progress of RFID stamps as they pass through the postal system.

An exemplary record 22 that may be stored within database 20 is also shown in FIG. 1. Record 22 includes, as separate fields, the tag ID number (field 22-1), the destination ZIP+4 (field 22-2), the enablement status, i.e., times and locations of enablement, or "null" if not yet enabled (field 22-3), requested service class and any ancillary services as well as the time and location of the service requests (field 22-4), time and location of entry, i.e., first RFID interrogation by the postal entity (field 22-5), cancellation time and location, weight, charge for services (field 22-6), and delivery time and location (field 22-7). The overall "status" of the RFID stamp is recorded in fields 22-3 through 22-7. Other fields may be added to this exemplary record, e.g., arrival at and departure from sorting facilities.

To ensure privacy of customer financial information, the records in database 10 and database 20 have no fields in common. An exemplary RFID stamp account database 30 provides the linkage between them when required, as discussed below. Exemplary RFID stamp account database record arrangement 32 contains a tag ID (field 32-1) and a customer account number (field 32-2).

Additionally, FIG. 1 shows an exemplary RFID stamp event database 40 that maintains a comprehensive record, indexed by tag ID, of all the postal entity's RFID stamps. Exemplary record arrangement 42 includes the tag ID in field 42-1, event time and location in field 42-2, the event type in field 42-3, and event detail in field 42-4. Events that may be recorded include RFID stamp manufacture and delivery through the supply chain, registration, activation, retail sale, enablement, and steps in mailpiece handling. Some of these events result in changes in the operational status of an RFID stamp. RFID stamp event database 40 is the only place where all exemplary operational states are recorded. Information and control regarding certain states, such as registration and activation, may be restricted to the postal entity administration.

Finally, databases 50 and 60 are also depicted in FIG. 1. Database 50 is associated with a special postal customer account "card" used in accordance with the present invention. The use of this special "card" will be discussed later. Databases 60 are third-party billing databases, not maintained by the postal entity, but with which the exemplary postal entity RFID stamp database system of FIG. 1 must interact for credit card transactions and the like.

Databases 10 and 20 are essential to the inventive system architecture. Database 30 augments the method. In the exemplary database architecture of FIG. 1, database 30 interlocks databases 10, 20 and 40 in a manner that protects customer privacy. Database 40 further augments the method to extend it to global tracking of the RFID stamp lifecycle and postal entity service data mining.

In order to discuss the information of FIG. 2(*a*), certain concepts and notational conventions, in accordance with the present invention, will be explained. In the exemplary data field entries in records 12, 22 and 42 of FIGS. 2(*a*) and 2(*b*), event "times" are expressed as [month][day][year] (two digits each) followed by the local time [hour]:[minutes]:[seconds] with its offset in hours from Universal Time, and the term "location" takes on a variety of meanings depending on the context of its application in the data field. Types of locations include but are not limited to: a retailer ID number; a telephone number or an Internet Protocol (IP) address, in the case of a customer-initiated transaction; a postal entity truck number and its Global System Positioning (GPS) coordinates at the time of the event; a postal entity ID number tied to a postal facility such as a post office, a postal sorting facility, a sorting machine, a customer-facing kiosk, etc.

In an exemplary embodiment, an RFID stamp is assigned a selected default value, for example, first-class postage. This occurs when an RFID stamp is "activated". Once an RFID stamp has been activated, its status has changed. It is now useable for postage and may be sold to the end customer. When it is activated, a record 32 is created in RFID stamp account database 30, the record containing the tag ID in field 32-1 and the seller's account number in field 32-2. Simultaneously, a record 22 is created in mailpiece history database 20, the record containing the tag ID in field 22-1 and "1$^{st}$-class default prepaid", as well as the time and location of activation, in field 22-4. The location of activation corresponds to the retailer's "name" as it appears in field 12-2 of the seller's corresponding account record 12 in customer account database 10. Also, "prepaid" is recorded as the billing type in field 12-5. Upon activation, the retailer has purchased the RFID stamp, as recorded in field 12-6. The activation and subsequent sale to the end customer are simultaneously recorded in exemplary RFID stamp event database 40. It is possible for the retailer to sell RFID stamps to a customer who does not have a registered postal account, e.g., a simple cash purchase. This is one example of an anonymous purchase. In such a case, the stamps can only be traced back to the point-of-sale retailer.

When enablement occurs, the customer must provide his/her customer account number so that the proper correlation of tag ID number and customer account can be made. This will allow the postal entity to bill postage at the time of future services rendered. The tag ID is looked up in RFID stamp account database 30, and the customer account is written into field 32-2, replacing the seller's authorized retailer account. Completing this transaction, the customer account is credited with the RFID stamp's default value, in field 12-6 of record 12. The enablement event is a status change and is also recorded in database 40, record 42, field 42-3. Significantly, at this time, record 22 in mailpiece history database 20 is updated to contain the time and place of enablement in field 22-3; the destination ZIP+4 may also be entered (in field 22-2) if the customer chooses. Anyone can use RFID stamps with full legacy postage capabilities without having a registered postal account. But, RFID stamps have capabilities beyond legacy postage stamps or legacy metered postage, and the customer needs to enable an RFID stamp through an account to make full use of its latent powers. Otherwise, the RFID stamp retains the chosen default value selected at the time of its purchase.

Later, after the customer "affixes" an enabled RFID stamp on/in an item to be mailed, an RFID reader at a postal facility will interrogate the stamp and retrieve its tag ID. The item will be weighed and its postage calculated in accordance with the postal entity's protocols. Using the tag ID, the postal facility will query mailpiece history database 20 and retrieve a matching record 22; the weight and postage will be entered into field 22-6. The postal facility will again use the tag ID to interrogate RFID stamp account database 30 to retrieve the proper customer account number. The postal facility will then access customer account database 10, using the customer account number and bill the appropriate customer record 12 for the calculated postage. The postal entity processing events are likewise recorded in RFID stamp event database 40. The RFID stamp event database is a "write-once" database; events are added, but no data is ever replaced.

It is an advantage of the present invention that the sensitive data regarding a customer's billing information is maintained in a database separate from the RFID stamp account database (as well as any other database which may be included in the RFID system of the present invention), significantly reducing the possibility of this information being compromised. Furthermore, no sensitive information is derivable from the RFID tag ID without access to a postal entity database. Hence the tag ID may be freely transmitted as necessary, in the clear, during mail handling operations.

Figure 5A:
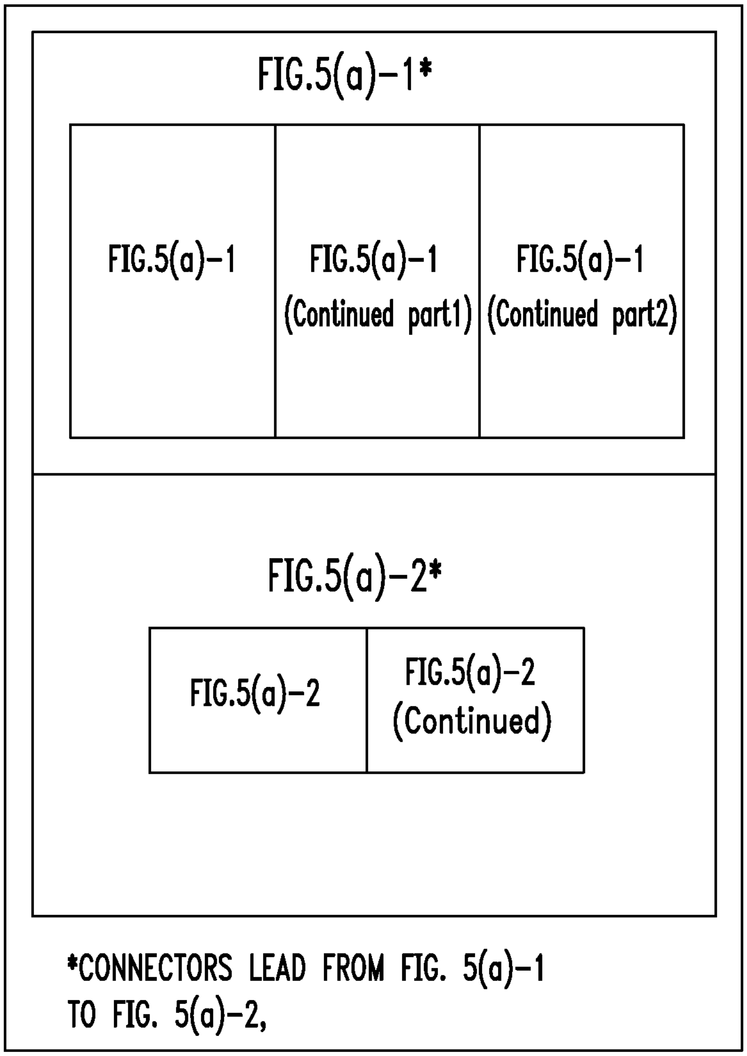
FIG. 5(*a*) contains a flowchart showing the activation and purchase portions of the lifecycle of an exemplary RFID stamp.
Figures 1, 5A:
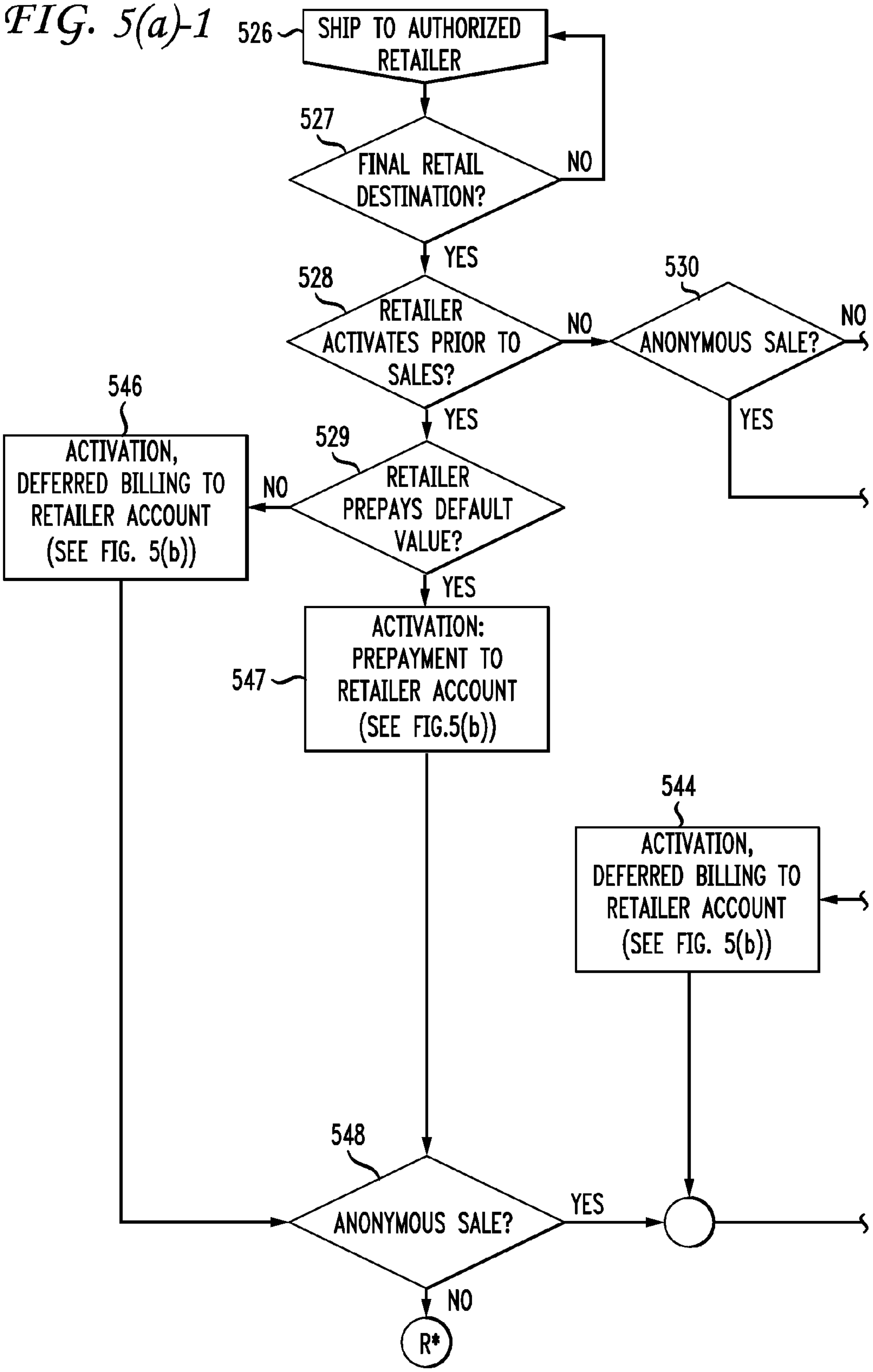
Figures 2, 5A:
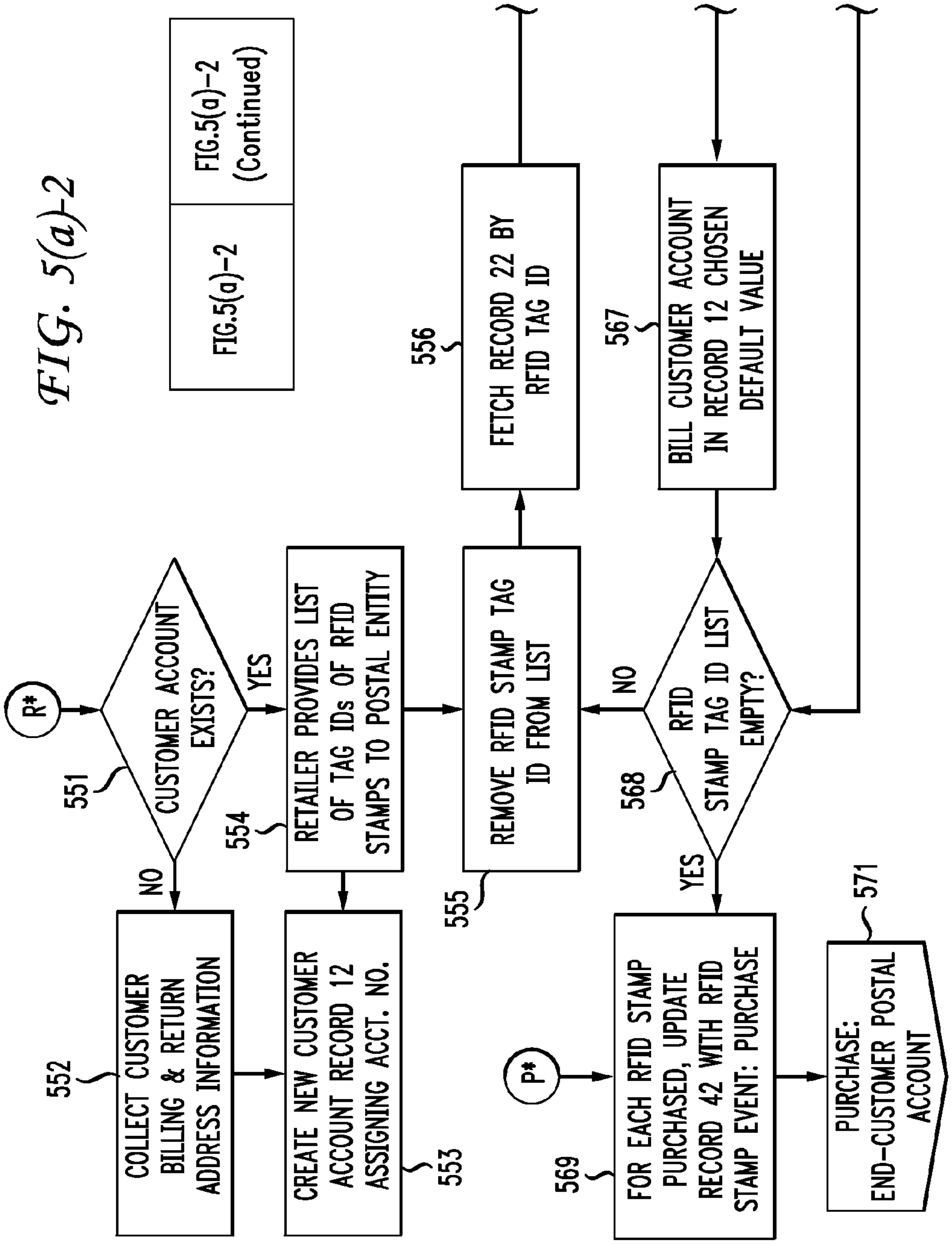
Figures 2, 5A:
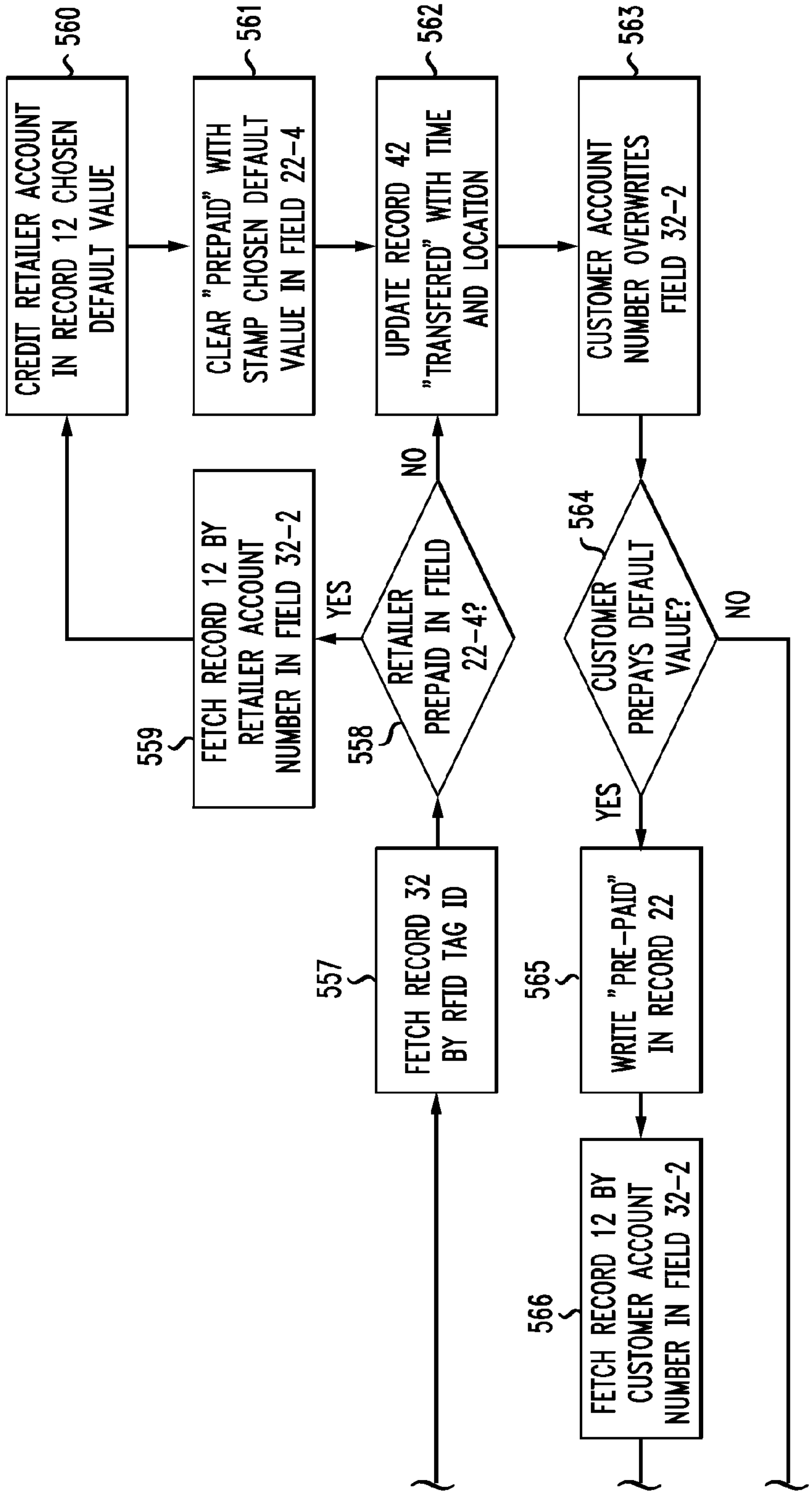
Figure 5B:
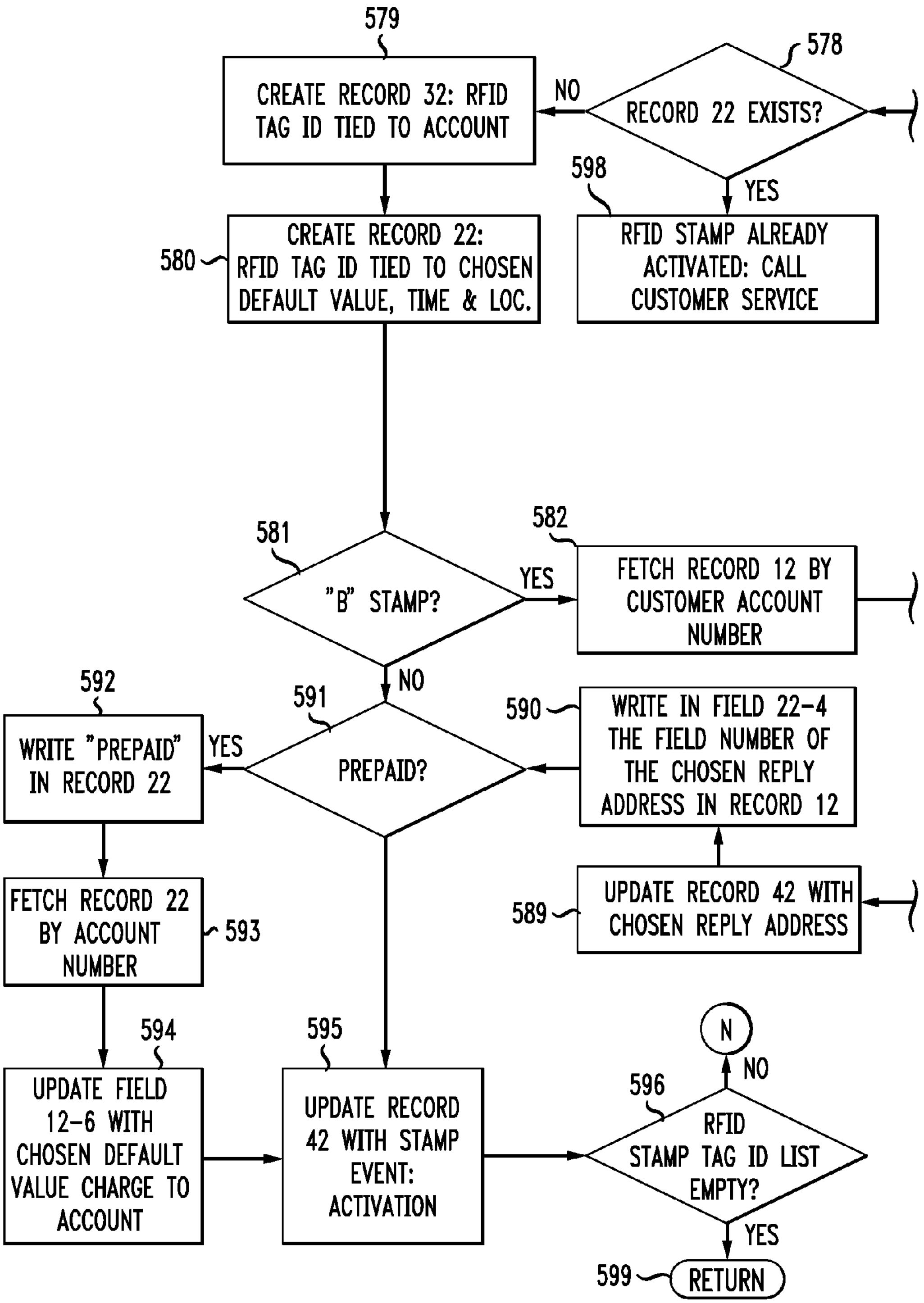

Four exemplary uses of RFID stamps of the present invention are illustrated in the diagram of FIG. 2(*a*) based upon the exemplary network of databases as described above in association with FIG. 1. This example will focus on a customer, "John Doe", who has purchased, using pocket change, a set of four RFID stamps 100, paying the default first-class postage rate for each one to the retailer. This is an example of an anonymous purchase. The time, place of purchase and value are recorded in RFID stamp event database 40. In this exemplary embodiment, the only permanent record of the anonymous sale, from the postal entity's point of view, is in database 40. The retailer purchase and activation of the stamps is not shown in FIG. 2(*a*) although it is available to her/him under her/his own account number in her/his own record 12. For the purposes of this example, John Doe uses stamp 100-1 for its default value, and "enables" the remainder, one of which (stamp 100-2) he will use to send an "Express Mail" package.

At the time of activation, a record 22 was created by the retailer for each of the four stamps in mailpiece history database 20, the record containing the tag ID in field 22-1 and "$1^{st}$-class default prepaid", along with the time and place of activation, in field 22-4. Simultaneously, a record 32 was also created for each stamp in RFID stamp account database 30, linking each tag ID in field 32-1 with the authorized retailer account in field 32-2. This is shown in the record 32 for stamp 100-1 in FIG. 2(*a*), where field 32-2 is linked to an authorized retailer account in record 12 of account database 10 (account no. 02468AZ), but in the case of stamps 100-2, 100-3 and 100-4, the authorized retailer account number has been overwritten because John Doe enabled them after purchase. The retailer activation information was written in RFID stamp event database 40 (see FIG. 2(*b*)) for all four RFID stamps as well. The information in records 12, 22 and 32 can be combined to produce an itemized bill of each stamp activated by the retailer.

A stamp is not useable until all the information mentioned above regarding activation is present in databases 20 and 30. Sometime soon after stamp 100-1 is deposited into the mail system, it is read by an RFID reader (RFID reader device not shown in FIG. 2(*a*) for stamp 100-1), and its tag ID is correlated with the record in mailpiece history database 20 that contains "$1^{st}$-class default prepaid" in field 22-4. The match indicates to the system that the RFID stamp is authentic and has been activated (a stolen RFID stamp can be detected and flagged).

Given that the RFID stamp is valid, the system examines other fields in record 22. In the case of stamp 100-1, field 22-2 at this moment in the processing is still empty because the ZIP+4 code has not yet been entered, and field 22-3 is blank since the RFID stamp has not been enabled. Next, as shown in FIG. 2(*a*), the system updates record 22 in mailpiece history database 20 containing the tag ID "100-1" in field 22-1 with the time of entry in field 22-5. In subsequent processing by the postal entity of the mailpiece to which tag "100-1" is "affixed", the delivery ZIP+4 will be entered in field 22-2 (by the postal entity), and the mailpiece's weight, time and location of cancellation will be entered in field 22-6. The charge is recorded as "default" in field 22-6, since this is a "default value" stamp. In this example, the mailpiece satisfied the requirements for "first-class letter" service and field 22-7 shows that it has been delivered. Fields 22-5 and 22-7 show the carrier truck on which the item was transported, and the time and location of handling.

To summarize, record 22 in FIG. 2(*a*) shows information for tag ID "100-1" in all status fields 22-3 through 22-7, namely, the stamp was not enabled (22-3), default first-class letter service was selected when the RFID stamp was activated (22-4), the mailpiece entered the system (22-5), the stamp was cancelled (22-6), and the mailpiece has been delivered (22-7). Note that the information in fields 22-5, 22-6 and 22-7 all results from RFID interrogations. Likewise, all of the information recorded about RFID stamp 100-1 in databases 10, 20 and 30 is simultaneously recorded, atomically, in record 42 of RFID stamp event database 40. The detailed description can be seen in FIG. 2(*b*).

In order to discuss the customer's (John Doe's) use of the remaining three RFID stamps that were purchased with cash, it is necessary to know that he also had previously established a "cash account" (account no. 76543) in which he maintains a balance with the inventive postal service. His specific customer account record 12 (shown in FIG. 2(*a*)) from database 10 was created when the account was established. His account number is in field 12-1 and his name is in field 12-2.

Billing type field 12-5 indicates "cash account" and billing data field 12-6 shows an initial account balance of $150.

When John Doe wishes to enable stamps 100-2, 100-3 and 100-4, he has his personal customer account number linked to their tag IDs in RFID stamp account database 30. The details of various of exemplary methods of enablement will be presented later. In any case, when John Doe enables his anonymously-purchased RFID stamps, his customer account number overwrites the retailer's account number that was recorded in field 32-2 when these stamps were activated by the retailer, and Doe's account gets a $0.44 credit per stamp, a total of $1.32 as shown in FIG. 2(*a*) in field 12-6 of record 12. Also, for each enabled tag ID, the event, "Enabled", appears in field 42-3 and the credit of $0.44 appears in field 42-4 (see FIG. 2(*b*)). Time and location, in this case, the online IP address of John Doe's transactions, are also recorded in records 12 and 42. This updated information in record 12 appears as a consequence of Doe changing his anonymous ownership of the stamp to one associated with a postal entity account.

The portion of database 30 storing the updated information is also shown in FIG. 2(*a*). This process ensures that a tag ID appears at most once in stamp account database 30, avoiding any ambiguity in how the stamp may be billed. The update events are all recorded in a record 42 in event database 40 (see FIGS. 1, 2(*a*) and 2(*b*)). All prior history of the tags is unchanged and retrievable from records 42 in event database 40 (see FIG. 2(*b*)), even though this information has been overwritten in stamp account database 30. Simultaneously with the updating of database 30, the records 22 of the tag ID numbers 100-2, 100-3 and 100-4 in mailpiece history database 20 are updated, as shown in FIG. 2(*a*), recording the time and location of enablement in field 22-3.

In the exemplary scenario above, John Doe enables his three RFID stamps via a non-postal entity IP connection. It is to be understood that he could also enable his RFID stamps at a postal entity customer facing facility. But, as will be demonstrated on later flowcharts, enablement and the "affixing" of an RFID stamp on an associated mailpiece may occur in either order and at any time from the time the customer activates/purchases the RFID stamp up until the item is deposited at a postal entity receptacle.

Continuing with an explanation of the inventive process, John Doe proceeds to "affix" the enabled RFID stamp 100-2 to an item 202 to be mailed. In the present example, it is presumed that John Doe has chosen a service class of "Express Mail", as indicated in field 22-4 shown in FIG. 2(*a*). This service choice overwrites the initial first-class-default choice. He then takes item 202 to a postal facility 301, and presents it at a kiosk 311 equipped with an RFID reader 321, where item 202 enters the system, as shown in field 22-5. Later, during processing, item 202 is read by RFID reader 322 (but possibly at a different postal facility 302, as in FIG. 2(*a*)), and the postage for item 202 is calculated based on the weight of the item, dimensions, class of service, and the like. For the purposes of the present invention it is presumed that item 202 is an "Express Mail" package with a postage fee of $17.30. Advantageously, the present invention makes the "Express Mail Flat Rate Envelope" obsolete, since the postage can be billed automatically and precisely for each mailpiece.

In accordance with the present invention, John Doe is billed for this postage through the RFID stamp 100-2 associated tag ID that was retrieved at the postal entity RFID reader 322. Using this tag ID, "100-2", the postal system queries mailpiece history database 20 and retrieves the matching record. At this moment, the system recognizes that RFID stamp 100-2 has been enabled (field 22-3), but not cancelled.

It then proceeds to query RFID stamp account database 30 and retrieves John Doe's account number (in this example, shown as 76543). The system accesses customer account database 10 using this account number, retrieving John Doe's account information and debiting his cash balance $17.30. Record 12-6 also shows that the account was credited $1.32 when John Doe enabled the three RFID stamps. This results in an account balance of $134.02. RFID stamp database 20 is again accessed once the transaction has been completed, and the cancellation of RFID stamp 100-2 is recorded in field 22-6 as indicated in FIG. 2(*a*). All of these transactions in databases 10, 20, 30 and 40 are atomic. In this example, item 202 is delivered. In the present embodiment, the delivery date and time, truck number and GPS coordinates are recorded in field 22-7 by means of an RFID reader at the truck.

However, had item 202 turned out to be "undeliverable", RFID stamp 100-2 could be read again, the tag ID retrieved and used to ultimately access the customer account record 12 in database 10 in order to find John Doe's return address and properly return item 202. The ZIP+4 of John Doe's return address would overwrite the destination ZIP+4 in field 22-2 of record 22. If the return address is not already present on the envelope, it could be printed from the information in record 12. This capability should reduce the incidence of "dead" letters. Advantageously, the postal entity is able to automatically charge for returning an item with an enabled RFID stamp; an extra charge could be imposed for having to print the return address. The postal entity may augment the original class-of-service field 22-4 with an undeliverable mail endorsement and assign a new charge in field 12-6 of record 12. All these database transactions are also recorded in database 40.

In the exemplary embodiment of customer record 12 shown in FIG. 2(*a*), both the calculated postage (in this case $17.30 for an Express Mail flat rate envelope) and account balance information are stored and can later be retrieved by the customer for audit or other purposes. Furthermore, the postal entity may provide the customer with means (such as a web server) for determining the status of item 202 in record 22, given its tag ID; if status reporting is not included in a mailpiece's class of service, the postal entity could impose a charge for it at the time such a report was made. Also, as an alternative to debiting a postal "cash account", a customer's credit card information (or other third-party billing means) may be stored in customer account database 10, and a charge created for each postage transaction, this charge is then transmitted to a third-party billing database (shown in FIG. 1 as database 60) associated with the customer. Complete and continuous database updates and service-related events concerning RFID stamp 100-2 are also recorded in record 42 of RFID stamp event database 40 (see FIG. 2(*b*)).

As a further illustration of features of the inventive RFID postage stamp system, John Doe selects special services and handling for an item to be mailed using enabled RFID stamp 100-3. Using the postal entity's web portal, he chooses insured, priority mail, and requests home pickup; this information is recorded in field 22-4 of database 20 (see FIG. 2(*a*)). Advantageously, his home address is known to the postal entity through database 10 and since stamp 100-3 has been enabled, the mailpiece can be accepted without first being weighed. In addition, Doe is able to provide the destination zip code for his mailpiece (this information being recorded in field 22-2 of database 20 as shown in FIG. 2(*a*)), saving labor for the postal entity for which John Doe may be given a discount. The mailpiece is picked up and enters the postal system when it is read at an RFID-reader-equipped postal entity truck, as recorded in field 22-5 of database 20. The mailpiece can be traced from this point forward, even though the mailpiece has not yet passed through the weighing and sorting facility, and no charges have yet been incurred. The detailed history of RFID stamp 100-3 can be found in the corresponding record 42 of database 40 (see FIG. 2(*b*)).

When the customer deposits a mailpiece, i.e., relinquishes it into the control of the postal entity, that moment is not necessarily recorded in the databases. Rather, the first time the RFID stamp "affixed" to a deposited item is interrogated by a postal entity RFID reader is recorded as "entry" into the postal system. In these examples, there have been several venues for entry. Venues include but are not limited to presentation at a postal-entity RFID-reader-equipped service counter, deposit at an RFID-enabled mailbox/kiosk, pickup by a letter carrier with a hand-held RFID reader or at the carrier's RFID-reader-enabled mail truck. If the postal-entity RFID reader is not associated with a fixed facility, the location of the reception point may be recorded using GPS coordinates.

To conclude the discussion of RFID stamps 100-1 through 100-4, John Doe wishes to give a non-enabled stamp to Jane Smith, but his remaining RFID stamp 100-4 is still enabled. Accordingly, he uses the postal entity's web portal to disable RFID stamp 100-4, at which time it reverts to its default first-class value; its enablement field 22-3 in record 22 is cleared, an event of type "disabled" is recorded in record 42 of database 40 (see FIG. 2(*b*)), $0.44 is debited from Doe's account in field 12-6 of record 12, while field 32-2 of record 32 remains John Doe's account number. Doe then gives RFID stamp 100-4 to Smith, who subsequently accesses the postal entity's web portal from her own computer to enable RFID stamp 100-4 to her own postal account; the time and place of the new enablement are written into the currently empty field 22-3 of record 22. Smith's account is entered into field 32-2 of record 32 (overwriting Doe's account). Smith's account is credited $0.44 in field 12-6 of record 12, and an event of type "enabled" is recorded in record 42 of database 40 (see FIG. 2(*b*)). Note that the original anonymous cash purchase information pertaining to RFID stamp 100-4 and all changes of its status are still available in record 42. The final state of RFID stamp 100-4 is shown in records 22 and 32 in FIG. 2(*a*).

In this exemplary embodiment, certain fields of records 22 and 32, in mailpiece history database 20 and in RFID stamp account database 30, respectively, are overwritten to reflect the current status of the RFID stamp and any associated mailpiece. Nevertheless, the previous content of these fields can still be recovered from record 42 of RFID stamp event database 40 (see FIG. 2(*b*)). Database 40 is a continuous journal of all events pertaining to an RFID stamp, beginning with its manufacture. Event types include, but are not limited to: manufacture, shipment to a distribution center, registration with the postal system, shipment to an authorized retailer, reception by an authorized retailer, activation by a retailer and purchase by an end-user. These events are shown in FIG. 2(*b*), along with the other service-related events that have been discussed above. In particular, record 42 of RFID stamp 100-4 shows its original anonymous purchase, enablement, disablement, and subsequent re-enablement. Other events that the postal entity may find useful for service and process monitoring include, but are not limited to, reception at, and dispatch from, a regional postal facility; and processing by sorting equipment.

Since RFID tags can be automatically read as they pass by postal entity RFID readers, it is possible (without additional labor) to trace mail in both space and time as it passes through the postal system from collection box to truck, to post office, to sorting equipment, to a second truck for further transportation, etc., until it leaves the letter carrier truck for final delivery. A separate RFID stamp event database has been created and may be used to store this information. Record 42 contains multiple, sequential fields of timestamps and tag location information (in GPS form, for example). With this information, it is therefore possible to track the progress of the stamp from (for example) time of enablement until cancellation. Furthermore, for the benefit of postal entity service management, a more extensive history of transport and routing events could be kept in database 40 than in database 20. Indeed, since each RFID stamp includes a unique tag ID, any event associated with a stamp can be recorded from the time the ID number is first encoded within the stamp.

It is also to be noted that RFID stamps on multiple mailpieces can be read simultaneously without having to be individually scanned. Thus, an entire bin or tray of mailpieces can be interrogated and the data retrieved in an efficient manner. "Sanity" checks are possible at each stage in the delivery process, where close tracking may improve reliability without increasing labor costs. Moreover, any suspicious letter or package can be instantly traced through the mailpiece's associated RFID stamp tag ID(s) in its (their) record(s) 42 back to the item's point of origin (even if its declared "return address" is fraudulent). Data mining possibilities for the postal service are numerous.

It is obvious from the above discussion that a critical element in the process of utilizing RFID stamps in accordance with the present invention is the ability to properly link each RFID stamp with the proper customer account (e.g., in order to perform the "enablement" operation). In a straightforward fashion, if a customer knows her/his account number, the enablement process may proceed either by interrogating the RFID stamp with an RFID reader or by providing its tag ID through other means, and then recording both this tag ID and the customer account number in RFID stamp account database 30. It is unrealistic that most customers will memorize their postal account number or even desire to try to remember this number.

Therefore, in further accordance with the present invention, a postal account card (or key fob or other suitable device) may be created for each customer, with the customer's account number embedded magnetically or stored as yet a different passive RFID tag, in much the same way as a bank card, discount card or the like. FIG. 1 illustrates an exemplary postal account card (PAC) database 50 which may be created and used in conjunction with previously-described databases 10, 20 and 30 to simplify the utilization of RFID stamps in accordance with the present invention. An exemplary record 52 from database 50 is shown in FIG. 1 as including a PAC ID number (that is, a number stored on the card itself) in field 52-1, the associated customer account number in field 52-2 and, perhaps, a "hash" of a customer PIN number associated with the customer account number in field 52-3 (the use of a PIN number is considered to add another layer of security to the postal billing system). Record 52 also stores, in field 52-4, the number of PAC cards associated with the postal account number in field 52-2. This allows a postal account to have a plurality of PAC cards associated with it. For instance, a business may use this feature to give PAC cards, each with its own PAC ID, to its employees who send mail on the company's postal account. In this embodiment, a subset of the digits of the PAC ID may serve as a sequence number which must be less than or equal to the number of PAC cards stored in field 52-4.

Thus, when the customer uses his/her PAC to enable one or more RFID stamps, he/she may simply present his/her fob to a reader, 'swipe' his/her card or the like, and enter a PIN number (if used). The system performs a search of PAC database 50 using the retrieved PAC ID number and finds the proper customer record 52. As a security check, a hash is performed on the PIN number supplied by the customer and compared to the hash value stored in field 52-3. If these match, the process then retrieves the customer account number from field 52-2 and continues to perform the exemplary "enablement" steps as outlined above in the discussion of RFID stamps 100-2, 100-3 and 100-4. Use of a PAC will be recorded as a billing detail in field 12-6 of record 12. In the example of customer Jane Smith, her billing detail field 12-6 indicates that she has tied her PAC card to a third-party billing account. In this example, RFID stamp 100-4 has been enabled, but has not yet been utilized, so field 12-6 shows a first-class-default credit of $0.44, the value of John Doe's original anonymous purchase of 100-4. In general, a postal-entity RFID-reader-equipped facility could simultaneously read RFID stamp tag IDs as well as the customer's RFID based PAC card, thus advantageously expediting the association of the account with the stamp transactions for the customer.

In another embodiment of the present invention, it is contemplated that a kiosk-type arrangement with an RFID reader may be used for data entry by a customer. For example, a customer may "affix" an RFID postage stamp to a mailpiece, address the mailpiece and bring it into the vicinity of the RFID reader on the mailbox/kiosk, where the RFID reader interrogates the tag and determines its ID number. The mailbox may include a keypad allowing the customer to enable the RFID stamp (using her/his PAC card, for example), select services (such as express delivery, insurance, etc.) and enter the ZIP+4 information to be associated with the mailpiece. In this case, the ZIP+4 information is stored in a separate field in the specific record for that tag ID (see field 22-2 in record 22 of database 20). By having the customer include the ZIP+4 information in a linked fashion with the tag ID, this information can be automatically retrieved at the postal entity facility without the need for a postal entity employee to perform the repetitive data entry task associated with entering the ZIP+4 information. Following service selection and any supplementary data submitted at the mailbox/kiosk, the customer may deposit the mailpiece, at which time the RFID reader on the mailbox/kiosk may record, in field 22-5 of record 22, the mailpiece's entry into the system.

In accordance with one aspect of the present invention, the RFID stamps of the present invention may be included on commonly-purchased envelopes or packaging (e.g., greeting cards, business envelopes, business packaging, and the like), being in their initial "non-enabled" state. The sale price of such items may include the default value of the embedded RFID stamp, or, in the case of certain items such as large greeting cards, the amount of required extra postage may be included if known. The purchaser may then at any later time enable any stamp as needed (where, as each one is enabled, its tag ID and the purchaser's account information are stored in RFID stamp account database 30). If one or more of the stamps are never enabled, they will retain their default value (e.g., that of a "first class" stamp).

In yet another embodiment of the present invention, the RFID postage stamps may be purchased in "pairs" that will be linked together in the database system after entry during processing by the postal entity. In this case, the first stamp in the pair (defined as stamp A) is used as the initial postage for a mailpiece sent to a recipient. The second stamp (stamp B) is included within the mailpiece, perhaps attached as postage on a 'self-addressed stamped envelope'. The "B" stamp tag ID may contain a distinct pattern, e.g., a specific prefix, that distinguishes it from an "A" stamp tag ID or any other RFID stamp category. Since both stamps will be detected by an RFID reader upon mailing, the specific indication of it being an A+B pair will automatically cause the system to use the "A" stamp for the initial postage value, and it alone will be entered, canceled, etc. at that time and the "B" stamp will be marked (in its record 22) as having been seen with the carrier "A" stamp; thereafter the "B" stamp may be used for the reply postage. Inasmuch as the "B" stamp is already associated with the customer's reply address, the address with the destination ZIP+4 on the reply envelope could be pre-printed automatically based on information fetched through the RFID stamp tag ID as a special service of the postal entity. When the "B" stamp is utilized separately on a mailpiece its tag ID will prevent the use for anything but the "B" stamp purchaser's chosen reply. The "B" stamp may or may not be enabled. A non-enabled first-class-default "B" stamp would be appropriate for ordinary correspondence but an enabled "B" stamp could handle return merchandise, of undetermined weight, to a mail-order retailer, for example.

In a generalization of this embodiment, the "A" stamp may be placed on a mailpiece in which a plurality of "B" stamps B1, . . . , Bn, each of which functions as reply postage, are enclosed. For example, this feature could be used by a business that solicits periodic reply mail from its customers (e.g., a bank receiving mortgage payments).

In discussing the present invention, the examples have focused on the retail consumer, for whom it is appropriate that a non-enabled RFID stamp have a default first-class value. In another embodiment, it is possible that other entities, such as businesses, non-profit organizations, or government agencies, may utilize RFID stamps with specialized default values, such as bulk rate, first-class presorted, etc. In a further optimization, businesses with large volumes of reply mail could arrange for the production of specially formatted ZIP+4 RFID tag "B" stamps to aid in expediting routing of reply mail. Such "super B" RFID stamps may be sold though special sales channels, and have special service classes that may be shown in field 22-4 of record 22 and in record 12 (see FIG. 2(*a*)). For example, the service class "first-class presorted" would be recorded in field 22-4 of record 22, and the billing detail 12-6 may be "first-class presorted default $0.335". More generally, specially formatted RFID stamp tag IDs may aid in handling of special classes of mail such as congressional mail. Such RFID stamps may have a special code within their RFID tag IDs.

Furthermore, the postal entity may allow businesses, through purchase of a permit, to obtain RFID stamps with no default value, the default value would be applied later when activated. The customer name 12-1 of record 12 may include the permit number. An RFID stamp with no default value, that is not associated with a postal account (hence, not enabled) is "inactive". An RFID stamp must be activated (at a default value) prior to being used or enabled. Advantageously, limited enablement (i.e., up to a maximum charge) may be supported (e.g., an RFID stamp could be enabled for merchandise return, but only for a weight not exceeding that of the items shipped originally). This would allow a business to improve cash flow by paying for postage only as it is used.

In another example, a charity or non-profit organization may utilize the A+B1, . . . , Bn embodiment discussed above to send a packet (charged to the "A" stamp) containing a plurality of reply-postage-stamped envelopes (i.e., containing "B" stamps) to a distribution point, such as a house of worship, and later, only those reply envelopes used would be charged to the charity/non-profit, at their special permit rate.

Non-activated RFID stamps, i.e., non-enabled with no default value, can safely be mailed (inside a package) through the inventive RFID postal system. This allows authorized retailers or the postal entity itself to mail stamps, perhaps as part of a more extensive service. For example, a printer could prepare wedding invitations with RSVP inserts for a customer, providing each invitation and its insert with an A+B stamp pair as described above; the A+B pairs are not activated, having no default value, so the print job can be mailed to the customer. The printer could provide the customer with an authorization code, so that when the print job is received, the customer can, via the postal entity's website, claim ownership of the enclosed RFID stamps and activate them. At least two billing options are available. The customer could have prepaid first-class postage to the printer, the printer forwarding the postage to the postal entity, or the customer could be charged directly through his/her postal account when the invitations and, later, the RSVPs are cancelled. In both cases, the tag IDs of the "A" and the "B" stamps appear in field 32-1 of record 32 in association with the customer's postal account number in field 32-2. Hence the return address for the "B" stamps will be taken from the customer's postal account record 12 and the RSVPs will return to the customer and not to the printer. Other arrangements for activation and billing are possible, but, in general, "A+B" sets and "B" stamps cannot be sold directly to clients without a registered postal entity account. In other words, "A+B" sets cannot be sold to an "anonymous" customer.

In the event that the customer has special mail delivery requirements such as change of address or temporary forwarding of her/his mail, it is presumed that the information in the customer's account record 12 may be updated through means provided by the postal entity, such as a web portal. Endorsements for such special requests may be automatically printed on mailpieces destined for said customer. In a similar vein, means are provided by the postal entity for the customer to update account information such as billing address, credit or debit card numbers, etc., as needed.

The exemplary embodiments of the present invention have up to now been described from a customer-centric point of view. A more system-centric, operational, point of view follows. The life cycle of an RFID stamp begins long before it reaches the end user. In an exemplary embodiment, RFID stamps are ordered by the postal entity from one or more manufacturers, their tag IDs established by a common agreement. Freshly manufactured RFID stamps become known to the system upon creation of their records 42 in RFID stamp event database 40 (see FIG. 2(*b*)), but at this point they have not been registered nor activated and they have no monetary value. Thus they may pass through the supply chain to a retailer or other distribution point without being inadvertently cancelled, and without risking theft of valid RFID stamps, as per the embodiment concerning shipment of non-activated no-default-value RFID stamps.

At some point the postal entity "registers" the RFID stamps into its inventory. Registration is an event that is recorded in records 42 (see FIG. 2(*b*)). This may be after the RFID stamps are received at the postal entity's warehouse, or upon notice that the RFID stamps have been shipped from the manufacturer directly to an authorized third-party distributor or retailer. Finally, in order for the RFID stamps to become useable, they must be "activated" at their agreed face value (i.e., "franked", in most cases for the first-class default value) by the postal entity.

Upon activation, the party in possession, e.g., the retailer, is obligated to pay the agreed face value of the RFID stamps, and records 32 may be created in RFID stamp account database 30 with the tag IDs in fields 32-1 and the authorized retailer account in fields 32-2. This is the first time that the tag IDs appear in association with an account number. Simultaneously, records 22 are created in mailpiece history database 20 containing the tag IDs in fields 22-1, with the selected default service class and the time and location of activation stored in fields 22-4. The activation events are also recorded in records 42.

Figure 3:
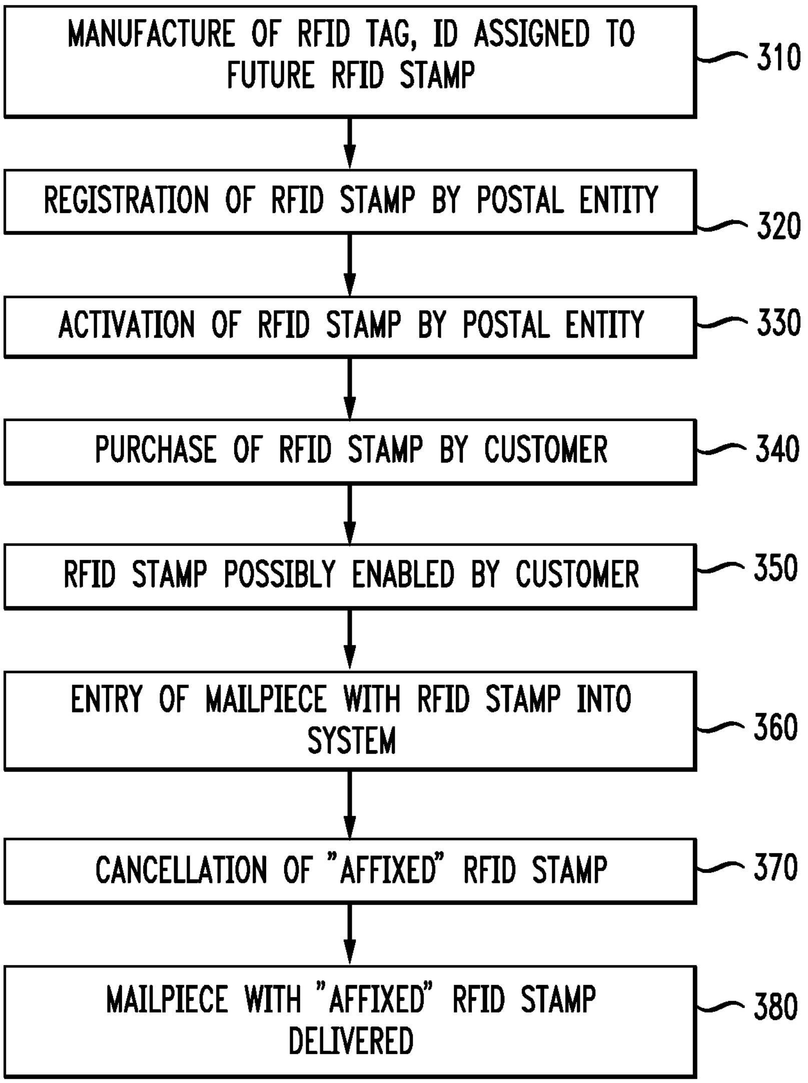
FIG. 3 contains a flowchart illustrating a sequence of exemplary operational states of the complete lifecycle of an RFID stamp in accordance with the present invention.

A sequence of exemplary operational states of the complete lifecycle of an RFID stamp is given in FIG. 3. The essential pre-purchase states in the RFID stamp lifecycle include, but are not limited to, MANUFACTURE (state 310), REGISTRATION (state 320) and ACTIVATION (state 330). They occur separately in this exemplary embodiment, but two or more of them could occur simultaneously in alternative embodiments. These states along with their associated database records were introduced above and shown in field 42-3 of FIG. 2(*b*). In state 340, the RFID stamp PURCHASE is made by a customer (a retailer or an end user), who may decide to ENABLE the RFID stamp in state 350. In state 360, the ENTRY of an RFID stamp with its associated mailpiece is recorded when the item has physically entered the postal system. This record is made at the time of the first RFID interrogation by the postal entity. It is not necessarily the same as the time of physical deposit of the mailpiece. State 370 occurs at the CANCELLATION of the RFID stamp. State 380 is the DELIVERY to the addressee; this is equivalent to the mailpiece's exit from the postal system.

Figure 4:
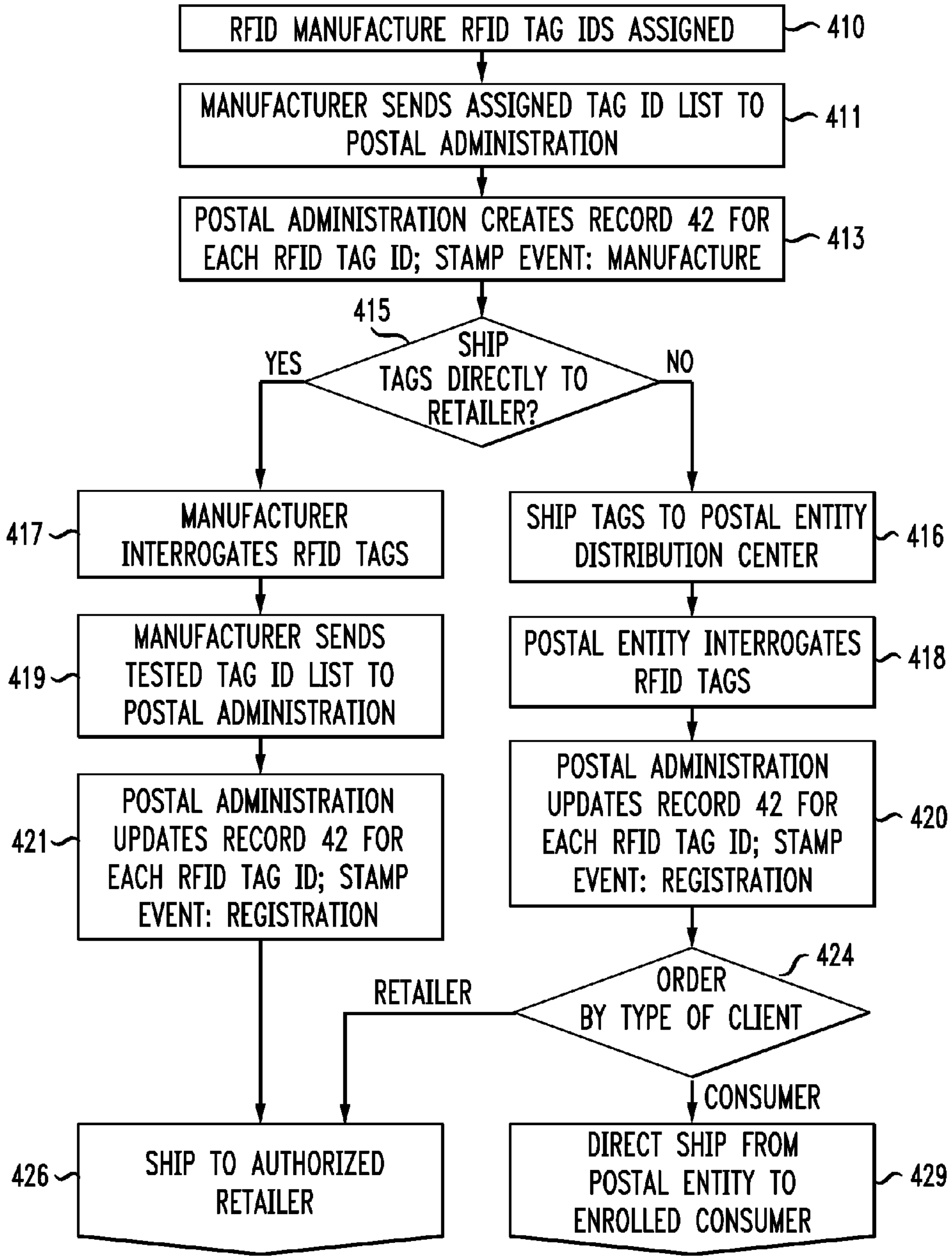
FIG. 4 is a flowchart of a summary of the process of the RFID stamp lifecycle state changes from manufacture to registration, as shown in FIG. 3, as presented in an exemplary supply chain.

A summary of the process of the lifecycle state changes from manufacture to registration, shown in FIG. 3, is presented in an exemplary supply chain in FIG. 4. The RFID stamps are manufactured in step 410, and their tag IDs are stored in inventory management databases shared between the manufacturer and the postal entity administration (step 411). In step 413 the postal entity administration creates, for each tag ID, a record 42 in RFID stamp event database 40, storing an event of type MANUFACTURE. These RFID stamps are now known to the postal entity (see FIG. 2(*b*). The new stamps may be drop-shipped directly to a retailer (decision 415); in this case, the manufacturer interrogates the tags (step 417) and transmits the list of tested tag IDs to the postal entity administration (step 419), who updates each tag's record 42 with an event of type REGISTRATION in step 421 (see FIG. 2(*b*)); the tags are then shipped to a retailer in step 426. Otherwise, the RFID stamps will be shipped to the postal entity distribution center in step 416, and the postal entity will interrogate the stamps (step 418) and register them in the manner described above (step 420).

Shipment of a tag from the manufacturer (step 416 or 426) may be recorded in the both of the inventory databases, as well as recorded as a "shipment" event in record 42 of the postal entity's database 40 (see FIG. 2(*b*)). REGISTRATION (in step 420 or 421) serves as confirmation that each RFID stamp in the inventory database actually functions and has been shipped as promised by the manufacturer. Advantageously, the RFID stamps may be interrogated in bulk. At decision 424, the postal entity may either ship directly to an enrolled consumer in step 429, or to an authorized retailer in step 426 (a "retailer" may be a postal-entity retail venue). Shipment of a tag from the postal entity (step 429) may be recorded as a "shipment" event in record 42 of the postal entity's database 40 (see FIG. 2(*b*)); this information is unlikely to be shared with the manufacturer. An "enrolled customer" is a consumer who has a valid postal account. In all cases, shipping may employ the exemplary A+B1, . . . , Bn non-activated no-default-value RFID stamp embodiment. Newly issued RFID stamps have no face value, and therefore cannot be used for postage, until the retailer or client acknowledges delivery and activates them through the postal entity.

The lifecycle of an exemplary RFID stamp continues in FIG. 5(*a*) with exemplary choices for activation ending in the purchase of RFID stamps. The exemplary atomic process of activation is detailed on FIG. 5(*b*). Recall that there were two classes of shipment at the end of FIG. 4, ship to an authorized retailer and the postal entity ships directly to an enrolled end consumer. If the RFID stamps were shipped directly to the end customer, the logical thread enters at step 536 and proceeds to decision 537 where the end customer chooses whether or not to prepay the RFID stamps' chosen default value when activating them per the code received with delivery; if yes, ACTIVATION of the stamps occurs with prepayment in step 538 (per routine in FIG. 5(*b*)), otherwise, ACTIVATION proceeds with deferred billing in step 539 (per routine in FIG. 5(*b*)). ACTIVATION by the end customer can only occur after receipt to prevent premature cancellation of the stamps. In either case, the process continues via the labeled connector P to step 569 on FIG. 5(*a*) where record 42 is updated with a PURCHASE event by the RFID stamp tag ID and this thread then flows off the figure in step 571, following the path for "PURCHASE through end-customer postal account". In this embodiment, a direct-ship consumer cannot be anonymous.

For the case of the RFID stamps shipped to an authorized retailer (including a retail venue belonging to the postal entity), the thread enters in step 526 and proceeds to decision 527 where any further distribution and shipping steps may take place, such intermediate shipping steps being recorded on record 42, although not indicated on the flowchart. When the RFID stamps have reached their final destination, the retailer chooses at decision 528 whether or not to activate the RFID stamps prior to sale. If not, the next choice is at decision 530, where the sale is determined to be anonymous or not.

An anonymous sale is not limited to a cash sale. It may include a sale made on any credit or debit card not enrolled in a postal entity account, yet honored by the retailer. If the sale is to be on a postal account (i.e., not anonymous), the thread proceeds to decision 531 where the customer may enroll in a postal account if he/she does not already have one. If an account does not exist, the customer provides his/her billing and return address information in step 532, and in step 533, a new customer account record 12 is created with his/her newly assigned account number.

Once the postal account has been created (or, alternatively, if the customer had a pre-existing postal account), the next step is 534, where shipment of the RFID stamps to the customer may be requested. If requested, shipment takes place in step 535 and proceeds to decision 537. Shipment of a tag from a retailer (step 535) may be recorded as a "shipment" event in record 42 of the postal entity's database 40 (see FIG. 2(*b*)). Otherwise, if no shipping is required, the thread proceeds directly to decision 537. At decision 537 the thread continues with choices—pre-paid or deferred billing—for ACTIVATION (step 538 or step 539) as for the direct-ship customer discussed above.

Returning to the alternative decision at step 530, where the sale is anonymous, the thread proceeds to decision 540. Here shipment may be requested by the customer; if requested, shipment takes place in step 541. Shipment of a tag from a retailer (step 541) may be recorded as a "shipment" event in record 42 of the postal entity's database 40 (see FIG. 2(*b*)). At the next step 542, this type of customer must necessarily request the retailer to activate the stamps for her/him, because the purchase was made anonymously.

By contrast, an enrolled customer may activate the stamps him/herself after they are delivered, using an authorization code provided by the retailer, thereby typing the stamps' tag IDs with his/her postal account number (see steps 538 and 539). Regardless of the shipping decision taken at step 540, the thread proceeds to decision 543, where the retailer chooses whether or not to prepay the RFID stamps' default value when activating them post-sale; if yes, ACTIVATION (per routine in FIG. 5(*b*)) with prepayment and credit to the authorized retailer account takes place at step 545; otherwise, ACTIVATION with deferred billing to the retailer's account takes place at step 544.

In either case, the anonymous PURCHASE is completed in step 549 where the end customer pays the retailer for the RFID stamps. Record 42 is then updated with a PURCHASE event by the RFID stamp tag ID in step 550 and this thread then flows off of FIG. 5(*a*) in step 570, following the path for "PURCHASE by an anonymous customer".

Finally, picking up the alternate path at decision 528, the retailer could activate the RFID stamps prior to sale. The retailer must first choose, at decision 529, whether or not to prepay the RFID stamps' default value; if yes, ACTIVATION, with prepayment and credit to the authorized retailer account takes place in step 547; otherwise, ACTIVATION with deferred billing to the retailer's account takes place in step 546. In either case the thread then proceeds to decision 548. If the sale is anonymous, the thread proceeds to step 549 where the end customer pays the retailer, and a record 42 is written to indicate a PURCHASE at step 550. Then the thread flows off FIG. 5(*a*) at step 570. Otherwise, if the sale is to be on a postal account (i.e., not anonymous), the thread proceeds to decision 551 on FIG. 5(*a*) via connector R where the customer may enroll in a postal account if she/he does not already have one. If an account does not exist, the customer provides her/his billing and return address information in step 552, and in step 553, a new customer account record 12 is created with her/his newly assigned account number.

Once the postal account has been created (or, alternatively, if the customer had a pre-existing postal account), the system must transfer the RFID stamps from the retailer's account to the end customer's account. In order for this to happen, the retailer must first get credit for any pre-paid RFID stamps, and the end customer must either pre-pay or accept deferred payment obligations. Thus, the retailer provides a list of the stamps to be sold in step 554. Processing of the information begins at step 555, where an RFID stamp tag ID is removed from the list. Records 22 and 32 are fetched by this tag ID in steps 556 and 557. At decision 558, it is determined whether or not the retailer prepaid the stamp's default value (indicated in field 22-4). If the RFID stamp was pre-paid by the retailer, record 12 is fetched in step 559 using the retailer's account number in field 32-2 of record 32. Subsequently, the retailer is credited for the stamp's default value in step 560. Next in step 561, the "pre-paid" marker in field 22-4 is cleared. Then, or alternatively, if the retailer had not prepaid the stamp's default value at decision 558, record 42 is updated with the "transferred" indication including the time and location of the transaction in step 562. Next in step 563, the customer's account number overwrites the retailer's account number in field 32-2 of record 32.

Then, at decision 564 the end customer decides whether or not to pre-pay the default value of the RFID stamp. If not, decision 568 is next. But if so, at step 565 the marker "pre-paid" is written in the RFID stamp's record 22. Then the end customer's record 12 is fetched by the customer's account number in field 32-2 in step 566, and the end customer's account is billed in record 12 for the RFID stamp's chosen default value at step 567. This completes the processing of a single stamp from the retailer's RFID stamp tag ID list. Decision 568 is next. If the list provided in step 554 is not now empty, the thread returns to step 555 to commence processing of the next stamp on the list. Otherwise, for each stamp the customer purchases record 42 is updated with the event PURCHASE (step 569), and the thread flows off FIG. 5(*a*) at step 571 for the case of PURCHASE of the stamps associated with an end-customer postal account.

An exemplary embodiment of the ACTIVATION process, showing exemplary database transactions, is charted in FIG. 5(*b*). The ACTIVATION subroutine is called from steps 538, 539, 544, 545, 546 and 547 of FIG. 5(*a*) and begins at step 572 of FIG. 5(*b*). The account number, and whether or not the RFID stamps' default value is to be prepaid, are passed as parameters to the ACTIVATION subroutine. The activating party may choose whether to defer or pre-pay the RFID stamps' default value at the time of ACTIVATION. A retailer, for example the postal entity, could take advantage of the "float" on his/her sales by deferring payment until the customer utilizes or enables the stamp. ACTIVATION is atomic, that is, all database updates appear simultaneously and if the subroutine is interrupted, the process is aborted and any intermediate database transactions are withdrawn.

The ACTIVATION subroutine commences at step 573 by determining whether the RFID stamp(s) information is being entered by a postal-entity-linked RFID reader. Advantageously, the customer could have presented her/his PAC card to this reader to provide her/his account number for activation. This would have been the customer's first opportunity to interact with a postal-entity RFID reader. If entering the process via a postal-entity-linked RFID reader at step 574, the RFID reader interrogates the RFID stamps to be activated, and produces a list of their tag IDs. Multiple RFID stamps may be interrogated simultaneously.

If the tag IDs do not come via RFID interrogation, then in step 575, the customer or authorized retailer preparing to sell RFID stamps must provide the tag IDs through other means, such as a web portal or telephone interface, provided by the postal entity. Regardless of how the list was generated, it may include A+B pairs or members of A+B1, . . . , Bn sets, and they will be activated together on a customer's account. By whatever means the list of tag IDs was obtained, an RFID stamp tag ID is taken off the list in step 576.

Next, a sequence of stamp integrity checks is performed. Decision 577 determines whether the RFID stamp has been registered with the postal entity by checking to see if its record 42 exists. If not, the customer is alerted to call customer service at step 597 and the activation process is aborted. Otherwise, decision 578 checks to see if the RID stamp has a record 22, indicating that the stamp has already been activated. If the answer is yes, the customer is directed to customer service in step 598 and the activation process is stopped, since an RFID stamp may not be doubly activated. In step 579, a record 32 of RFID stamp account database 30 is created with said RFID stamp's tag ID entered into field 32-1, along with a valid account number in field 32-2. This is the first time an RFID stamp's tag ID is associated with a postal account number. It is to be noted that the account number in field 32-2 doesn't change unless the consumer transfers a retailer-activated RFID stamp to his/her postal account (see FIG. 5(*a*), step 563), or the RFID stamp is enabled on a different postal account before use (see FIG. 6(*a*)).

Simultaneously, a record 22 of the mailpiece history database 20 is created at step 580, tying the RFID tag ID of field 22-1 to the chosen default class value, time and location of activation in field 22-4. The means by which the data was provided, e.g., postal-entity RFID reader or not, and venue will be implicitly known through the location information in field 22-4. Later, consistency checks can be made as record 22 is accessed at subsequent processing steps, e.g., the RFID stamp can only enter the system once. Thus the system may ensure that RFID stamps cannot be reused (except in the case of undeliverable mail, discussed earlier), and that non-activated or counterfeit RFID stamps are rejected.

Next, at decision 581, the system checks whether the RFID stamp is a "B" stamp. If so, the customer is obligated to associate a reply address with the "B" stamp. This type of stamp may only be bought through a business relationship with the postal entity. This process begins at step 582 where the customer's record 12 is fetched by the customer's postal account number. The customer may choose his/her "B" stamp reply address as his/her own return address from field 12-3 at decision 583, or at decision 585, use the billing address in field 12-4, or may enter a new reply address into his/her record 12 at step 587. Depending on his/her choice, the corresponding field number is set in step 584, 586, or 588 respectively. This field number is then recorded in step 589 as an update to record 42 and then, at step 590 the record 12 field-number choice is written in field 22-4. The chosen reply address will be fetched from record 12 only after the "B" stamp enters the mailstream, so routing will be governed by any customer updates to record 12 made prior to the "B" stamp entering the mailstream.

Then, in step 591, whether or not the RFID stamp is a "B" stamp, a query is made to determine if the default value will be prepaid or payment deferred. If prepaid, the flow moves to step 592 where a marker is added to field 22-4 indicating that the tag ID has its assigned value paid in advance. At step 593, the customer account record 12 is fetched using the customer account number, and in step 594, the account is billed the stamp's chosen default value by writing the charge into field 12-6 of record 12 in the customer account database 10. There are some differences between a retailer's and an end customer's account. The retailer account record 12 has a billing address (indicated by "... " in field 12-4 on FIG. 2(*a*)) but no return address (in field 12-3 of FIG. 2(*a*)) since the retailer does not utilize the stamps she/he sells through this account. Furthermore, the retailer is not allowed to trace tag IDs through RFID stamp account database 30 because the retailer did not mail them.

To continue, in step 595, the ACTIVATION event of the RFID stamp is written into record 42 of RFID stamp event database 40 where the tag ID record is updated with the event, time, place, and correlated details. Alternatively, in step 591 when the stamp payment is to be deferred, the ACTIVATION event of step 595 occurs directly. Step 595 concludes the processing for a single tag ID. In step 596, the system checks to see if the list of tag IDs to be activated has been exhausted. If not, processing resumes at step 576 via the lettered connector N. Otherwise, step 599 concludes the activation subroutine, and the RFID stamps have been "franked". The process now returns to its calling point on FIG. 5(*a*). Following the PURCHASE event (step 570 or step 571 of FIG. 5(*a*)), the end customer may chose whether or not to enable his/her RFID stamp(s).

Figure 6A:
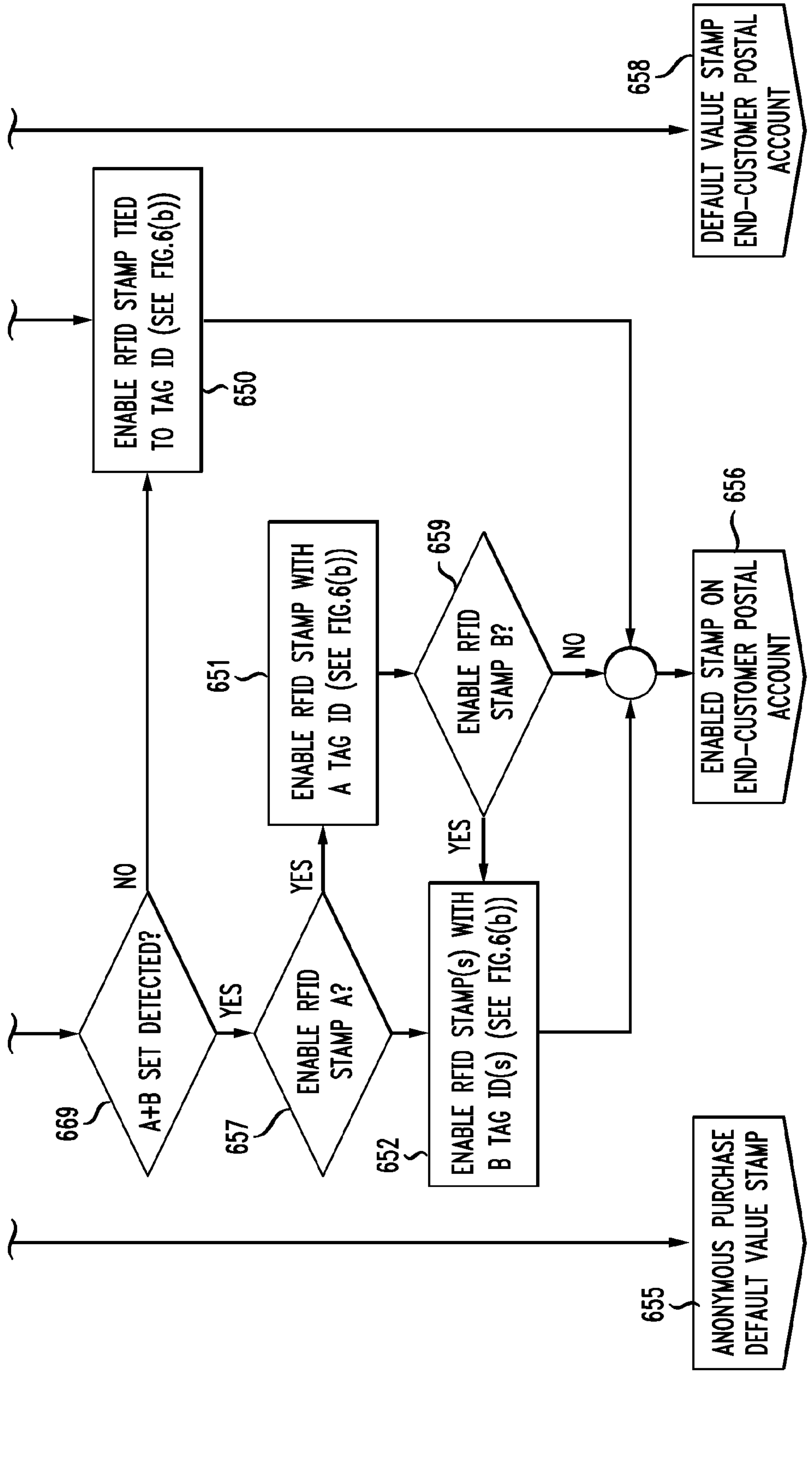
FIG. 6(*a*) contains a flowchart of a process for enabling of an RFID stamp in accordance with the present invention.
Figure 6B:
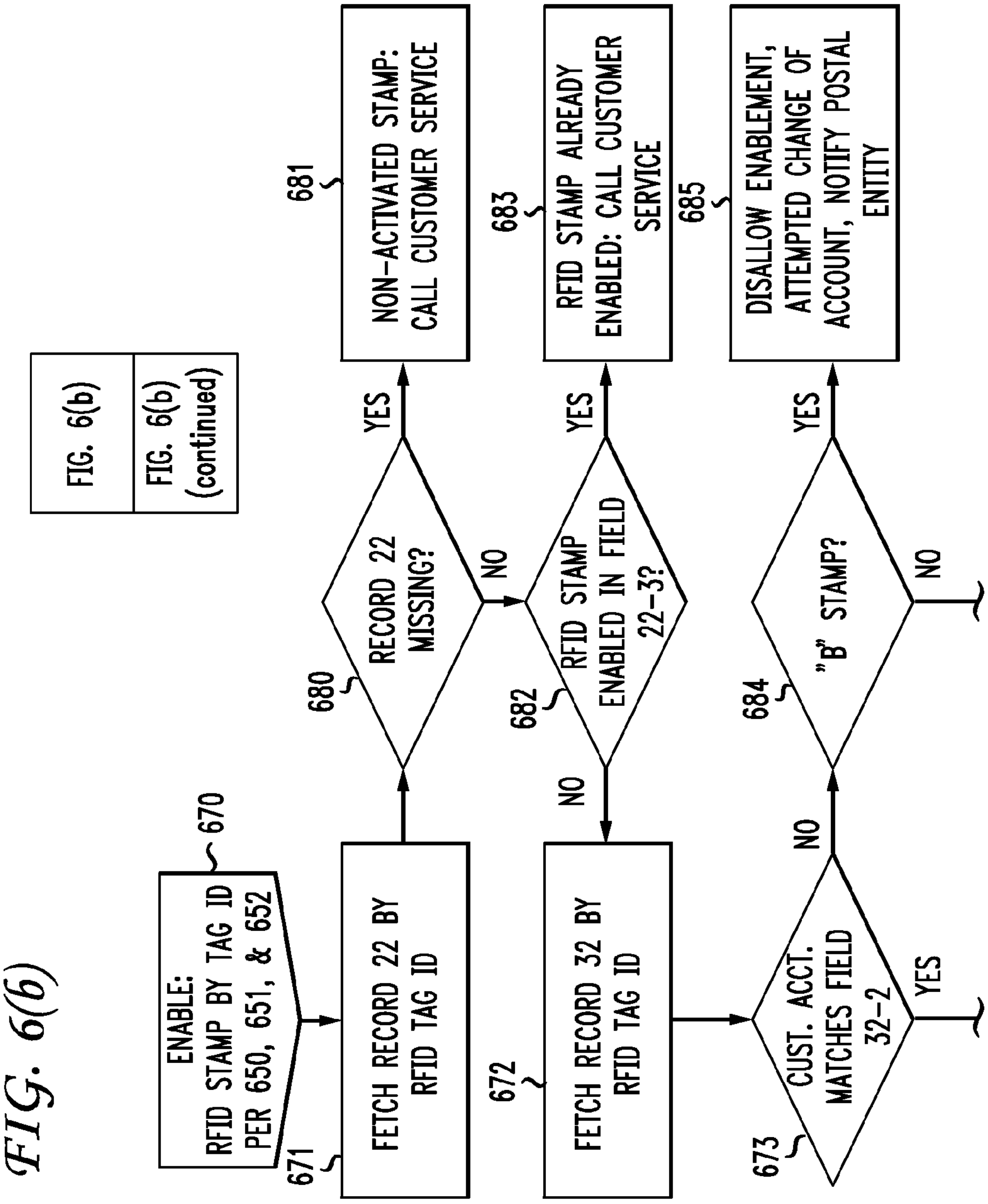
Figure 6B:
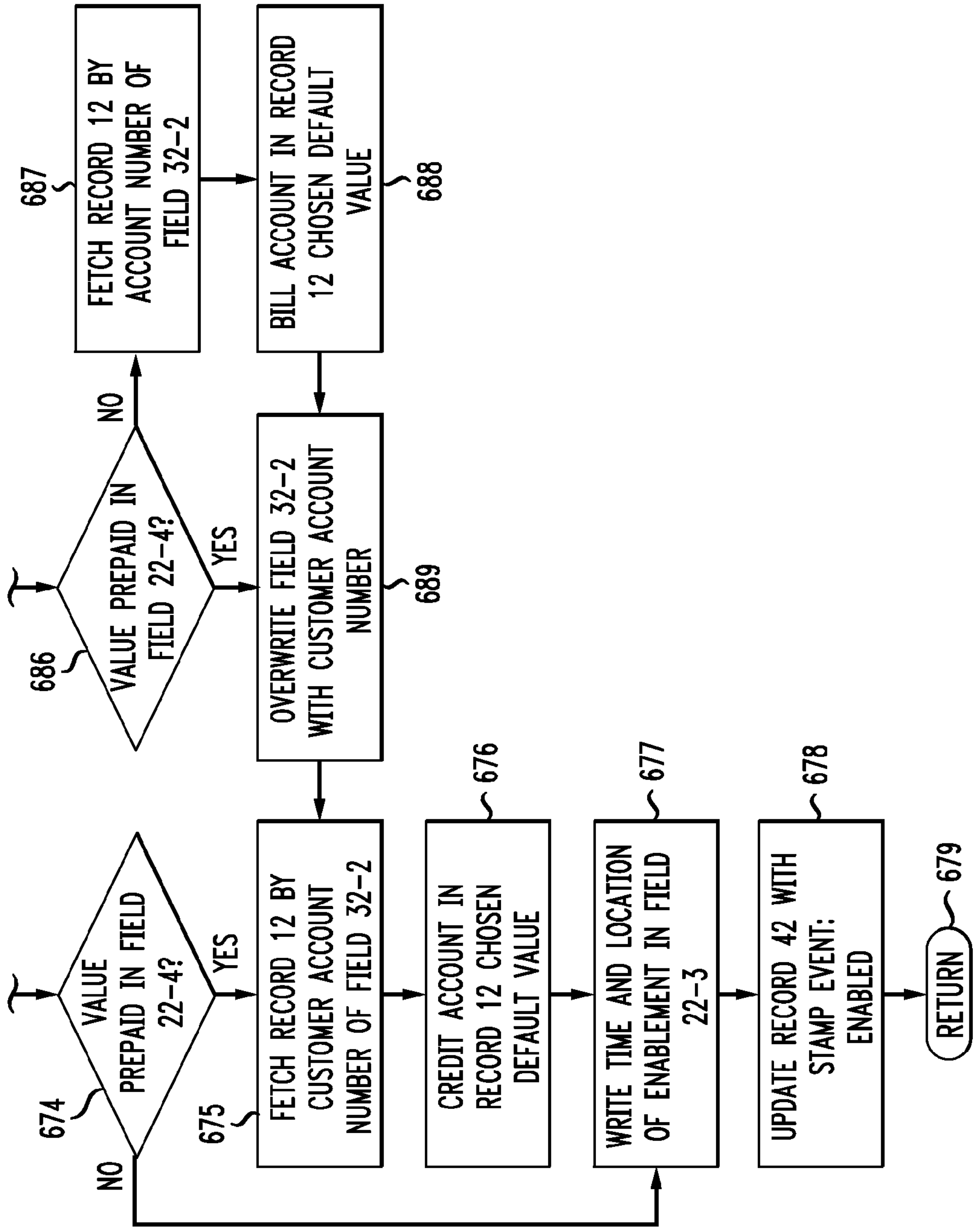

Several exemplary paths leading to the enablement process are shown in FIG. 6(*a*), entering at step 648 or 649. If the customer does not enable the RFID stamp (queries 654 or 653), the processing of the anonymously purchased stamp from step 649 continues to FIG. 7(*a*) through step 655. Likewise, the processing of the stamp purchased on a postal account from step 648 continues to FIG. 7(*a*) through step 658. But, if the customer chooses to enable the RFID stamp at either step 653 or step 654, she/he may at this time "affix" the RFID stamp to a mailpiece at step 660. It is an instance of enablement "at time of use" or "real time" enablement if the RFID stamp is "affixed" to the mailpiece at this step in the process. However, the customer is not restricted to this timeline of RFID stamp usage.

Presuming the customer elects to continue with the enablement process of FIG. 6(*a*), the system then checks to see if the customer desires or needs to open a new account at step 661. This is the last opportunity for the anonymous customer to associate his/her purchased RFID stamps with a postal account before they are deposited on a mailpiece in the postal system. If the account does not exist, the customer provides his/her billing and return address information in step 662, and in step 663, a new customer account record 12 is created with his/her newly assigned account number. Once the postal account has been created (or, alternatively, if the customer was using a pre-existing postal account), the customer provides the account number to the system at step 664. Then the system checks at decision 665 whether the data transaction is being done at a postal-entity-linked RFID reader. If not, the customer provides a sufficiently long RFID stamp tag ID suffix at step 668. The information may be entered by a variety of means such as: telephone, mobile device, personal computer or other methods known in the art. Since the customer account is known, a suffix of the full tag ID should be sufficient to determine the RFID stamp in question. It is presumed that the customer will only enter the tag ID(s) of the RFID stamp(s) he/she intends to enable, whether "A" or "B". Then the system ENABLES the stamp through the routine called at step 650, and the process continues to FIG. 7(*a*) through step 656.

Otherwise, if a postal-entity-linked RFID reader is in use at decision 665, the reader interrogates the RFID stamp, or a group of RFID stamps, to only obtain the tag IDs presented at step 667. Again, the customer could have advantageously presented her/his PAC card to this reader to provide the account number for enablement. It is then determined at decision 669 whether an A+B set is present. If not, a stamp is enabled as above at step 650. Or, if an A+B set was detected, the customer first chooses at decision 657 whether or not to enable the "A" stamp. If yes, the "A" stamp is enabled through the ENABLE routine called at step 651. Then the customer chooses whether to enable the "B" stamp(s) at decision 659. If not, the process continues to FIG. 7(*a*) via step 656. But, if the customer does choose to enable the "B" stamps(s) at decision 659, then they are enabled through the ENABLE routine called at step 652 and the process continues to FIG. 7(*a*) via step 656. The remaining option, if the "A" stamp at decision 657 is not enabled, is to enable the "B" stamp(s) as above at step 652. Then, the process continues to FIG. 7(*a*) via step 656. To conclude, there are three ways for the processed RFID stamp to exit FIG. 6(*a*) and continue to FIG. 7(*a*): (1) the postal-account associated stamp; (2) the anonymously purchased stamp; and, (3) enablement for postal accounts only. The first two ways are defined as default-value routes that bypass the enablement process.

The ENABLE process, called at steps 650, 651 and 652 of FIG. 6(*a*), is illustrated in the flowchart of FIG. 6(*b*). The entire ENABLE procedure is atomic as was the case for ACTIVATION. The process begins at step 670. First there is a series of enablement exclusion conditions for "A" and "B" RFID stamps. In step 671, record 22 belonging to the RFID tag ID is fetched by the system. If record 22 is missing, at decision 680, then the system flags the presence of a non-activated stamp and prompts the customer to call customer service in step 681. Otherwise, if there is a record 22 and field

22-3 indicates that the RFID stamp is already enabled at step 682, then the customer is again prompted to notify customer service at step 683, since an RFID stamp may not be doubly enabled.

If, at decision 682, field 22-3 indicates that the stamp has not been enabled, then the process continues to step 672 where record 32 is fetched by the RFID stamp tag ID. Next at decision 673, the system determines whether the preferred customer account number, gathered from the customer at step 664 of FIG. 6(*a*), is the same as that in field 32-2 of the RFID stamp account database 30 (the account number written at the time the stamp was activated or purchased). If the numbers are not the same, the system checks at decision 684 whether the RFID stamp is a "B" stamp. If so, enablement is disallowed at step 685, because a change of customer account on a "B" stamp is not permitted by this procedure in order to protect the ownership of the "B" stamp. Also, the postal entity is notified that an attempt to change the account was made and a record could be kept. Otherwise, if at decision 684, a "B" stamp is not present, the system checks at decision 686 whether or not the RFID stamp's default value has been prepaid. If not, the activation account's record 12 is fetched in step 687 using the account number in field 32-2, and at step 688 the activation account is billed in record 12 for the default value. Then, or alternatively if the default value had been prepaid, the customer's "enabling" account number overwrites the "activation" account number in field 32-2 at step 689, and step 675 is next. The enablement account's record 12 is fetched in step 675 using the account number in field 32-2, and at step 676 the enablement account is credited in record 12 for the default value.

Only "A" RFID stamps can be enabled through the "no" branch of decision 673. "A" and/or "B" RFID stamps may be enabled through the "yes" choice at decision 673. If the account numbers are the same, the system checks at decision 674 whether or not the RFID stamp's default value has been prepaid. If yes, the enablement account's record 12 is fetched in step 675 using the account number in field 32-2, and at step 676 the enablement account is credited in record 12 for the default value. Then, or alternatively if the RFID stamp's default value was not prepaid, at step 677 the time and location of enablement are written in field 22-3 of record 22 of the mailpiece history database 20. Subsequently, record 42 is updated with the ENABLED stamp event information in step 678. Step 679 indicates the thread returns to its calling point (step 656 or 659) on FIG. 6(*a*). Once the stamps have been enabled, the customer may use them at any future time as postage without needing to worry about the actual postage due for each mailpiece.

Figure 7A:
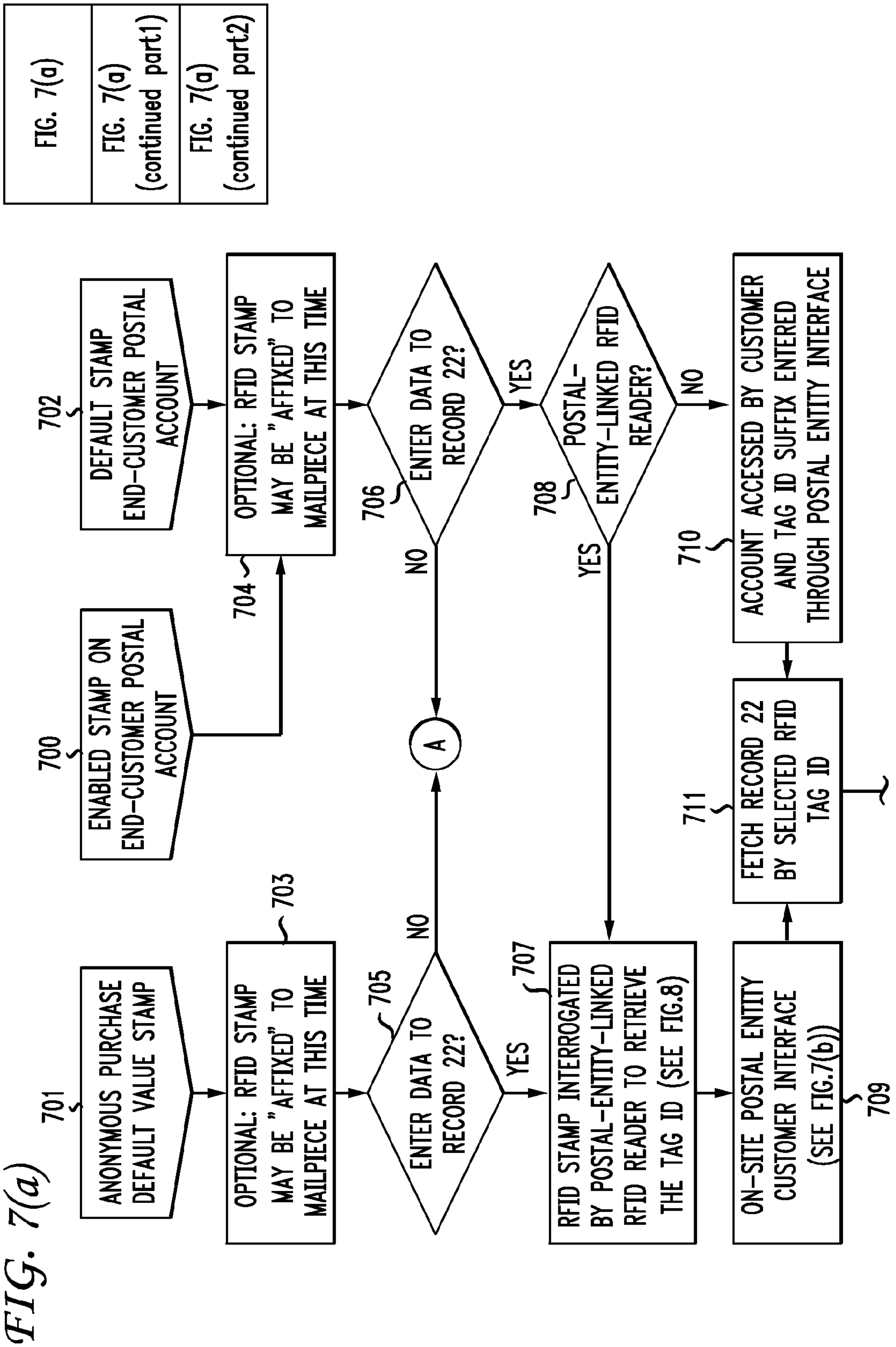
FIG. 7(*a*) contains a flowchart illustrating a process of selecting postal services associated with an RFID stamp in accordance with the present invention.
Figure 7B:
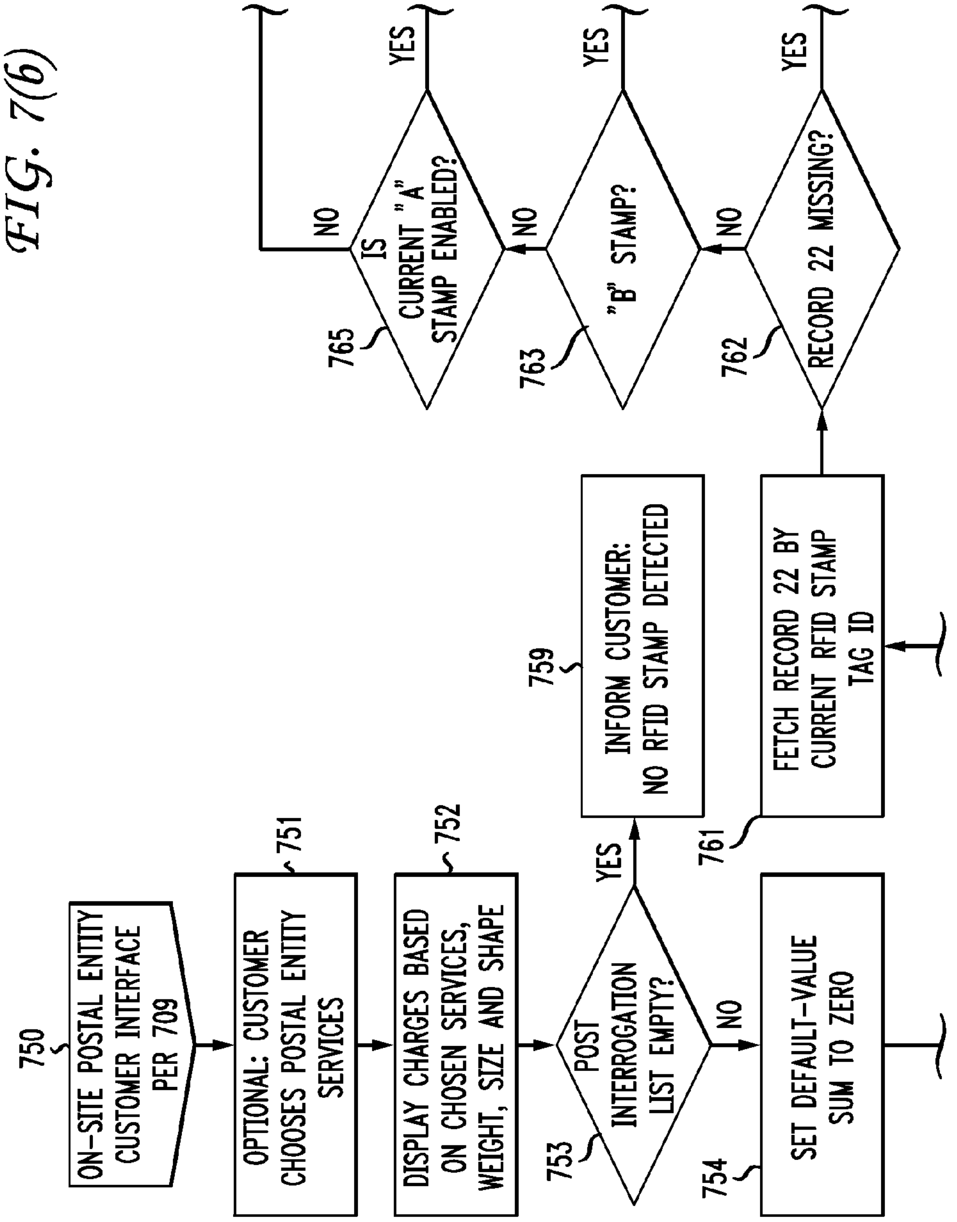

Exemplary means of choosing postal entity services to be associated with an RFID stamp are shown in FIG. 7(*a*), as well as information and diagnostics regarding postage charges for services and limitations to anonymously purchased RFID stamps. The flowchart leads up to the step of depositing a mailpiece "affixed" with an RFID stamp. There are three paths to FIG. 7(*a*) from FIG. 6(*a*); step 701, the anonymous-purchase default-value stamp (from step 655); step 700, the enabled stamp on an end-customer postal account (from step 656); and step 702, the default-value stamp on an end-customer postal account (from step 658). The RFID stamp may be "affixed" at this stage (steps 703 or 704) regardless of the path. Next, at step 705 or 706, the customer is asked whether he/she wishes to enter data in record 22, i.e., to select services or provide ZIP+4 information. In both decision cases, if the answer is "no", the process skips via the labeled connector A to step 738 where the customer has his/her last chance to "affix" the RFID stamp to his/her mailpiece before deposit at step 740 with the postal entity service.

Otherwise, if the decision is for data to be entered into record 22, the anonymous customer, at step 705, is obligated to use a postal entity RFID reader to obtain the RFID stamp's tag ID at step 707, since there is no personal accounting record of her/his purchase of the stamp. Such a postal entity reader may be a component of an earlier mentioned embodiment where an RFID reader may be used by a customer for data entry as part of a kiosk type arrangement. Alternatively, the customer with a postal account, at step 706, may likewise choose, at decision 708, to use a postal entity RFID reader at step 707, or may provide, by other means, the RFID stamp's tag ID (by entering a tag ID suffix), through a postal entity provided portal, at step 710. The customer provided tag ID is then used at step 711 to fetch record 22.

Figure 8:
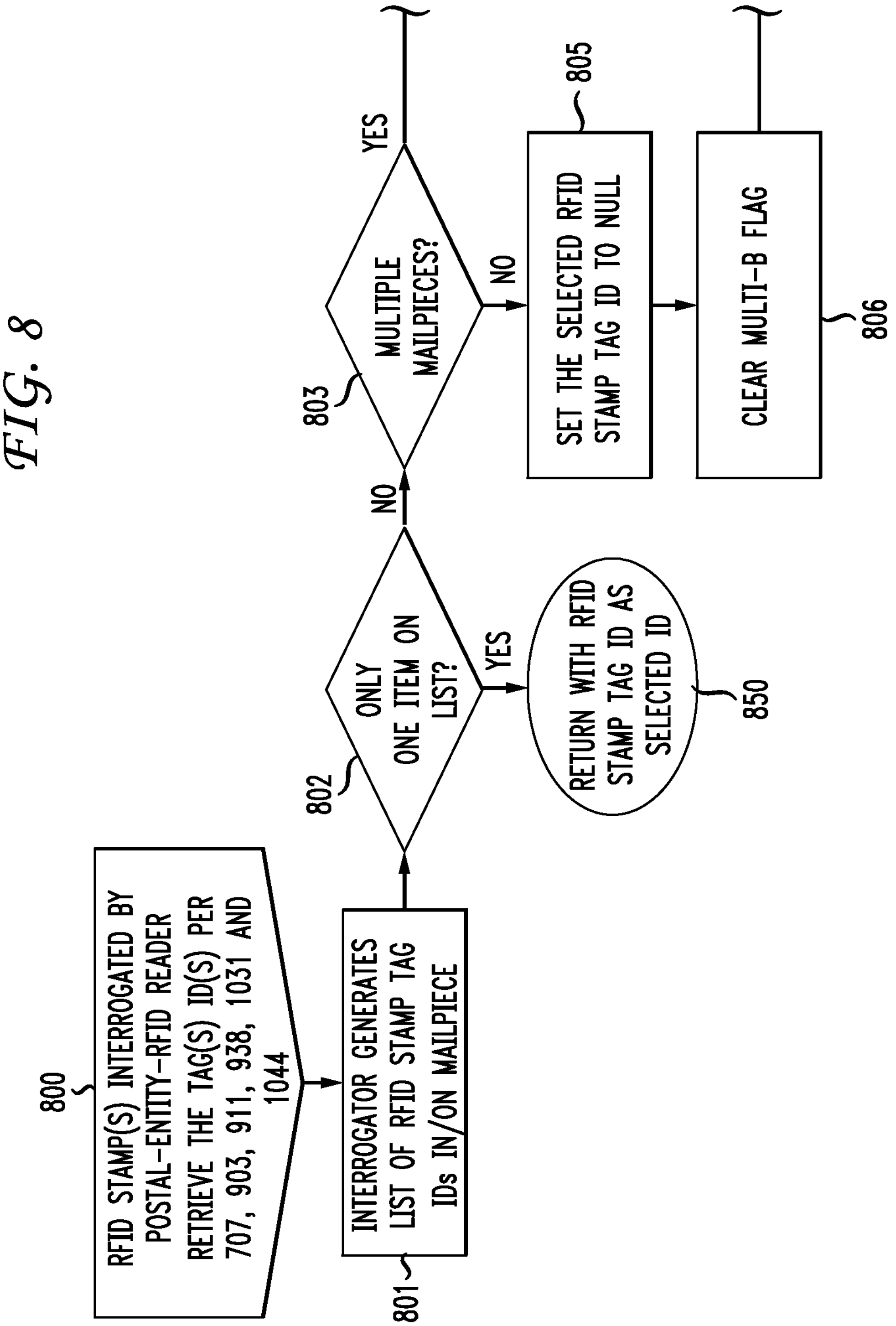
FIG. 8 includes a flowchart illustrating an exemplary "special interrogation" routine, called from FIGS. 7(*a*), 9(*a*), 9(*b*) and 10(*a*) that may be used in implementing RFID stamps in accordance with the present invention.

However, if the postal entity RFID reader is used at step 707, the special interrogation routing outlined in FIG. 8 is called. This routine "selects" an RFID tag ID to be associated with the mailpiece. If there is only one RFID stamp scanned then its tag ID is returned as selected; if there is more than one stamp read, then the RFID stamp tag IDs are prioritized and a unique tag ID is deterministically selected. The selected tag ID is returned with a list of any other stamps "seen" with it. Then, this information from step 707 is passed on to the customer interface routine (outlined in FIG. 7(*b*)) called in step 709. The customer interface informs the customer about postage and advises the best use of the RFID stamps for selected services. No business transactions are made although a record of the query is kept in database 40. The selected tag ID is passed on to step 711.

In this section, the customer continues providing data to be associated with the RFID stamp of his/her mailpiece. Regardless of whether the selected tag ID came from step 707 or 710, at step 711 the system fetches record 22 using that tag ID. At decision 712, it is determined whether the selected RFID stamp (an "A" or a "B" could have been selected) has been enabled. If the answer is "yes", the process moves to step 720 where the customer may choose specific postal entity services. These choices are written in field 22-4 of record 22 in step 721. The next few decisions are to determine whether or not to choose supplemental postal entity services for "B" stamps that are currently present in an A+B set. These non-selected stamps are limited to enabled "B" stamps at steps 722 and 723. Advantageously, this limitation discourages the use of multiple enabled "A" stamps on an item, since later at cancellation these stamps would be considered superfluous and ignored in the presence of the selected enabled "A" stamp. But, an individual may send multiple enabled "B" stamps under the cover of an "A" stamp since it is presumed that in the future these stamps will be used singly for reply mail. Then the system fetches record(s) 22 of the enabled "B" stamp(s) by tag ID(s) at step 724. In step 725, the customer chooses the desired postal entity services for each enabled RFID "B" stamp, and the information is passed to step 726 where field 22-4 is updated for each RFID stamp. The choices are also recorded in record 42 for each enabled "B" stamp by its tag ID in step 727 which then continues on to decision 714.

Before considering the paths exiting decision 714, the "no" branch of decision 712 will be discussed. This is the case if the selected RFID stamp is not enabled. This option leads to decision 713, where the negative result of decision 722 (i.e., there is no A+B set present with any enabled stamp) also enters. If the selected stamp is a "B" stamp, no further interaction with record 22 is possible at this stage in order to protect the owner's control of the "B" stamp. Thus, a ZIP+4 can not be entered at this stage on a "B" stamp. Such changes may only be made through customer account maintenance of record 12 where they will affect all RFID "B" stamps associated with the field that was updated. So, the thread goes to step 719 where record 42 of the selected stamp is updated with the customer's possible service selections on an enabled "A" or "B" RFID stamp. In the case of the non-enabled selected "B" stamp, only the fact that the stamp was interrogated is recorded in database 40, since no modifications were possible.

If at decision 713, the selected stamp is an "A" stamp, enabled or not, the process continues to decision 714. Also entering decision 714 are: the "no" branch off decision 723 (no chosen services for enabled "B" stamp(s)), as well as step 727 (the last step in choosing services for enabled "B" stamp (s)). At decision 714 the customer may or may not choose to enter the destination ZIP+4 routing code for the selected RFID "A" stamp. If not, the process skips to step 719 where record 42 is updated as discussed above. If the decision is to add destination ZIP+4 information, decision 715 asks whether the destination ZIP+4 field 22-2 is empty. If so, the customer may enter the information in step 716. It is then written in field 22-2 of record 22 at step 718. This leads to the update of the event in record 42 at step 719.

Otherwise, if a destination ZIP+4 entry on the selected "A" stamp already exists, the customer account information must be verified. So, record 32 of the tag ID is fetched at step 730. At step 731, the customer must enter her/his account number and prove its validity by a PIN or password, or the like. Then at decision 735, if the account number in field 32-2 matches the customer-entered account number, the destination ZIP+4 may be entered at step 716. It is then written in field 22-2 of record 22 at step 718, leading to the update of the event in record 42 at step 719 as above. But, if the account numbers at decision 735 do not match, then the request to change field 22-2 is denied at step 736 and the event is recorded as an update in record 42 at step 719.

At step 738, all of the results that converged into step 719 and the labeled connector A (from steps 705 and 706) come together at the last opportunity for the customer to "affix" the RFID stamp(s) on the mailpiece before depositing at a postal entity reception point at step 740. Following purchase, an RFID stamp may be "affixed" to a mailpiece at anytime prior to deposit and is independent of all logical events outlined in FIGS. 5(*a*) and (*b*), 6(*a*) and (*b*), and 7(*a*) and (*b*). Similarly, customer account information maintenance, and the atomic actions of the RFID stamp enablement, entering of destination ZIP+4 information, and presentation of information through the customer interface at step 709, are all independent of each other, may be performed in any order, and, with the exception of enablement, may be repeated. Actions may be grouped at the discretion of the customer, e.g., enablement may be performed at the time of purchase, independently at a later time, or immediately prior to deposit. Furthermore, the customer may seek postage information at a postal entity RFID reader (the sequences of steps 707 and 709), independent of any other processes presented in these flowcharts. At deposit (step 740), the mailpiece comes irrevocably under the exclusive physical control of the postal entity; hence, after the status ENTRY is recorded, customer initiated changes are not allowed to records associated with the RFID stamp affixed to the mailpiece in the mailpiece history and the RFID stamp account databases.

A process for providing information to a customer regarding postage fees to be tied with RFID stamp(s) and, optionally, specific postal service requests associated with a mailpiece, is outlined in FIG. 7(*b*). This flowchart is called, prior to deposit, at step 709 of the flowchart in FIG. 7(*a*) from an on-site postal facility customer interface such as a kiosk after obtaining from the FIG. 8 "interrogation" routine, at step 707, a list of RFID stamps found with the mailpiece as well as a deterministically derived "selected" RFID stamp tag ID. At this stage, this list and selected tag ID are kept in temporary working storage and not stored in the databases of FIG. 1. The service information is provided at an RFID reader equipped postal entity facility. The flowchart determines how the postage might be covered by a variety of preferred combinations of RFID stamps presented with the mailpiece. These preferred combinations are: a collection of non-enabled "A" stamps, or, a single enabled "A" stamp, or, a single "B" stamp, enabled or not. Other combinations are not useable for postage and the customer is informed of this. The information is temporary unless the customer commits to his/her service requests, although a record of when and where the stamps were "touched" is always kept in database 40.

In FIG. 7(*b*) and later flowcharts, the term "current stamp" occurs. This is used to distinguish it from the "selected stamp" which is the deterministically-assigned stamp from the FIG. 8 interrogation routine. The "current stamp" is any stamp temporarily being considered and processed within a loop.

Referring in particular to FIG. 7(*b*), the process of determining the appropriate postage fee (and whether the presented RFID stamp(s) will cover that fee) is entered at step 750. In step 751, at a postal entity kiosk, the customer may make postal entity service choices for the mailpiece with the RFID stamps present. This is an opportunity for the "anonymous" customer to obtain postal services beyond first-class default by paying with multiple default-value non-enabled "A" stamps. Otherwise, such transactions must take place by a face-to-face encounter with a postal employee at the service window. Then, the customer's mailpiece and the RFID stamp (s) she/he intends to use are weighed at an RFID reader-equipped postal entity kiosk arrangement at step 752 and the charges based on the weight, size, shape and requested services are displayed. At step 753, the system checks whether there are RFID stamp(s) present. If the list of RFID stamps is empty, service is completed and the process exits through step 759. But, if at least one RFID stamp is present, the process continues to step 754, where the system prepares to enter an accounting loop of the stamps present. The loop counts the number of activated "B" stamps and activated, enabled "A" stamps. It also excludes all non-activated stamps. In the case of activated, non-enabled "A" stamps, it sums the default values of all such stamps presented. This sum will be applied at a later stage to the postage in FIG. 7(*b*). This loop eventually exits at step 769.

The loop is initialized at steps 754, 755 and 756 by setting to zero the "default value sum" (a result that is only derived from non-enabled "A" stamps), the "B" stamp counter and the enabled "A" stamp counter, respectively. At step 757, the loop control pointer is set to the head of the RFID stamp tag list. Entering step 760, the loop commences by setting the current RFID tag ID from the pointer and advancing the pointer on the list. At step 761, the current tag ID's record 22 is fetched by the system. In the event there is no record 22 (i.e., the stamp is not activated) at decision 762, the current RFID stamp is ignored and the process moves on to step 768 where record 42 is updated (if possible) by the current tag ID with the time and location of the interrogation. The information is recorded for possible postal "sanity" checks of stamp misuse. The process then goes on to step 769 where the system checks if the pointer is beyond the end of the list of tag IDs. If the pointer is beyond the end of the list, the loop is exited. If not, the loop returns to step 760 and proceeds to assign the new current RFID tag ID from the pointer before advancing the pointer to the next location on this list.

However, going back to the decision options of step 762, if record 22 does exist, the system checks whether a “B” stamp is the current stamp at decision 763. If it is, the “B” stamp counter is incremented by one at step 764. Otherwise, the system checks for the presence of an enabled “A” stamp at decision 765. If the RFID stamp is an enabled “A” stamp, the enabled “A” stamp counter is increased by one at step 766. If not, the remaining option for the current tag ID is the activated, non-enabled “A” stamp that has an assigned default value which can be retrieved from field 22-4 of its record 22. This value is added to the default-value sum in step 767. Then, after steps 764, 766 or 767, an update is made in record 42 of the current RFID stamp tag ID with the time and location of the inquiry at step 768 and the thread proceeds to decision 769 where the loop may be repeated for the next item at the list pointer, or if the list has been exhausted, the system proceeds to step 770.

At step 770, record 22 is fetched by the RFID tag ID of the selected stamp passed from the routine of FIG. 8. At decision 771, if record 22 is missing (i.e., there was no selected stamp associated with the mailpiece), then the customer is informed to seek assistance at step 781 and the process terminates. The customer is allowed to send non-activated stamps provided there is some other “selected” stamp to bear the postage and step 781 re-enforces this feature. If there is a useable “selected” RFID stamp, the system will first display at step 791 the sum of the default values of all of the non-enabled “A” stamps from step 767. Next, it is determined at decision 792 if the selected RFID stamp, i.e., the stamp that would bear the postage, is an “A” stamp. If not, the system goes to decision 772, where the “B” stamp counter is tested. If it is greater than one, then at step 782 the customer is informed that he/she has attempted to use multiple “B” stamps with no “A” stamp to cover the charges. This protects the owner of reply “B” stamps from misuse by clients for personal use and protects the postal system from being confronted with multiple routing confusion derived from the reply ZIP+4 associated with each “B” stamp.

Otherwise, a single “B” stamp is present, and if, at decision 793, it is enabled, the routine informs the customer that the postage should be covered by the RFID stamp presented at step 795 and then returns at step 799 to step 709 of FIG. 7(*a*). But, if the “B” stamp is not enabled at decision 793, and at decision 773 its default value does not cover the postage, the customer is so informed at step 783. Otherwise, the postage is covered and the thread proceeds to step 795 as above, and the routine returns to FIG. 7(*a*) from step 799.

Now the “yes” branch of step 792 will be considered. This is the case when the selected RFID stamp is an “A” stamp. “B” stamps in mixtures with a selected “A” will be ignored (this allows the customer to send A+B sets). First, a possible but discouraged condition will be tested at decision 774. Using multiple enabled “A” stamps is discouraged because such use is redundant and wasteful. At the time of cancellation, only one such stamp will be used. If there is more than one such RFID stamp, the customer is informed of this in step 784.

If the “no” branch at decision 774 is taken, i.e., the enabled “A” stamp counter is zero or one, then mixtures of enabled and non-enabled “A” stamps must be considered. If at decision 794, the default-value sum of non-enabled “A” stamps is zero, then there were no non-enabled “A” stamps detected and it is deduced that there is one enabled “A” stamp to cover the postage. In this case, the process continues to step 795 where the customer is informed that the RFID stamp covers the postage and the system returns to FIG. 7(*a*) via step 799.

Alternatively, if the default-value sum is non-zero at step 794, then there are non-enabled “A” stamps present. So, if at decision 775, the “selected” stamp is enabled, then at step 785 the customer is informed that mixed default-value stamps and enabled stamps are present on the mailpiece. This is discouraged because it is wasteful and redundant. The “no” branch of decision 775 is taken when only non-enabled stamps are present. Their default-value sum will be compared to the postage due via the pair of “Goldilocks” decisions 776 and 777. If the sum is too small, step 786 informs the customer there is insufficient postage. If the sum is too great, step 787 informs the customer there is excess postage. Otherwise, the customer is asked at decision 778 if she/he wishes to accept the charges displayed. If not, the process is terminated at step 788. But, if the charges are accepted, then the customer is required to “affix” the(se) specific RFID stamp(s) to the mailpiece at step 796. The customer-approved chosen services are written in field 22-4 of the selected RFID stamp and the routine concludes by returning to step 709 of FIG. 7(*a*) via step 799. The customer who chooses this type of transaction may still assign a destination ZIP+4 to this selected RFID stamp, but the service selection steps of FIG. 7(*a*) are not accessible.

An exemplary RFID stamp interrogation routine is illustrated in FIG. 8. The routine is called at several points during postal processing of an RFID stamp. It has already been used in FIG. 7(*a*) at step 707 to implement the customer information routine at step 709. Other places it will be called are: step 903 and step 911 in FIG. 9(*a*), step 938 in FIG. 9(*b*), and step 1031 and step 1044 in FIG. 10(*a*). This routine deterministically selects one RFID stamp from a list of stamps provided by a postal entity RFID reader, and performs ancillary processing at the time of “entry” of the mailpiece. The selected RFID stamp will later be used in routing of the mailpiece. Defective and problem stamps combinations are combed out and the error condition is passed back to the calling routine. The details of “when” specific features of the FIG. 8 routine are used depend on where it is called and the results of previous processing of the RFID tag list. There are optimization features to reduce database load. The routine truncates itself if the system recognizes there has already been a stamp selected for the particular mailpiece in question or there is only a single stamp associated with the item. The circumstance in which most of the features of FIG. 8 are executed is at the time of “entry”.

The flowchart commences at step 800, and at step 801 the postal entity RFID reader interrogates the RFID stamps in/on the mailpiece and generates a list of the RFID tag IDs. If at decision 802, the list consists of a single item, then the routine returns immediately through step 850 to its calling point with the RFID stamp assigned as the selected stamp. Otherwise, if at decision 803, it is determined that the multiple RFID stamps are associated with the presence of multiple mailpieces, then at step 804 the items must be separated and the process restarts at step 801 individually for each separate piece. But, if the complete list of RFID stamps is associated with a single mailpiece (that is, the “no” branch from decision 803), then a single RFID stamp must be selected to cover the postage charges and routing of the item.

The deterministic selection algorithm prioritizes the RFID stamps on the list by ranking enabled “A” stamps over non-enabled “A” stamps, over “B” stamps. Within the higher ranked category of “A” stamp, the tag ID with the greater numerical or lexical value is chosen to “break the tie”. Also, multiple “B” stamps are accepted only in the presence of an activated "A" stamp. The algorithm starts by initializing four local variables. At steps 805 to 807, the selected tag ID, the multi-B flag and the selected stamp enabled-A flag are cleared. Then, at step 808, the loop control pointer is set to the head of the list.

The selection loop is entered at decision 810. If the control pointer has not passed the end of the list, the routine, at step 811, sets the current RFID tag ID from the pointer and advances the pointer on the list. At step 812, this tag ID is used to fetch record 22. If, at decision 813, record 22 is missing (i.e., the stamp is not activated), then the tag is ignored and the loop restarts with the next RFID stamp tag ID at decision 810. Otherwise, at decision 814, it is determined if "entry" is already recorded in field 22-5. If so, the current tag ID (selected in a previous call to FIG. 8) is returned immediately via step 851 to the calling routine as the selected RFID stamp tag ID. If not, there is a further optimization at decision 815, where it is determined if the selected tag ID has been recorded in a set of "multi-A" stamps during a previous call to FIG. 8. This is done by asking if there is a "multi-A" marker present in field 22-4. If so, the selected RFID tag ID is extracted from the marker and returned to the calling routine via step 852. But, if the current RFID tag ID is not returned at any of the previous decisions, it must be considered for selection.

"A" stamps and "B" stamps take different paths in the selection prioritization process beginning at decision 816. If the current stamp is a "B" stamp, another decision question follows at decision 817. Here, it is determined whether there is already a known selected "A" stamp that was found during the loop processing of the present list. If such a stamp is known, then the current "B" stamp is ignored and the loop begins again at decision 810. This is to implement the mailing of A+B sets. If there is not a selected "A" stamp, then the next decision at 818 checks if a "B" stamp has been selected. If so, the current "B" stamp cannot be assigned as the selected stamp, and furthermore this indicates that multiple "B" stamps are present. Hence, the "multi-B" flag is set at step 819 and the loop returns to step 810. The "multi-B" flag can lead to an error condition in the event that no activated "A" stamps are eventually found on the list of RFID stamp tag IDs. Alternatively, if there is no selected "B" stamp (or "A" stamp), then the current "B" stamp tag ID is defined as the selected RFID stamp tag ID at step 827, and the loop begins again with the next item on the list, if any, at decision 810.

Going back to consider the "yes" branch of decision 816 when the current stamp is an RFID "A" stamp, at decision 820 it is determined if the "selected stamp enabled-A" flag has previously been set for this list of RFID tag IDs. If this flag was not set, then at decision 821 it is determined whether the current RFID "A" stamp is enabled. If so, the "selected stamp enabled-A" flag is set in step 825. Then, the current RFID stamp is made the selected stamp at step 827, since enabled "A" stamps outrank all other types of RFID stamps. The loop then starts again at decision 810. But, if the current stamp is not an enabled "A" stamp at decision 821, then the system checks to see if there is already a selected RFID "B" stamp at decision 823. If so, the current RFID "A" stamp tag ID is made the selected RFID stamp tag ID at step 827, because non-enabled "A" stamps outrank "B" stamps (i.e., "B" stamps can be mailed inside envelopes whose postage is covered by an "A" stamp). But, if at decision 823, the selected stamp is not a "B" stamp, then at decision 824, the tag IDs of the current "A" stamp versus the selected "A" stamp or the null tag ID from step 805 are ranked by their lexical values. If the current tag ID has the greater value it is made the selected RFID stamp tag ID at step 827. Otherwise, no change is made to the selected tag ID assignment and the loop recommences at decision 810.

The final option to consider is the "yes" branch of decision 820 (i.e., the selected stamp is an enabled "A" stamp). It is followed by decision 822, where it is checked whether or not the current "A" stamp is enabled. If not, then the selected RFID stamp does not change to the current tag ID, since enabled "A" stamps take precedence over non-enabled stamps. But, if the current "A" stamp is enabled at decision 822, then its tag ID must be lexically ranked at decision 824 against the selected enabled "A" stamp tag ID. The result of this comparison is handled as before. Multiple enabled-A stamps are in general discouraged, but the management of this problem is dealt with in the flowcharts from which FIG. 8 is called.

Ultimately, the loop pointer will go past the end of the list and the process will continue through to the next major section of FIG. 8 via connector B. This section begins with a question at decision 830 asking whether FIG. 8 was called from FIG. 7(*a*) at step 707. If it was, then the routine is exited and returns the selected RFID stamp tag ID with the list of tag IDs via step 853 just before beginning the customer service routine of FIG. 7(*b*). Up to this point, the routine of FIG. 8 has not performed any side effects associated with the items on the list, i.e., no markers are left in database 20. But, if FIG. 8 is not exited, subsequent decisions are performed on this flowchart concerning entry and utilized in later cancellation and routing procedures. Only the call step from step 903 of FIG. 9(*a*) can get to this part of the flowchart of FIG. 8.

The section with side effects begins at decision 831. If the selected stamp tag ID is found to be "null", then a "null" tag ID is returned at step 854 as the result to step 903 of FIG. 9(*a*). In this case, the "null" value was set at step 805 and has remained unchanged throughout all iterations of the ranking loop. This occurs in the circumstance that no valid RFID stamp was found. For example: the list of tag IDs was empty (e.g., legacy stamps on the mailpiece), or consisted of non-activated stamps, unregistered stamps, or the list consisted of non-conforming tag IDs, or some mixture of such items. However, if the selected stamp tag ID is not "null", then it is determined if it is an RFID "A" stamp at step 832. If not, the system checks at decision 845 to see if the multi-B flag has been set during the selection loop at step 819. If so, at step 855, the routine discards the selected "B" stamp tag ID and returns a "null" tag ID instead with a multi-B error condition to FIG. 9(*a*). This occurs when multiple "B" stamps are seen without an "A" stamp to cover the postage. But, if the multi-B flag is clear, then the selected RFID stamp ID is returned from FIG. 8 at step 856. This is the condition for a valid "B" stamp (enabled or not) being used to mail other non-activated stamps.

Reconsidering decision 832, if the selected RFID stamp is an "A" stamp, then any other "A" stamps present with the selected stamp must have the "multi-A" marker recorded in database 20. This section begins another loop through the list of stamps. This is executed in order to keep from performing the entire FIG. 8 selection loop again at every subsequent routing interrogation and at cancellation. So, at step 833 the loop control pointer is restored to the head of the RFID stamp tag ID list. At step 834 the routine sets the current RFID tag ID from the pointer and advances the pointer on the list. If at decision 835, the current tag ID is the selected one, then the process goes to decision 846 to check whether the pointer is past the end of the list. If so, the loop is complete and the selected RFID stamp ID is returned in step 856. If not, the loop continues at step 834 with the next tag ID from the list and advances the pointer.

Now the "no" branch of decision 835 will be considered to continue looking for multiple "A" stamps on the tag ID list. If the current stamp is not the selected one, then its record 22 is fetched at step 836. And if at decision 837 the record is missing (i.e., it is an invalid stamp) then the routine proceeds to decision 846, where it may recommence at step 834 or exit at step 856. But, if there is a record 22 at decision 837, then the system checks whether the current stamp is a "B" stamp. If so, it is ignored in the same manner as the "yes" branch of decision 837. Otherwise, at step 839, a "multi-A" marker containing the selected RFID tag ID is recorded in field 22-4 of the current RFID stamp. This is done to each non-selected RFID "A" stamp on a multi-stamp list. The routine then goes to decision 846, and the loop either repeats or exits. If exited now, the return at 856 to FIG. 9(*a*) delivers the selected RFID stamp tag ID for multiple stamp situations.

Step 856 returns the selected RFID stamp tag ID from FIG. 8 in all multi-stamp cases. If the selected RFID stamp is a "B" stamp, then the routine performs no side effects prior to the return. But, if the selected RFID stamp is an "A" stamp there will be side effects if other activated "A" stamps are present with it.

Figure 9A:
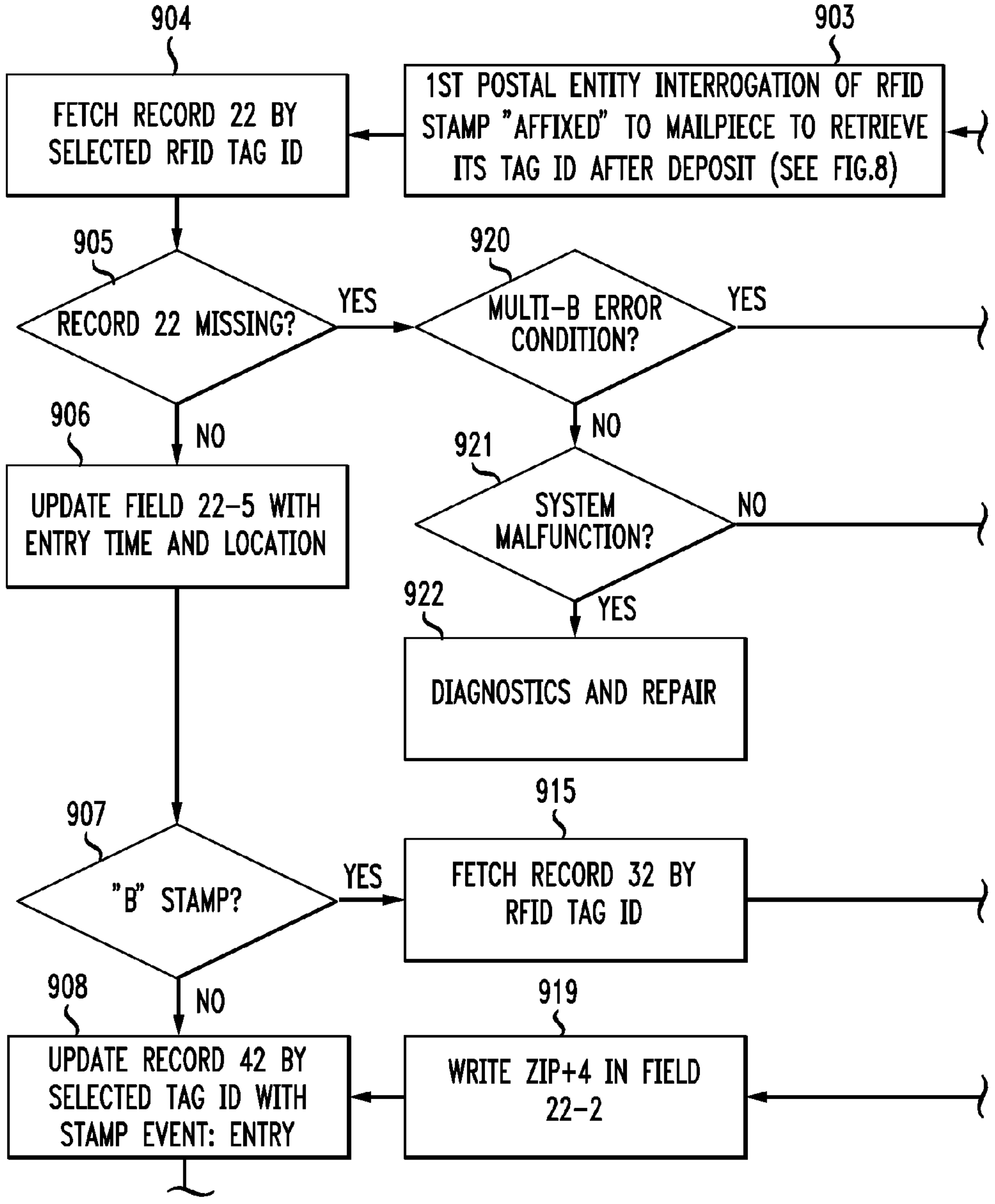
FIG. 9(*a*) illustrates postal entity processing, including recording entry, of an RFID stamp associated with a deposited mailpiece, preceding billing and cancellation, in accordance with the present invention.
Figure 9B:
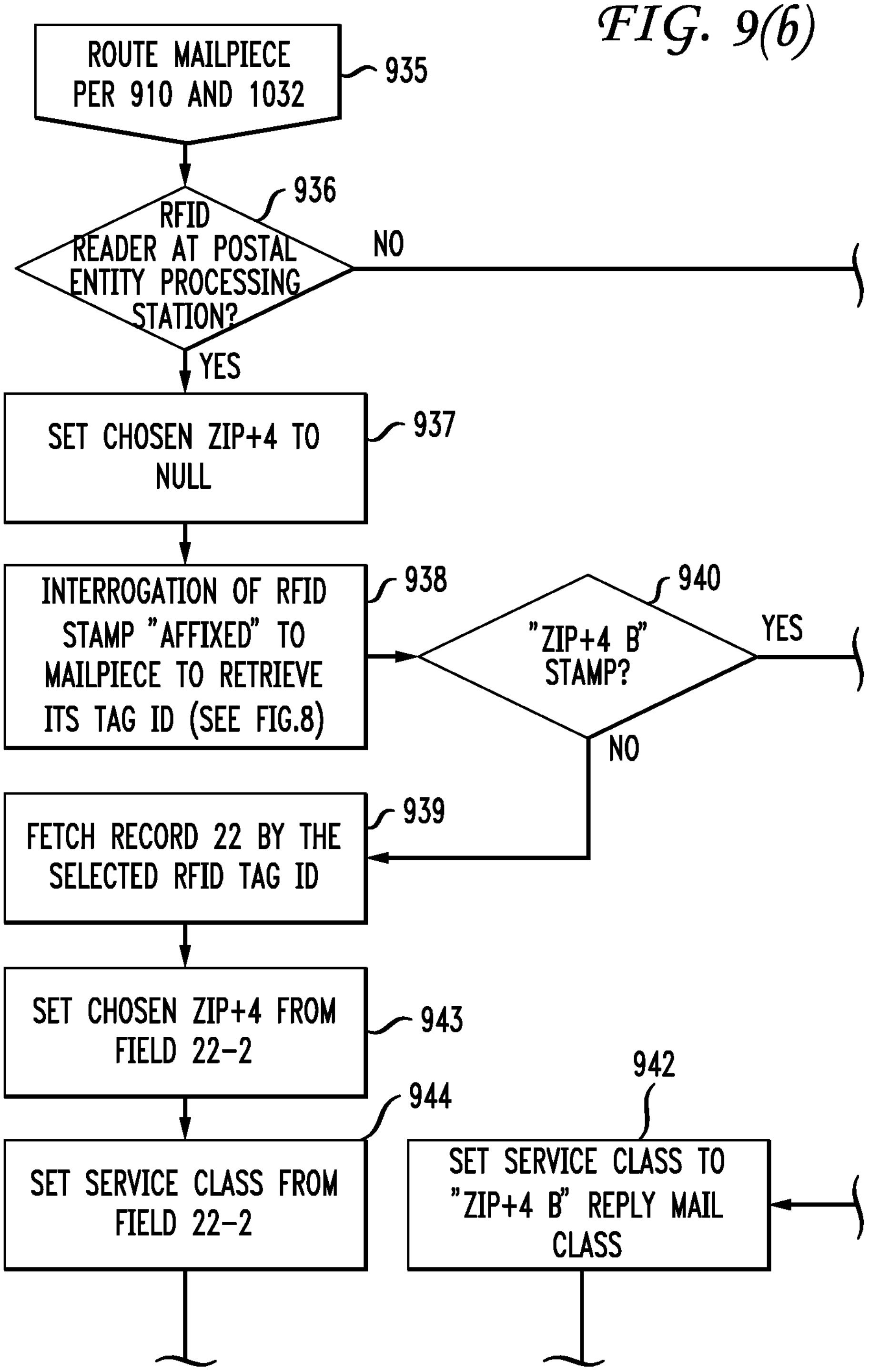
Figure 9C:
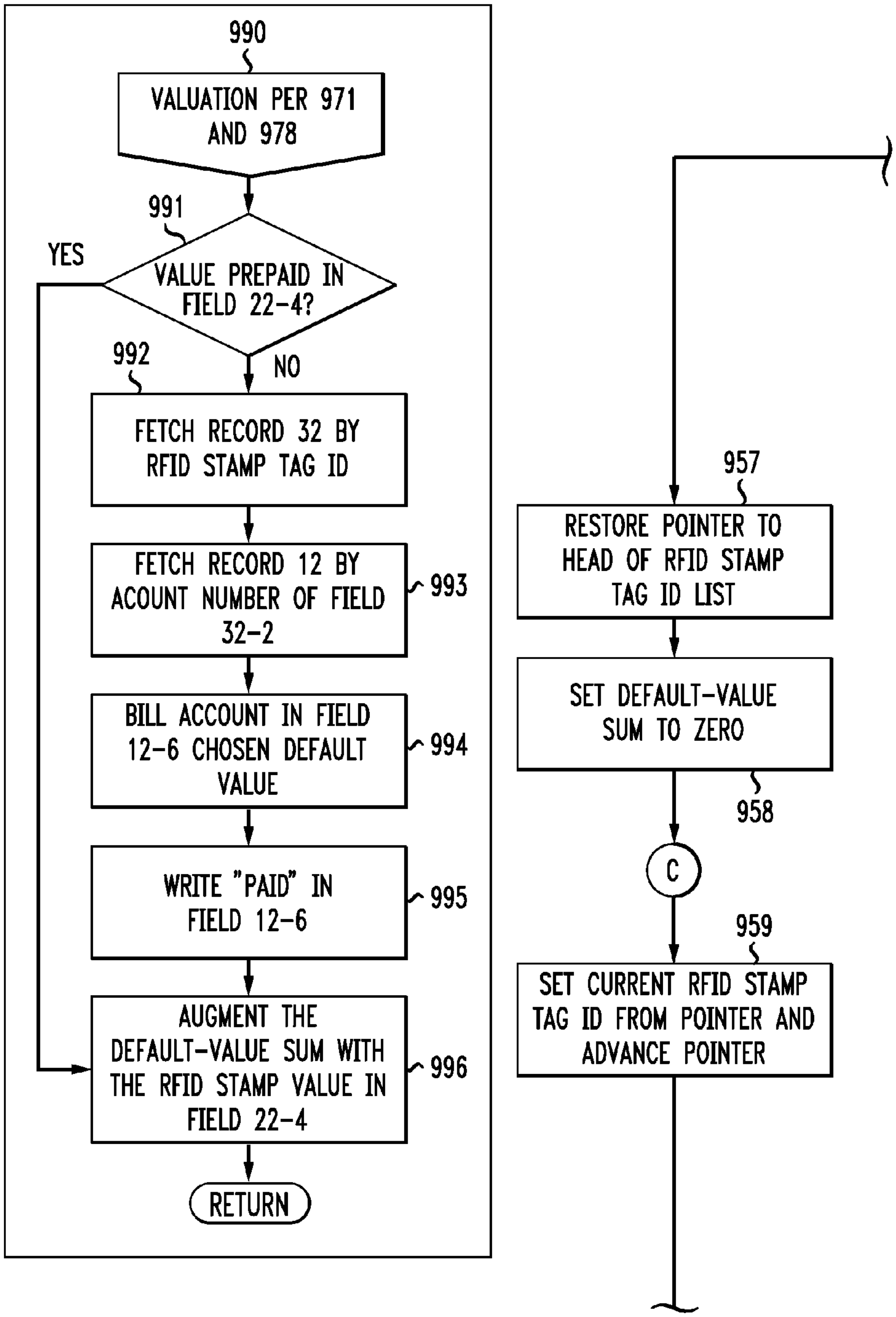

Recalling at the end of FIG. 7(*a*) that the mailpiece with RFID stamp(s) "affixed" has been deposited at a postal entity facility, postal entity processing will begin as shown in the flowchart of FIG. 9(*a*). The flowchart presents exemplary data handling routines to mark the "entry" of the RFID stamp into postal entity processing, sift out items bearing unusable RFID stamps, compute possible multiple-stamp charges and aid in routing of the item up to cancellation.

During the lifecycle of an RFID stamp the routine outlined in FIG. 9(*a*) is executed only once. It is entered at step 900 and begins at decision 901, where it is determined if the mailpiece with "affixed" RFID stamp(s) is at a legacy postal entity facility or one with an RFID reader. If no reader is available, routing steps occur through step 902 until an RFID reader-equipped postal entity facility is reached. Once a postal entity RFID reader is encountered in decision 901 or step 902, the interrogation routine of FIG. 8 is called at step 903, where the deterministically selected RFID tag ID and ancillary information is generated to aid in future routing and postage calculations. At step 904, record 22 of the selected RFID stamp is fetched.

If record 22 is not available at decision 905, a series of error conditions must be considered. The first decision 920 asks if there is a "multi-B" error condition. Multiple "B" stamps, with or without an "A" stamp, cannot be "affixed" to a mailpiece to be used for postage. This protects the owner of the "B" stamps and allows the mailpiece to be routed unambiguously. This condition is recorded in all the "B" stamps' records 42 at step 930 and then is directed to the "missing stamp" routine at step 928 through the labeled connector M. Otherwise, decision 921 is next, where it is determined if there is a system malfunction in reading the RFID stamp tag ID. If it appears there is a malfunction, then the process goes to step 922 for postal entity diagnostics and repair. Otherwise, at decision 923, it is determined if the RFID stamp has a good signal and was read correctly. A re-read may be attempted at this stage. If the tag information is readable, the mailpiece goes to postal inspection for a non-activated, unregistered or spurious stamp state in step 924. If not, the next test is at decision 925, where it is determined if any RFID signal is detectable from the mailpiece. If there is a signal at this stage, it means that the signal cannot be decoded as a valid RFID stamp tag ID and the item is sent to step 926 where it is inspected for possible damage to the stamp. It then proceeds to the "missing stamp" routine at step 928 via the lettered connector M. Otherwise, the presence of legacy stamps must be considered at decision 927. Legacy stamps progress to legacy processing at step 929. The contrary condition proceeds to step 928, the "missing stamp" routine of FIG. 10(*b*).

Now the "no" branch of decision 905 must be considered. If record 22 of the selected RFID tag ID is present, its field 22-5, the "Entry" field, is updated in step 906 with the time and location of its first recognized "entry" into the postal entity's exemplary RFID handling process. (Note that selected "A" and "B" category stamps are treated identically in this step. Also, if multiple "A" stamps are present, only the selected stamp has "entry" recorded in field 22-5, making it the effective group leader of the stamps on the mailpiece.) Next, it is determined whether the RFID stamp is a "B" stamp at decision 907. If it is, its reply routing ZIP+4 is obtained and recorded in record 22 to expedite routing in future processing. This begins with a series of fetches: at step 915, record 32 is fetched by the RFID stamp's tag ID; at step 916, the customer account number of field 32-2 is used to retrieve the customer's account in record 12; and, at step 917 the customer-chosen field number for the "B" reply address is fetched from field 22-4 (refer back to step 590 of FIG. 5(*b*)). Then, in step 918, the reply ZIP+4 information in record 12 is found by this field number stored in field 22-4, and the reply ZIP+4 is then written in field 22-2 at step 919. Then, step 919 and the "no" branch of decision 907 both continue to step 908 where record 42 is updated by the RFID stamp tag ID with the stamp event: ENTRY. The sequence of steps, from step 906 to step 908, recording ENTRY is atomic.

The mailpiece with a "B" stamp being used as a reply mailing gets its reply ZIP+4 routing code at the time of entry, not at the time the "B" stamp was activated. Thus, the owner of the "B" stamp may change the reply address and its associated routing ZIP+4 up until the time of the recorded entry of the RFID stamp. Furthermore, if the address written on the outside of the mailpiece conflicts with the reply address, the item will nevertheless be automatically routed by the inventive RFID postal system to the reply address ZIP+4 where the carrier delivering the mailpiece will likely notice the discrepancy. This situation will be handled as misdelivered due to misaddress and possible fraudulent use of the prepaid "B" stamp in FIG. 10(*a*).

Next, at decision 909, if the mailpiece is not yet at the postal entity's exemplary RFID cancellation facility, the item will undergo as many routing steps 910 as required. An exemplary routing process (FIG. 9(*b*)) will be described in detail later. Once the mailpiece does arrive at the postal entity's exemplary RFID cancellation facility, the process continues to step 911, where the mailpiece is interrogated again by a call to the routine of FIG. 8. The returned selected tag ID is then used to fetch record 22 in step 912. At decision 913, field 22-6 is checked to see if the stamp has been previously cancelled. If so, a system malfunction check is done at decision 931. If a problem is noticed, system diagnostics and repair are performed at step 932. Alternatively, at step 933, record 42 is updated such that the selected RFID stamp was "previously cancelled" and, at step 934, the mailpiece is sent for postal inspection to check for possible reuse of the RFID stamp(s). But, if the RFID stamp has not been cancelled it proceeds to the "pre-cancellation accounting" routine of FIG. 9(*c*), at step 914. This routine assigns the necessary postage information to the selected RFID stamp, should a plurality of RFID stamps be "affixed" to the mailpiece. Then the process of FIG. 9(*a*) exits via step 999 to FIG. 10(*a*) where the charges associated with the selected RFID stamp are computed based on the service selection of field 22-4 and the object's size, weight, etc. in accordance with the postal entity's protocols. Before going on to FIG. 10(*a*), the routines illustrated in FIG. 9(*b*) and FIG. 9(*c*) that were called in FIG. 9(*a*) will be described.

A subprocess for an exemplary postal entity routing method using RFID stamps is outlined in the flowchart of FIG. 9(*b*). The routine is called from two different steps (910 or 1032) of the exemplary RFID stamp processing in FIGS. 9(*a*) and 10(*a*). This routine directs mailpieces with a selected "affixed" RFID stamp automatically by ZIP+4 and customer specified service selections associated with the RFID stamp. Also, routing of high volume reply "B" stamp mailpieces is optimized.

The subprocess is entered at step 935. Decision 936 is to determine if the RFID bearing mailpiece is at an RFID postal entity processing station. If at this stage there is no RFID reader, the item is checked at decision 953 to see if further routing is possible. If so, legacy routing continues at step 954 and the routine returns at step 998, This occurs in the case that the exemplary RFID processing is not universal at postal entity facilities. Once the return is made to FIG. 9(*a*) or 10(*a*), the mailpiece may re-encounter the routing routine (FIG. 9(*b*)) several times until it is read by an RFID reader at a processing station. But, if further routing of the item to its stated destination is not possible at decision 953, the item is processed via step 950 to flowchart FIG. 10(*b*) for "return to sender".

However, if at decision 936, an RFID reader is available, then the local variable, "chosen ZIP+4", is set to null at step 937 before commencing the processing of the new item to be routed. Next, the "affixed" RFID stamp(s) is(are) interrogated (i.e., a call is make to FIG. 8) to retrieve the selected tag ID at step 938. At decision 940, it is determined whether the selected RFID stamp is a special "B" stamp (a "ZIP+4 B" or "super B" stamp) that has the reply ZIP+4 encoded in its tag ID, for example as part of a special prefix making it distinct from regular "A" and "B" prefixes. If so, then at step 941 the chosen ZIP+4 is set from the "B" stamp tag ID; at step 942 the routing service class is set to "ZIP+4 B" reply mail, i.e., "super B"; and processing will continue at step 945. Note, it is an advantage of the present invention that database accesses are reduced for this class of "B" stamps. It is an optimization that, for this class of "B" stamps, the reply ZIP+4 routing code and the service class may be determined from the tag ID alone without requiring access to database 20.

Alternatively, a non "super B" stamp (non "ZIP+4 B" stamp) proceeds from decision 940 to step 939, where its record 22 is fetched by the selected tag ID. This applies to any selected "A" stamp or a standard singleton "B" stamp. Its chosen ZIP+4 is set as a local routine variable from its field 22-2 at step 943 and the service class is set from field 22-4 in step 944. Then at step 945, record 42 of the selected RFID stamp is updated with the current routing event.

At decision 946, if the chosen ZIP+4 local variable is still null, then at decision 951 it is determined whether the selected RFID stamp is cancelled. (This may happen if the customer did not enter a ZIP+4 for the selected "A" stamp and it has not yet been cancelled.) In this case the mailpiece is treated as if no RFID routing information were available and goes to decision 952 for possible further legacy routing. But, if the selected RFID stamp has been cancelled and has no routing ZIP+4, then the mailpiece is sent to hand processing at step 953. (One cause of this situation may be that mailpieces had been "stuck together" during the cancellation processing and were separated later.) Otherwise, if at decision 946, the mailpiece has a chosen ZIP+4 it proceeds to decision 947. Here, if no further routing is possible the item is returned to sender at step 950. But if at decision 947, the mailpiece can be routed, it is handled according to the customer's selected service class (such as, express or overnight options) associated with the RFID stamp tag ID at step 948 and routed by the chosen ZIP+4 at step 949. The routine then returns at step 998.

Recollecting the possibility that a customer may use multiple stamps "affixed" to the deposited mailpiece, or that a "B" reply envelope may be inside a mailpiece whose charges are being covered by an "A" stamp, the exemplary pre-cancellation routine of FIG. 9(*c*) is called at step 914 of FIG. 9(*a*) in order to calculate the cumulative values of the activated RFID stamps before cancellation. Other combinations of stamps and singleton stamps are considered in the FIG. 9(*c*) subprocess as well. This precancellation process concerns the assigned franked value of the RFID stamps only and does not consider class or physical characteristics of the mailpiece in its calculations. In general, after this routine is executed, all charges will be made via the selected RFID stamp's tag ID and future routing and processing will be governed by the selected stamp's database entries. Any non-selected stamp seen grouped with the selected stamp during the previous interrogation bears a "multi-A" marker from FIG. 8 in its record 22 pointing back to the selected stamp. The FIG. 9(*c*) routine records correlations among multiple RFID stamps across multiple databases and is therefore atomic.

The routine is entered at step 955 from FIG. 9(*a*) with the list of mailpiece RFID stamp tag IDs from the interrogation step 911. To sort through all the possible combinations of RFID stamps that could be present the process begins with decision 956 where it is determined whether the selected stamp is an "A" stamp. If there is no selected "A" stamp, then the selected stamp is a "B" stamp. Since multiple-B stamp usage is not allowed, this selected "B" stamp is the unique stamp to bear the postage and it is the only activated item on the list. So, at step 983, the selected "B" stamp's record 22 is fetched by its tag ID. Next, it is determined whether the selected "B" stamp has ever been seen with an "A" stamp at decision 984. If so, the process returns without making any calculations via step 989. But, if the selected "B" stamp has not been marked with the A+B marker, then its record 32 is fetched at step 985 and the customer account number of field 32-2 is used to fetch record 12 at step 986. Next, the system records an alert in field 12-6 that the "B" stamp is being used independently of an "A" stamp. This is so "B" stamp purchasers may keep track of the use of their "B" stamps. Then the process returns without performing any postage calculations through step 989.

Now the possibility that the selected stamp is an "A" stamp at decision 956 will be considered. In this case, a list of tag IDs of length greater than one time is possible and the selected tag ID may appear at any position on this list. Thus, at step 957, a loop control pointer is restored to the head of the RFID stamp list, and the local variable called the "default-value sum" is set to zero at step 958. Next, the loop begins at step 959 where the current RFID stamp tag ID is set from the pointer and the pointer is advanced on the list. Decision 960 follows, where it is asked if the current tag ID is the tag ID of the selected RFID stamp. If it is, the loop processing is skipped and the routine proceeds to decision 963 where it is determined if the pointer is beyond the end of the tag ID list. If not, the loop is accessed again through connector C. Otherwise, the loop terminates and the next part of the routine begins at decision 975 which will be explained later after other decision paths that converge on this processing point are presented.

The remaining path of decision 960 is taken if the current stamp is not the same as the selected one. In this case, its record 22 is fetched by the current RFID tag ID at step 961. If at decision 962, record 22 is missing, then the process ends the loop and goes to decision 963, from which the routine may either go on to decision 975 or reconnect for the next loop iteration via C. Otherwise, the result of decision 962 is that there is a record 22 and if, at decision 964, the stamp is a "B" stamp, then at step 965 the current "B" stamp's field 22-4 is updated with an A+B marker that includes the tag ID of the selected "A" stamp. The same information is stored in the current "B" stamp's record 42 at step 966. Processing of this "B" stamp has finished and the routine goes to decision 963 where the process continues as described above. Adding the A+B marker indicates that this is the first time a "B" stamp has been "seen" with a selected "A" stamp after entry. The selected "A" stamp has been marked "ENTRY" and will bear the postage while the "B" stamp will be protected from being cancelled as postal entity processing continues.

However, if the current RFID stamp is not a "B" stamp at decision 964, then since the current stamp is a non-selected "A" stamp, it is cancelled at step 967 by writing in its field 22-6 the time and location of cancellation. This is to prevent the reuse of non-selected "A" stamps and billing confusion. It can be deduced that this stamp was a member of a group since it is marked "cancelled" but has no entry recorded in its field 22-5. Next, at step 968, its record 42 is updated by the current tag ID with the remark "CANCELLED/Group". Also, it may be noted that any ZIP+4 stored in field 22-2 of such a non-selected RFID stamp will be ignored by the system during routing to prevent confusion.

Continuing at decision 969, if the current stamp is enabled, record 32 is fetched by its tag ID at step 972, and at step 973 its record 12 is fetched by using the customer account number of 32-2. Then, at step 974 the account is debited for misuse of an enabled stamp because more than one enabled stamp is present on the mailpiece, and the process moves to decision 963 as above. Otherwise, at decision 969, if the current stamp is not enabled its default value is added to the default value sum through the VALUATION routine call at step 971. After the computation, the process continues to decision 963 as above.

The VALUATION routine (entered at step 990) ensures that any deferred payment default-value stamp is now billed to the proper account and it adds the default value to the default-value sum. (Recall that the default-value sum variable was initially set to zero at step 958 in the outer routine.) So, if a customer mixes stamps from different accounts, each is properly accounted for. At step 991, it is determined if the default value is pre-paid by looking at field 22-4. If it is pre-paid, the routine skips to step 996 where the RFID stamp's default value from field 22-4 is added to the default-value sum and the routine returns to its calling point through step 997. But, if the default value is not pre-paid, then record 32 is fetched at step 992 using the current RFID stamp's tag ID. The account number in field 32-2 is used to fetch record 12 at step 993, and, in step 994, the account is billed for the RFID stamp's chosen default value. Next, at step 995, the remark "paid" is written in field 22-4. Finally, at step 996, the default-value sum is augmented by the current RFID stamp's value from field 22-4 and the process returns via step 997 as in the pre-paid case.

Five paths converge on decision 963, one for each type of stamp considered in the processing loop of FIG. 9(*c*). Once the loop control pointer is past the end of the list, the remaining section of this routine commences at decision 975 where it goes on to give credit for the default-value sum of non-selected RFID stamps or, in the case that no non-selected RFID stamp carries a default value, it passes on to the return step 989. In the latter case there is a selected "A" stamp, and the non-selected RFID stamps with no default value may be one or more of the following: any "B" stamps, enabled "A" stamps, and non-activated stamps.

However, if the default-value sum is non-zero at decision 975, then record 22 of the selected RFID "A" stamp is fetched at step 976 and it is determined if the selected RFID "A" stamp is enabled at decision 977. If the selected RFID "A" stamp is not enabled, then at step 978 the selected stamp's tag ID is passed to the VALUATION routine, where the selected stamp's default value is added to the default-value sum. Next, field 22-4 of the selected "A" stamp is updated with the "grand total" default-value sum at step 979. Then, the routine returns through step 989 for this case. Alternatively, if the selected "A" stamp was found to be enabled at decision 977, then its record 32 is fetched by its tag ID at step 980, subsequently the customer account number of field 32-2 is used to fetch the customer's account record 12 at step 981 and the account is given a partial credit of the default-value sum in its field 12-6 in step 982. The routine is then exited via the return at step 989. Partial credit is suggested in this exemplary case to discourage "affixing" mixtures of non-enabled and enabled RFID stamps. Such usage demands extra processing and wastes the stamp.

Figure 10A:
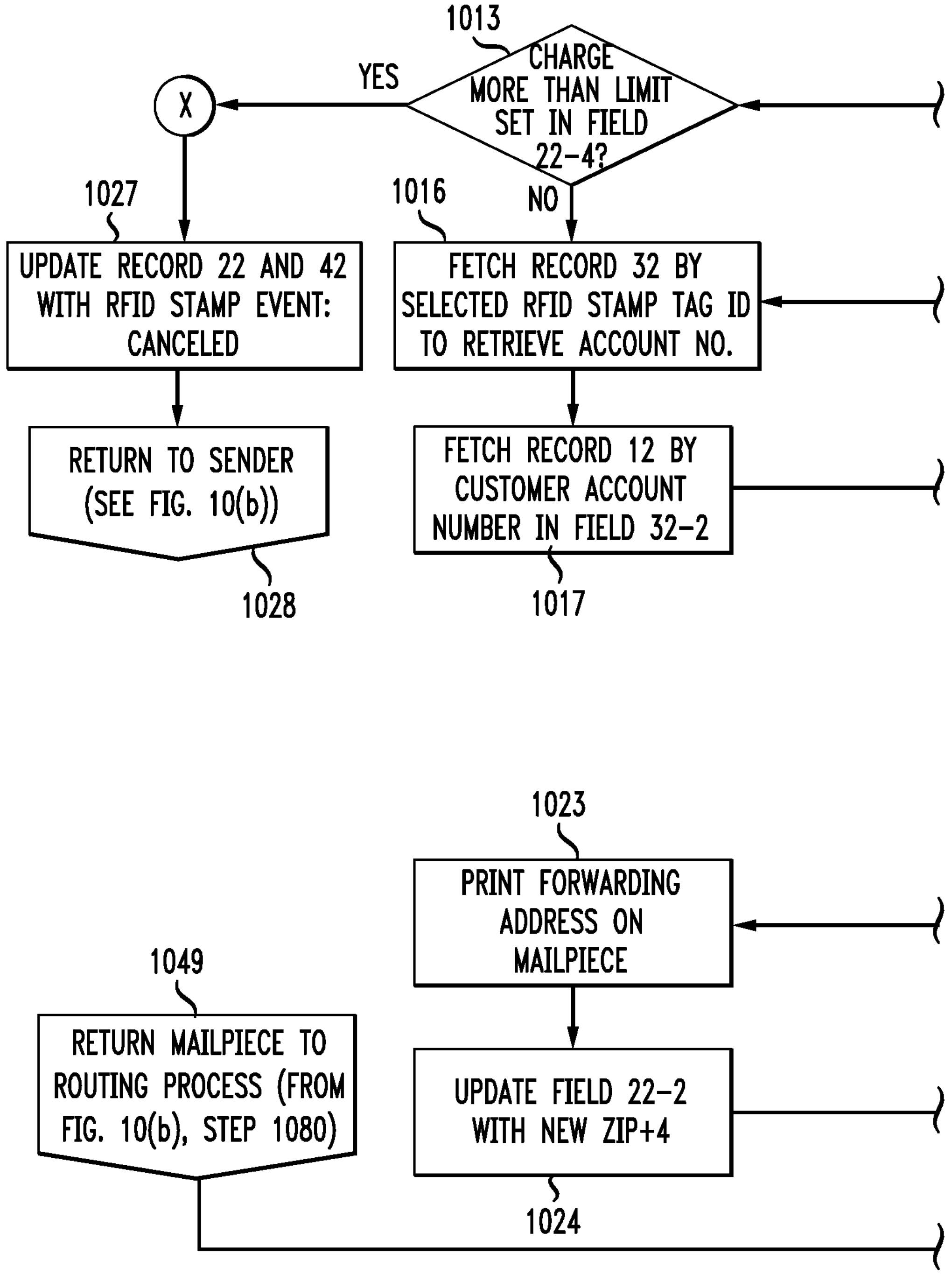
FIG. 10(*a*) contains a flowchart illustrating the final stages of exemplary postal entity RFID stamp processing, including cancellation and delivery.
Figure 10A:
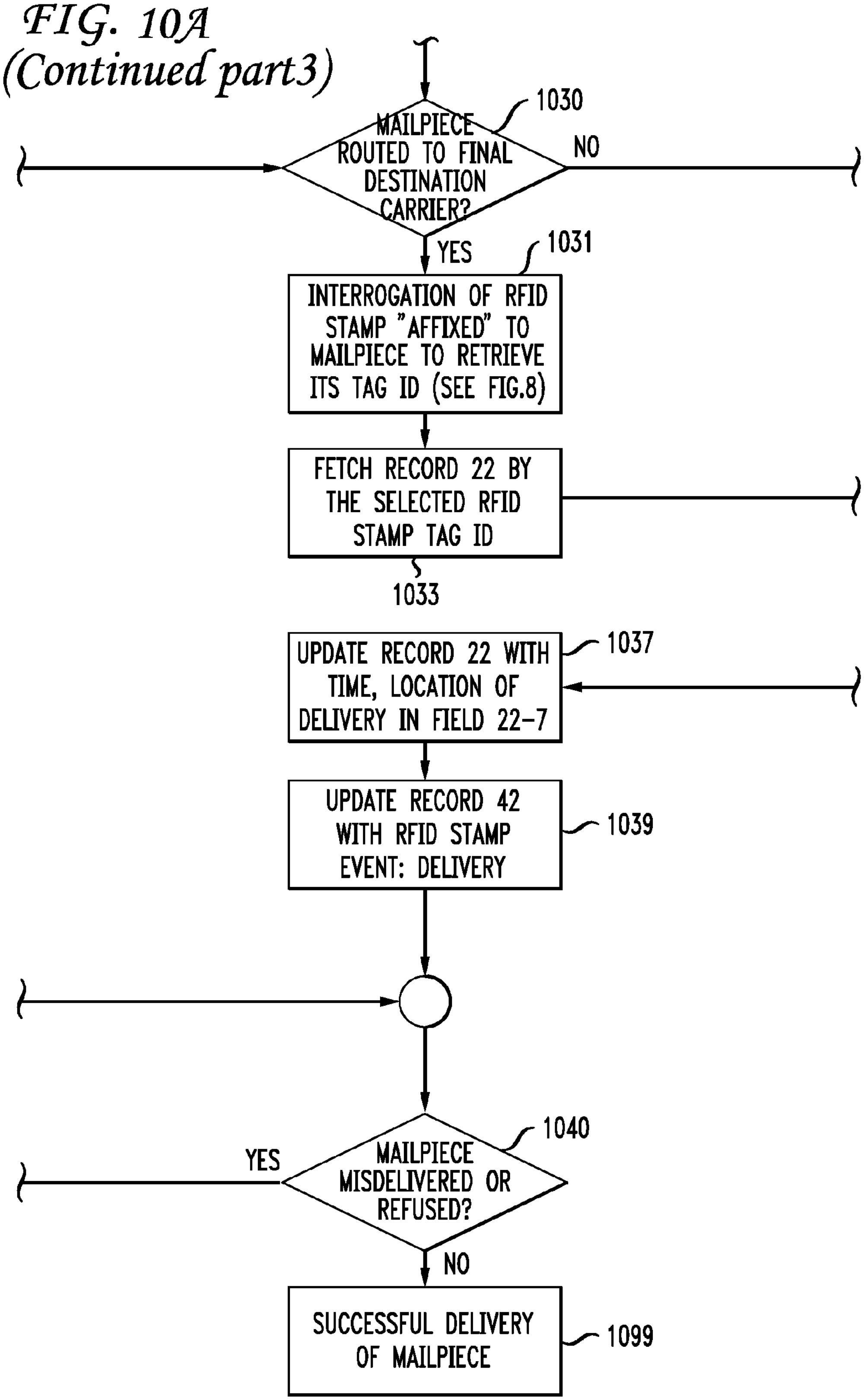
Figure 10B:
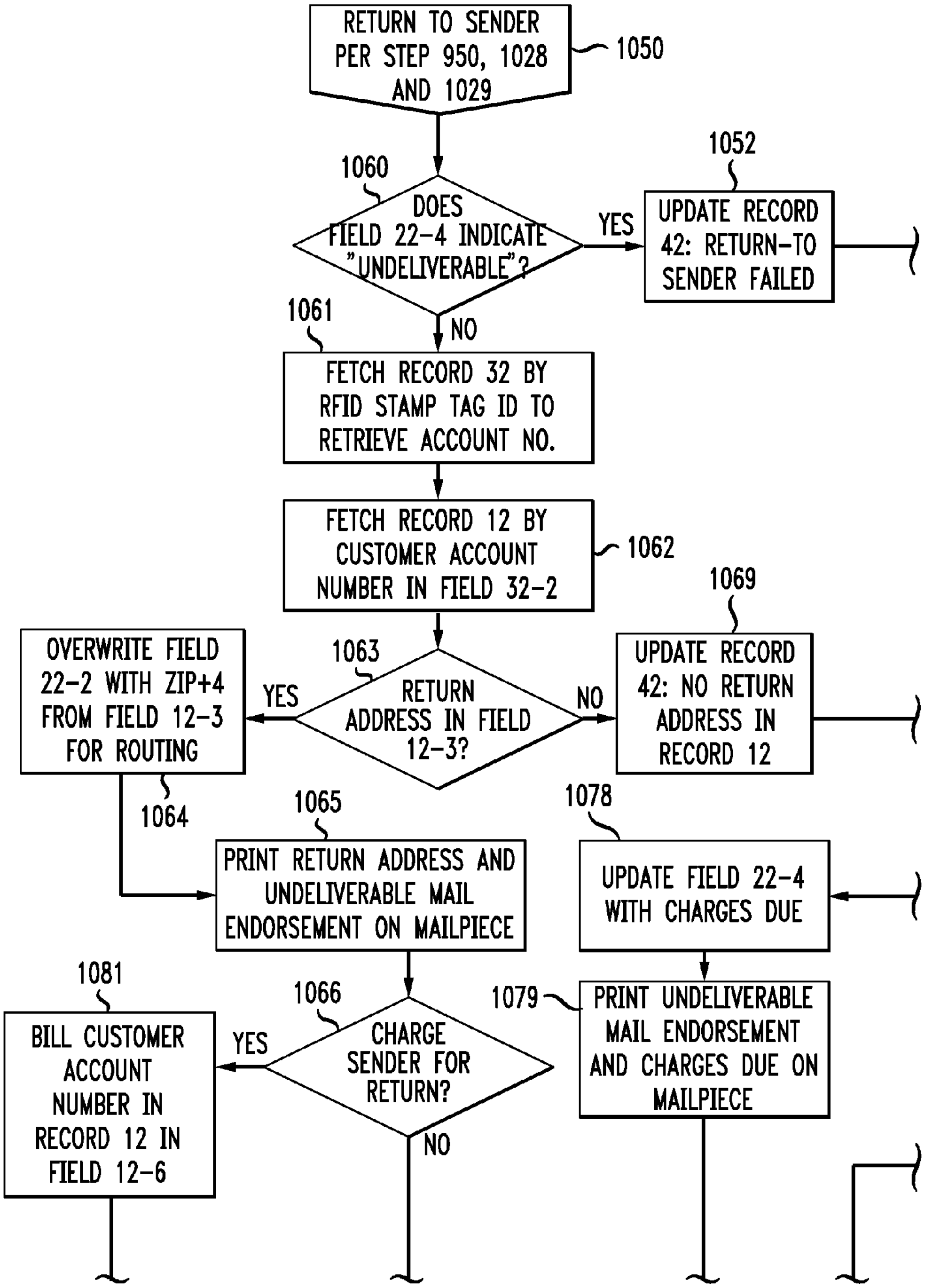

The final stages of exemplary postal entity RFID stamp processing, after exiting FIG. 9(*a*) at step 999, are charted on FIG. 10(*a*). This routine covers billing and cancellation of the selected RFID stamp; and, routing and delivery of the mailpiece bearing the selected RFID stamp, including misdelivery and return-to-sender scenarios. The flowchart of FIG. 10(*a*) begins at step 1010 where the physical characteristics of the mailpiece are measured by the postal entity, and these are used to determine charges to be applied according to the mailpiece's associated class and services chosen in the selected RFID stamp's field 22-4. The routine then proceeds to the decision 1011 where it is determined if the mailpiece's selected RFID stamp's field 22-2 indicates that it is enabled. If the selected RFID stamp is not enabled, it is necessary to know if the default value of the selected stamp, or the default-value sum of stamps, in the selected stamp's field 22-4 will cover the charges at decision 1012. If the value assigned to the selected RFID stamp is insufficient, the routine proceeds to step 1027 via connector X where the RFID stamp's records 22 and 42 are updated as CANCELLED. The routine then exits at step 1028 to the "Return to sender" routing of FIG. 10(*b*). Otherwise, it must be known if the selected RFID stamp has been pre-paid at decision 1014. If so, the flowchart moves to step 1019, where the cancellation time, location and charges are updated in the RFID stamp's record 22. But, if the selected RFID stamp has not yet been paid for, then the postage charge will be set according to the chosen default value of the selected RFID stamp at step 1015. (This step is necessary only if the selected RFID stamp is not among a group of "A" stamps per FIG. 9(*c*)).

Step 1016 is next and starts the final billing process for the customer's RFID stamp. It also has a conjunction with an alternate path from decision 1011. Therefore, the "yes" branch of decision 1011 will be considered now. Since the selected RFID stamp is enabled in this case, it should also be determined if the postage charges may exceed a limit set in the RFID stamp's field 22-4 at decision 1013. If so, the process proceeds to step 1027 where the RFID stamp's records 22 and 42 are updated as CANCELLED. This routine then exits through step 1028 to FIG. 10(*b*) to the "Return to sender" routine. Otherwise, the flowchart leads to step 1016 and the billing procedure begins by fetching record 32 of the selected RFID stamp in order to retrieve the customer account number. Step 1017 is where the customer account record 12 is fetched by field 32-2, and the account is billed in field 12-6 at step 1018. (In the case of "B" stamps without the A+B marker, the alert from FIG. 9(*c*) is also present in the customer's account record 12, field 12-6.) Then, the selected RFID stamp's record 22 is updated with the cancellation time, location and charges in its cancellation field 22-6 at step 1019.

Advantageously, in order to encourage end customers to use RFID stamps and to have registered postal accounts, the postal entity may charge on a more refined rate scale for each mailpiece, or even at a reduced rate predicated on actual weight rather than a broad first class default charge per item. Thus, even a non-enabled postal account activated stamp could generate a refund on its default first class value. This would be less expensive for the customer than legacy postage.

All selected RFID stamps that reach step 1019 continue for further routing by their associated ZIP+4. To do this, decision 1020 checks for ZIP+4 information in the RFID stamp's field 22-2. If it is not present (a possibility only for a selected "A" stamp), then the postal entity will enter into the selected RFID stamp's field 22-2 the ZIP+4 from the visible address on the mailpiece at step 1026. Then, the process goes to decision 1021, where the "yes" branch of decision 1020 also enters. Here as an exemplary feature, the system checks whether the destination ZIP+4 is on a forwarding list. If it is, then at decision 1022 it will be determined if the addressee of the mailpiece corresponds to the client requesting forwarding. If so, a forwarding address is printed on the mailpiece at step 1023 and a new ZIP+4 is assigned to the selected RFID stamp's field 22-2 in step 1024. (Advantageously, other special destination processing requests, such as mail hold, could be implemented at this stage as well.) Then, at step 1025, the path from step 1024 and the two "no" branch paths from decisions 1021 and 1022 meet, where the selected RFID stamp is marked with the event CANCELLED in its record 42. All steps leading to cancellation from 1010 to 1025 are atomic.

Recalling that the customer can enter the destination ZIP+4 as described above in association with FIG. 7(*a*), it is anticipated that large volume mailers will have means to associate their mailing lists with their RFID "A" stamp inventory in order to furnish destination ZIP+4 information in advance so that the postal entity personnel would not need to enter this information at the time of cancellation. This would improve routing efficiency for the postal entity. It could also provide a price reduction incentive for the use of this feature.

The following sequence of steps concern post-cancellation routing up to successful delivery. At decision 1030, it is determined whether or not the mailpiece has been routed to its final destination carrier. If not, further routing takes place through the "route mailpiece" routine of FIG. 9(*b*) at step 1032, and the process continues at decision 1030. Within FIG. 9(*b*), records of the mailpiece's journey are updated. Once routing to the final destination carrier has been achieved at decision 1030, the process goes on to the final "interrogation" routine call before delivery at step 1031 in order to fetch the selected RFID stamp tag ID. (This is one of the occasions optimizations of the FIG. 8 flowchart will be applied. The "interrogation" routine will return early at steps 850, 851 or 852, since the selected tag ID is marked with "ENTRY" and any accompanying RFID "A" stamps will carry a multi-A marker containing the selected RFID tag ID. Any singleton RFID stamp comes out at step 850.) Then, record 22 of the selected RFID stamp is fetched at step 1033. At decision 1034, a check of field 22-6 is made to determine that the selected RFID stamp has in fact been cancelled. If not, the problem mailpiece with an uncancelled RFID stamp is directed for postal inspection at step 1036. Otherwise, at decision 1035, the mailpiece's field 22-2 is obtained in order to check if the ZIP+4 corresponds to a ZIP+4 on the destination carrier route. If the ZIP+4 is not on the carrier's route then some mistake has occurred and the item is directed for further routing at step 1032. But, if the ZIP+4 does match one on the carrier's route, then, at step 1037, record 22 of the mailpiece's selected RFID stamp is updated with the time and location of the delivery in field 22-7; and, the same stamp's record 42 is updated with the RFID stamp event: DELIVERY in step 1039.

The recipient of the mailpiece determines at decision 1040 if the item is addressed to an individual or entity correlated with the address. If so, the item has been successfully delivered and the flowchart concludes at step 1099. But if, at decision 1040, the mailpiece was misdelivered, or the recipient refuses the item, or the carrier notices that there is no such address or some other problem, then the item will be redirected. It may be presented to the local carrier by the recipient at decision 1041 or returned by the recipient to a postal entity facility at step 1043. In the event that the local carrier re-encounters the mailpiece, at decision 1042, he/she may redeliver the item, correcting a mistake in delivery, or may return it to his/her local postal entity facility at step 1043. The action taken at decision 1042, may or may not be recorded in the selected RFID stamp's record 42 depending upon the presence of a local carrier operated RFID reader (e.g., handheld or on the carrier's delivery truck).

Once the misdelivered or refused item is back at the postal entity facility at step 1043, the item will be re-interrogated to retrieve the selected RFID stamp tag ID at step 1044. The postal entity will determine if redelivery of the mailpiece is possible at step 1045. If not, as in the case of the refused item or other situations such as addressee moved with no forwarding address, then at step 1029 the postal entity directs the mailpiece to the "return to sender" routine of FIG. 10(*b*). Otherwise, if redelivery is to be attempted, record 22 is fetched by the selected RFID stamp tag ID at step 1046, its field 22-4 is updated with the remark "misdelivered" in step 1047 and its record 42 is also updated with the stamp event MISDELIVERED at step 1048. These records of misdelivery and return-to-sender events can be used for internal postal entity efficiency checks. The mailpiece then re-enters routing processing at decision 1030. At this same juncture, any mailpiece from the "return to sender" routine of FIG. 10(*b*) may also re-enter the mailstream for routing via the entry step 1049. Recommencing routing through step 1049 avoids the possibility that the selected RFID stamp could face cancellation procedures a second time. The routine eventually concludes at 1099 unless the item is determined to be undeliverable in FIG. 10(*b*).

Several exemplary conditions involving delivery problems are addressed in FIG. 10(*b*). This, the final flowchart to be described, is entered by two different paths, steps 1050 and 1051. The circumstances to be remedied are not limited to the exemplary problems described. Regardless of the point of entry or paths taken, the routine is atomic. The first entry to be considered, at step 1051, is the "missing RFID stamp" scenario referred from step 928 of FIG. 9(*a*). A mailpiece arrives at this point in its processing if it has no RFID stamp signal at all or has an unrecognizable RFID stamp signal. The postal entity must inspect the mailpiece in order to assess the charges for their services. At decision 1053, it is determined whether or not an "affixed" stamp is a counterfeit RFID stamp. If so, it will go to hand processing at step 1055 for further inquiry. If not, there may not be any form of postage "affixed" to the mailpiece, or there may be a damaged RFID stamp present. First the item is inspected for a visible return address at decision 1070. If not legible, the mailpiece is sent for further postal entity hand processing at step 1055. But, if a return address is available, the postal entity "affixes" its own activated RFID stamp to the item at step 1071. This RFID stamp is then interrogated to retrieve the tag ID at step 1072, its associated record 22 is fetched at step 1073 and its "entry" field 22-5 is updated with the entry time and location of processing in step 1074. Also, at step 1075, the postal entity's "affixed" RFID stamp tag ID will have charges recorded in "cancellation" field 22-6 as well as the processing time and location. The item's record 42 is updated at step 1076 with the RFID stamp events: ENTRY and CANCELLATION. Then, at decision 1077, the postal entity decides whether it will charge the postage due for the return of the mailpiece.

If the original RFID stamp is deemed damaged, the return postage for the item to which the new postal-entity RFID stamp is "affixed" will be forgiven and the process goes to step 1080 where the postal entity will enter the ZIP+4 of the item's return address into the new RFID stamp's field 22-2. But, if there was no stamp whatsoever, the postal entity will attempt to collect the return postage due, determined according to the postal entity's billing protocols. At step 1078, the newly "affixed" RFID stamp's field 22-4 is updated with the charges due. An appropriate endorsement with the charges due are printed on the undeliverable mailpiece at step 1079, and the postal entity enters the return address ZIP+4 in field 22-2 for further routing at step 1080.

There is another path through which decision 1077 could be entered. It starts at the FIG. 10(*b*) "return to sender" entrance, step 1050. This is where an item may be returned to the sender through step 950 of FIG. 9(*b*) because it is undeliverable, through step 1028 of FIG. 10(*a*) because of insufficient postage, or through step 1029 of FIG. 10(*a*) because the item was misdelivered and delivery is not possible. As FIG. 10(*b*) is entered at step 1050, record 22 is known to be available for these cases and it has already been fetched. Decision 1060 determines if field 22-4 of the selected RFID stamp bears an "undeliverable" remark. If so, record 42 of the selected RFID stamp is updated at step 1052 to indicate that "return to sender failed" since the item has already been through once before. This protects against mail infinitely looping through the system. Then it is sent to step 1055 for hand processing of undeliverable mail. But, if there is no such marker at decision 1060, then record 32 is fetched by the selected RFID stamp tag ID to retrieve the customer account number in step 1061, and at step 1062 the customer's record 12 is fetched by the account number of field 32-2.

Next, it is determined in decision 1063 whether or not there is a return address in record 12's field 12-3. If not record 42 is updated with a remark "no return address in record 12" in step 1069. This happens when the anonymous purchaser uses a retailer-activated non-enabled stamp. Then, the item goes on to decision 1054 where it is determined whether or not a legible return address is seen. If not, the mailpiece is routed to the hand processing step 1055. If there is a return address visible, then the item passes on to decision 1077 where charges for return to sender are considered. From this point, the path converges with the "missing stamp" path discussed above. The branch taken from decision 1077 depends upon each mailpiece's special characteristics. An example of an item not being charged extra for return postage would be an ordinary first-class letter whose addressee has moved and not left a forwarding address. An example of a qualifying postage due item would be an undeliverable invoice mailed on a first class permit with address service requested. The two branches meet up at step 1080 for ZIP+4 return routing information as before.

There is another choice at decision 1063 that needs to be discussed. Thus is when there is a return address in customer account record 12. In this case, field 22-2 of the selected RFID stamp is overwritten with the ZIP+4 found in field 12-3 of record 12 at step 1064. Advantageously, the return address (based on information in field 12-3) can be printed on the mailpiece with an appropriate undeliverable mail endorsement in step 1065. Next, charges for the "return to sender" will be considered at decision 1066. The criteria are the same as at decision 1077, only at this point in the routine the postal entity may automatically bill the postal customer for the service at step 1081 and print the surcharge on the mailpiece at step 1082. Whether or not extra charges were billed from either path (step 1082 or step 1080), at step 1067, field 22-4 of the selected RFID stamp is updated with an "undeliverable mail" endorsement. Then, for all cases passing through step 1067, the selected RFID stamp's record 42 is updated in step 1068 and the mailpiece is returned via step 1090 to the routing process at step 1049 of FIG. 10(*a*). Step 1049 returns to FIG. 10(*a*) after the CANCELLATION event of step 1025, thus avoiding a problematic double cancellation.

Now that the detailed description of the complete set of system flowcharts has been presented, some features of the RFID stamps will be discussed. In particular, characteristics of A+B sets involving multiple features carried over multiple flowcharts can be easily summarized. Unlike RFID "A" stamps, RFID "B" stamps are typically owned by the addressee and not the sender. It is anticipated that the largest sales of A+B sets would be to mailers, such as utility companies requiring high volume reply mailings. Advantageously, these customers may defer postal entity billing for the "affixed" RFID "B" stamp until the time of its cancellation, preventing charges for unused RFID "B" stamps (FIG. 5(*b*), decision 591). Advantageously, the postal entity may bill such deferred-payment customers at the current rate.

As a convenience, the postal entity may provide means for a "B" stamp-reply-mail customer to simultaneously associate a reply address field number at the time of activation/purchase (FIG. 5(*b*), decision 581) with a plurality of "B" stamps (e.g., a flat of envelopes with "affixed" "B" stamps). This could be done using an RFID reader to produce a list of "B" stamp IDs at a business location which then sends the list via the postal entity web portal in order to assign the reply address to each "B" stamp tag ID. Or, the tags could be read in bulk at a postal entity facility from which the list would be passed into the RFID database system to associate the business' reply address with the "B" stamp tag IDs. Later, if need be, the customer could change the contents of her/his chosen reply address field in record 12, for example through a postal web interface or by some other means known in the art. Then, when a mailpiece with any one of the bulk-read "affixed" RFID "B" stamps is read at "entry", the updated reply destination ZIP+4 would be fetched using the updated contents of the chosen reply address field. It is then written in record 22, field 22-2 for routing (FIG. 9(*a*), step 919).

As a further enhanced service opportunity, the postal entity may offer to the high-volume-reply-mail client the use of RFID "B" stamps with specially formatted RFID tag IDs for optimized sorting of items bearing such stamps. These "super B" stamps would be manufactured as requested by the customer with the reply address ZIP+4 information encoded in the tag ID. Such an RFID tag ID may be identified by a special prefix that would advantageously permit the postal entity to avoid database dips at each routing step (FIG. 9(*b*), decision 940). It is a further advantage, especially for high-volume mailers, that "B"-stamp-reply-mail customers may use the database 20 records to inventory replies by looking for correlations between reply "B" mailpiece and the original "A" cover mailpiece. This data mining of the information of database 20 could be considered an extra service provided by the postal entity. Subject to service agreements, the postal entity could do its own marketing or other studies of high-volume reply mail through databases 20 and 40.

There are multiple safeguards implemented throughout the system to protect the "B" stamp owner from misuse of the "B" stamp. In the case of an "A" stamp, the sender (typically the owner of the "A" stamp) is allowed to choose services and ZIP+4, but the sender of a mailpiece with a "B" stamp does not have these capabilities (see FIG. 7(*a*), decision 713). The destination of a "B" stamp is determined by the contents of the stamp owner's record 12. Mailpieces with an "affixed" "B" stamp will be automatically routed by the inventive system using the ZIP+4 of the chosen reply address derived from record 12 (FIG. 9(*a*), decision 907). So, if an individual tries to send an item to a destination other than the owner's intended reply address, the item will be routed to the correct owner-specified reply ZIP+4 anyway. Misuse could then be noticed by the local destination mail carrier through an address inconsistency (FIG. 10(*a*), decision 1035) and the item would go to "render to sender" processing, which in this case would lead to the "B" stamp owner. The misuse could then be reported by the "B" stamp owner to the postal entity. In the case of high volume mailers, they will likely have their own ZIP+4, making accurate delivery automatic.

Other safeguards include: if an individual tries to apply multiple "B" stamps to cover postage on a mailpiece beyond what the original owner requested, an error condition "multi-B error" will be recorded in database 40 for each stamp (FIG. 9(*a*), step 930), and the item will be flagged and inspected by the postal entity (FIG. 10(*b*), decision 1053); and, lastly, the use of "B" stamps that were never sent through the postal entity inside an "A" mailpiece is indicated on the "B" reply mail customer's itemized bill (FIG. 9(*c*), decision 984). This feature could be used to detect internal employee abuse of "B" reply mail postage for personal use. All of these possible misuses of "B" stamps could be tracked through database 40 in the event of an investigation.

The inventive process allows both "A" and "B" stamp owners the capability to change their record 12 information associated with their RFID stamps. Customers can change this information (e.g., return address, billing address, reply address, payment method) at any time, although the effect on the lifecycles of the RFID "A" and "B" stamps is somewhat different. So, for example, if an item with an "affixed" "A" stamp was to be found undeliverable and the customer had changed his/her return address in database 10 after the item had been deposited with the postal entity, the lookup of record 12 in the "return to sender" routine of FIG. 10(*b*) at step 1062 would direct the return to the updated address. Thus, advantageously, the item is automatically "forwarded" to the updated location without looking into the postal entity's legacy forwarding lists.

Thus, conventional forwarding of any postal entity customer's deliverable mail, and other special requests such as "holding" the recipient's mail may be advantageously improved using the ZIP+4 associated with an RFID stamp at the postal sort facility before being routed to the local postal entity office or local carrier by checking the ZIP+4 of field 22-2 of record 22 against its legacy request list (see FIG. 10(*a*), step 1022).

By way of contrast, in the case of a "B" stamp, an update of its reply address must precede the "B" stamp being marked "entered" into the postal entity system. The system prevents non-owners from changing the "B" stamp reply destination by requiring the "B" stamp owner's account number and authorization (things a non-owner is unlikely to know). This is the same protection against unauthorized account information changes provided to all RFID stamp holders, but extended to protect the reply address of the "B" stamp. Also recall, as a safeguard to the owner of any RFID stamp ("A" or "B"), enablement status of an RFID stamp (in field 22-3) cannot be changed after the RFID stamp has been marked "entered" (FIG. 9(*a*), step 908), although the return address, reply address, etc. can still be altered.

However, as recorded in FIG. 2(*b*), it is possible for John Doe to disable his enabled RFID "A" stamp 100-4, in order to give Jane Smith a default-value RFID stamp. This prevented RFID stamp 100-4 from essentially being a blank check. The procedure is not on the system flowcharts, but may be accomplished through the postal entity's web portal, or a customer-facing kiosk, upon presentation of proper credentials. Such a change of status may be indicated on record 42 as event type "disabled" and simultaneously the enablement field 22-3 in record 22 is cleared.

In the event an end-customer has lost or thought her/his RFID stamps had been stolen, it would be possible for the postal entity to offer a service that would de-activate such stamps. These RFID stamps would have their records 22 and 32 destroyed, resulting in the RFID stamps having no face value (no longer "franked"). Replacement stamps (with different tag IDs) could be provided. In the event that someone tries to later use a "lost" or "stolen" stamp, it would not be accepted by the cancellation or routing procedures, and could be returned to the sender (not necessarily the previous owner) if a legible return address was present on the mailpiece, and return postage would be charged. Otherwise, the mailpiece would become a "dead letter".

There are other advantages that the postal entity may offer to the enrolled RFID stamp customer. Special ancillary services may be associated with specific routing or processing events by the postal entity. For example, the final delivery RFID read of a mailpiece may trigger activation or enablement of RFID stamps enclosed therein (e.g., activating a boxed order of wedding invitations, or if someone wished to send "A" stamps). This would not require any additional labor on the part of the postal entity. And for customers who receive large volumes of mail, the postal entity may offer to further collate the recipient's mail into categories such as bundles of reply mail (i.e., "B" stamp), bundles of first-class non-reply mail (i.e., first-class "A" stamp), bulk-rate, etc. In the case of very large volumes of mail, it may even be sorted into origination regions by the ZIP+4 of the entry location of the "affixed" RFID stamp (see FIG. 2(*a*), field 22-5). The business may use this for market planning and analysis.

Ultimately, in all cases, all mailpieces may be routed automatically by the "affixed" RFID stamp associated information if the full destination address (not just the postal routing code) is entered into the RFID stamp's record 22 in mailpiece history database 20 before deposit. Then, no postal entity employee would need to read the destination address until it reached the destination carrier delivery route.

The postal entity may impose restrictions on database access to ensure customer privacy, security of customer financial information and confidentiality of internal postal operations. It is anticipated that the postal entity, authorized distributors, authorized retailers and RFID stamp manufacturers will share databases for manufacturing and inventory management. These databases may be partitioned to allow the various administrative entities to keep their proprietary information secure. RFID tag information may be shared between these databases and RFID stamp event database 40 (see FIGS. 1 and 2(*a*)).

Registration events may be restricted to the postal entity and may be stored exclusively in database 40. In an exemplary embodiment, a subset of the events in database 40 flow into database 20 in a one-way fashion. In this embodiment, mailpiece-handling machinery may access database 20 for routing and sorting. During postal entity processing and routing, the integrity of customer information is further protected since the postal entity RFID readers only send the RFID stamp tag ID into the postal entity information "cloud". Eavesdropping on the signal from a postal entity RFID reader, whether on a postal entity truck, a hand-carried device, at any routing station, etc., will not reveal any information from the postal entity databases. Since the RFID stamps are read-only tags, there is never any occasion for information to flow back to the RFID interrogator.

In particular, once the mailpiece with "affixed" RFID stamp(s) is deposited at a postal entity facility, no hackers can access the sensitive record 12 information through eavesdropping because tag ID information is passed one-way into the cloud. Authorized personnel responsible for resolving mail sorting and delivery problems (e.g., someone who reroutes misdelivered mail) may need access to mailpiece history database 20, but no other databases. Supervisory personnel may trace events recorded in database 20 back to the more detailed event stream in database 40, or vice versa, for service monitoring or resolution of anomalies (e.g., non-activated RFID stamps or misused "B" stamps).

Customers may be given limited access to database 20, through a customer-service kiosk or via the postal entity's web portal, to enter ZIP+4 information for their mailpieces or to trace mailpieces when authorized. Certain information in database 20, such as charges or postal truck numbers, may be redacted from the general public. As described above, database 20 contains no customer account information, not even the customer's postal account number. Also, for example, end customers might be allowed access to database 20 through a restricted mechanism to monitor the usage of RFID stamps that have been activated or enabled on their accounts.

Access to customer account database 10 and PAC database 50 may be restricted to authorized postal entity customer account service personnel and customers themselves who may have access to their own accounts, again through a customer-service kiosk or via the postal entity's web portal. The system itself requires access to database 10 to activate and enable RFID stamps. When authorized by a customer, the postal entity and its authorized retailers may access database 10 and post charges to third-party billing databases 60 to complete credit or debit card transactions and the like. An exemplary purchase event, regardless of seller or payment method, is recorded in database 40.

When an RFID stamp is to be cancelled, the system looks up its ID in database 30 to find the associated account to bill in database 10; cancellation is recorded in databases 20 and 40. Conversely, given an account number in database 10, the system may (subject to privilege and policy restrictions) locate instances of the account in database 30 and follow the associated tag IDs into databases 20 and 40. For example, this mechanism may be necessary for the postal entity to generate for a retailer an itemized billing for his/her sale of individual RFID stamps, whether pre-paid at time of activation, or if the billing is deferred until the customer enters the stamp into the postal entity system.

The postal entity may generate a periodic itemized bill for its end customers based on the contents of database 10. In the case of an account with third-party billing, such a postal entity bill may be optional. Subscribed cash-account customers may also receive alerts for a low account balance condition. The postal entity may wish to contract out some of its billing to businesses well-versed in micro-payments. Billable events triggered by a PAC transaction may include the PAC ID (see database 50 in FIG. 1) in the itemization. In a preferred embodiment, multiple PACs with distinct IDs may be associated with a single postal account with itemized billing sorted by the distinct PAC ID. This would be useful to businesses in order to monitor the postage expenses of separate departments, for example.

In a preferred embodiment, postal entity authorized retailer accounts have certain distinguishing features. These accounts are for postal entity RFID stamp supply chain billing. The retailer class of account is associated with RFID stamps sold "anonymously" for their default value (e.g., first-class postage). This is the case when the authorized retailer activates the stamp before sale to the end customer (see FIG. 5(*a*)). Such accounts have no return address or ZIP+4 associated with the RFID stamps through record 12. Only a billing address is associated with the RFID tag ID indirectly through its record 32. This is to protect the seller from automatically receiving "return to sender" mail. Advantageously for the postal entity, use of enabled RFID stamps will all but eliminate non-delivery, and subsequent returns, due to insufficient postage. In general, the use of any RFID stamps that are activated on a postal-entity-registered end-customer account will all but eliminate dead letters since the return address is available through record 12.

The postal entity inventory of all RFID stamp sales to retailers is kept in database 40. It can be used for monitoring sales channels. Should tracking of "anonymous" mail be necessary for some reason (e.g., malicious mail), the end customer purchase time and location could be traced through the retailer account. Law enforcement may, with a court order, gain access to the relevant records in database 40. Furthermore, if a credit card was used to purchase the RFID stamp(s) of interest, the retailer's credit card transaction records could be obtained as well. If multiple status changes to an RFID stamp have been made using different accounts and locations (e.g., anonymous third-party purchase followed by enablement via PAC and, at a later date and from a different location, selection of enhanced postal entity services), all of these events would be traceable through a single record 42 in database 40 even though multiple records 12 would be involved.

A special case to consider is tracking a mailpiece to which an anonymously purchased RFID stamp was "affixed". In an exemplary embodiment, the postal entity may allow a customer to track such a mailpiece if she/he provides the tag ID and the destination ZIP+4. Advantageously, such tracking searches of "anonymous" stamps by anonymous customers, as well as special services paid for with multiple "anonymous" stamps, would be recorded in database 40. In fact, tracking requests of any RFID stamp on any type of account via any means could be recorded in database 40 and would be available for postal entity data mining.

Likewise, any addressee, by means of his/her own ZIP+4, may track a mailpiece if the addressor has provided her/him the corresponding RFID stamp's tag ID. Advantageously, this restricts the retailer from researching the RFID stamp usage of her/his customers.

RFID stamp event database 40 is highly sensitive from the standpoint of the postal entity. Events are written to database 40 from a variety of sources, but unlimited read access to database 40 may be restricted to administrative personnel and postal inspectors.

The system of the present invention offers strong resistance to counterfeiting. RFID stamp tag IDs may be chosen from a sparse subset of the full tag ID space, making valid RFID stamp tag IDs difficult to guess. Furthermore, duplicate tag IDs would quickly be detected by the system. The first opportunity to detect this would be at activation (FIG. 5(*b*), decisions 577 and 578), where registration and absence of prior activation are verified. The next chance to detect a non-conforming RFID stamp is at enablement (FIG. 6(*b*), decisions 680 and 682) where activation and absence of prior enablement are verified. The third check is made at entry (FIG. 9(*a*), decision 905) where activation is verified. The fourth check is made at the time of cancellation (FIG. 9(*a*), decision 913) where absence of prior cancellation is verified. Other checks are made whenever most RFID stamps (non-"super B" stamps) are read and used for routing (FIG. 9(*b*)) where the missing record 22 (i.e., lack of activation) will send the mailpiece into legacy routing to be dealt with. These checks can also point towards other problems besides counterfeiting, such as theft or insider attacks.

The inventive RFID postal system facilitates fault detection (such as lost mail and slow service) by postal entity administrative personnel, through databases 20 and 40, without additional labor. Ideally, a mailpiece would be deposited in an RFID-equipped collection box. Later, the RFID-equipped collection box would be emptied and the contents loaded onto an RFID-equipped postal entity truck. The collected mailpiece's passage in and out of postal entity facilities would be captured by RFID interrogators at each time and location of the postal entity RFID readers. Finally, when the mailpiece is delivered by an RFID-equipped mail carrier, the delivery event is also captured. Simultaneously, the last RFID read of the bundles about to be delivered by the local destination carrier could be used to alert the carrier to any misdirected mailpieces in the ZIP+4 bundles, thus improving delivery reliability (FIG. 10(*a*), decision 1035). Consequently, because of the ease of reading ZIP+4 on a mailpiece throughout routing and sorting, misdirected mail is less likely to be encountered. In the case of reported lost mail, the event trail outlined above will immediately localize the problem. Likewise, the postal entity itself may perform traffic analysis on the progress of individual mailpieces or groups of mailpieces in order to monitor the quality of delivery service between selected routing points or regions. Anomalies in RFID-stamped mailpiece progress could be detected. For example, postal employees who misdirect the mail for personal use or are not meeting delivery obligations could easily be found. Or, in the event that a client falsely claims mail is being systematically lost by the postal entity, record 42 could be data mined to disprove such claims, as the progress of every RFID-stamped item would be on record.

The present invention enables systemic improvements to postal entity operations through traffic analysis and service monitoring studies through data mining of database 40. Possible areas for such studies could include optimization of routing, potential labor-saving sorting and handling procedures. Since the locations of all RFID stamps in the system are known at all times, automatic inventory management and shrinkage control are easily implemented. Reliability tests checking for loss of mail can be made end-to-end to ensure that every ENTRY event has a corresponding DELIVERY event. Another opportunity for labor reduction may be through a diminished need for customer facing counter services, afforded by enabled RFID stamps. There would also be clear improvements in timely response to tracking, tracing and forensic needs. Advantageously, especially for forensics, the RFID tag itself is virtually non-destructible. The RFID postal entity database system would be an aid to postal inspectors' tasks. Detective work would be largely redirected to data mining.

Summarizing, general features defining the RFID stamp of the present invention can be characterized by the following: (1) passive RFID tags may be used in a variety of different applications as a substitute for traditional, fixed-rate postage; (2) passive RFID tags may be utilized as postage "stamps" with the amount of postage automatically billed to a customer account associated with the RFID tag, eliminating the need for the customer to know the proper postage beforehand; (3) the customer may request that "enhanced services" (such as insurance, certified, etc.) be billed through the RFID tag; (4) the RFID tag may take the form of a postage stamp, or an equivalent instrument authorizing a delivery service. The system of the present invention utilizes so-called "passive" RFID tags; that is, tags that require no internal power supply—the tag is energized by an RFID reader. Preferably, read-only RFID tags would be used in the present invention, since read-only tags are less expensive than writeable tags, and writeable tags would also require a security infrastructure to prevent unauthorized data alteration; (5) only "one way" information is sent—the tag ID from the RFID stamp to an RFID reader. Hence, eavesdropping cannot reveal anything useful, and personal information is protected. No sensitive information is derivable from the RFID stamp tag ID itself. Thus, the tag ID may be freely transmitted in the clear during mail handling operations. Furthermore, since the tags are read-only they cannot be altered by a malicious party; (6) The tag ID of an enabled RFID stamp is used by the postal facility to query the mailpiece history database and retrieve a matching record; the weight and postage will be entered into a field. The postal facility will again use the tag ID to interrogate the RFID stamp account database to retrieve the proper customer account number. The postal facility will then access the customer account database, using the customer account number, and bill the appropriate customer record for the calculated postage; (7) the RFID stamp does not need to be literally affixed to the outside of the mailpiece. Indeed, the RFID stamp may simply be disposed somewhere inside the letter/package; (8) Specially-formatted RFID stamps may aid in handling of special cases of mail, having a special code within their tag ID; and (9) RFID stamps may be included on commonly-purchased envelopes or packaging, in their initial "non-enabled" state and bearing a default (e.g., first-class) postage value.

Further summarizing, exemplary service applications/features associated with the use of the inventive RFID postage stamps can be enumerated as follows: (1) the postal entity may elect to give a discount to customers having postal accounts, such as discounts to customers to enter the ZIP+4 information for their RFID stamped mailpieces; (2) the postal entity may automatically bill postage for services on a finer scale that now achievable (using micro-charges); (3) the postal entity may also offer postal account customers a finer-grained rate schedule than currently feasible. This could discourage consumers from sending the maximum weight of material per mailpiece at the selected flat rate postage. Implementing this option would not necessarily reduce volume for the postal entity, but could reduce the gross weight carried—leading to energy savings; (4) special ancillary services may be associated with specific routing or processing events. For example, the final delivery RFID read of a mailpiece may trigger activation or enablement of other RFID stamps enclosed within a mailpiece; (5) the postal entity may provide means, such as a web portal, for customers to access their RFID stamp account information; (6) the postal entity may provide means, such as a web portal, for customers to facilitate customer-initiated transactions associated with their RFID stamps; (7) the postal entity may provide RFID readers at customer-facing postal entity facilities such as kiosks, mail receptacles and the like in order to facilitate customer-initiated transactions, these facilities may also include means for the customers to perform data entry (such as to associate ZIP+4 with a tag ID); (8) mail collection boxes could be equipped with RFID readers to allow for mailpieces containing non-enabled and/or enabled RFID stamps to be recorded as having entered the postal system by direct deposit into a collection box; (9) a postal entity RFID-reader-equipped facility could simultaneously read RFID stamp tag IDs as well as the customer's RFID-based PAC card, thus advantageously expediting the association of the account with the stamp transaction for the customer; (10) in situations where a customer has a PAC, the card may be read by the collection box to retrieve the customer account number and allow the RFID stamp to be enabled by linking the tag ID with the retrieved customer account number; (11) the postal entity may equip a plurality of locations with RFID readers along its routing and processing paths in order to record the progress of mailpieces to which RFID stamps are affixed; (12) the postal entity could automatically micro-sort mail addressed to large-volume recipients, distinguishing reply ("B" stamped) mail, ordinary ("A" stamps) mail and undeliverable returns, for example; and (13) the postal entity may offer data mining services of databases derived from RFID stamp usage.

Various novel features of the databases utilized in implementing RFID stamp processing may be summarized as including, but not limited to, one or more of the following: (1) a customer account database, which forms an integral part of the inventive system. The unique identification information embedded within each tag is linked in a one-to-one relationship with a customer account through a collection of centralized RFID stamp databases, maintaining a record of each of the postal entity's RFID stamps; (2) an RFID stamp mailpiece history database is used to record certain status changes in association with all RFID stamp tag IDs, as well as the progress of RFID stamps as they pass through the postal system; (3) the postal entity may store a routing code in the mailpiece history database, associated with the tag ID, that may supplement (or supplant) the use of routing codes or barcodes that must be printed on the mailpiece; (4) processing time within the postal system may be shortened by bulk reads of mailpieces, rather than the single piece barcode reads and single piece printing of barcodes; (5) the postal entity may itself enter the ZIP+4 of a mailpiece from a visible destination address into a field of the record in the mailpiece history database; (6) during mailpiece handling, routing information comes from a database lookup, not from something printed or stored in the tag ID; (7) the postal routing code associated with an RFID "A" stamp, once entered into the mailpiece history database by an end customer, may only be changed by the owner of the account of that stamp; (8) fields in the mailpiece history database record of an RFID stamp tag ID show service requests made by the customer, routing information, certain status events, and the time and location of the occurrence of each of these events; (9) the unique association between an RFID stamp tag ID and a customer account number is recorded in an RFID stamp account database. A separate class of customer account databases contains the customer-sensitive billing information and is not retrievable by postal employees, there are no fields in common between the customer account database and the mailpiece history database; (10) as a mailpiece passes through the postal system, all details of its progress and handling are recorded in the RFID stamp event database, which is a "write-once" database where events may be added but no data is ever replace; (10) all of the information recorded about an RFID stamp in all postal entity databases is simultaneously recorded atomically, in the RFID stamp event database; and (11) all purchases of RFID stamps can be recorded in the postal entity RFID stamp databases, even in the event of an "anonymous" purchase by the end customer, i.e., non-postal entity account or physical cash transaction; (13) in fact, full life-cycle traceability of any, including anonymously purchased, RFID stamp is an integral feature of the inventive system; and (14) the virtually "non-destructible" nature of the RFID tag is a valuable characteristic for notification by the postal entity to customers of an accidentally-destroyed mailpiece and for forensic applications.

Various other features and improvements of the RFID postage system of the present invention can be summarized as follows. Firstly, an RFID stamp is characterized by a set of "events" that define its status throughout the process, where these status events include: MANUFACTURE, REGISTRATION, ACTIVATION, PURCHASE, ENABLEMENT, ENTRY, CANCELLATION and DELIVERY, as discussed in detail hereinabove. Additionally, the use of RFID stamps allows for the postal entity to track the progress of various mailpieces through the system from dispatch to delivery. Tracking information is automatically recorded to the RFID stamp event database. Indeed, inventory management, process monitoring, personnel monitoring, customer services, forensic tracking, and the like, may all be integrated through the postal entity databases for RFID stamp tracking and subsequent data mining.

Indeed, while the present invention has been described in detail with reference to certain preferred embodiments, variations and modifications exist within the spirit and scope of the invention as described and defined in the claims appended hereto. Indeed, the sequence of the various flowcharts outlines an exemplary system architecture. The order of processes and calls of routines implement interactions among the RFID stamp tag, postal-entity cloud databases, the physical/mechanical routing system and the customer transactions within the postal-entity cloud. Other database arrangements, as well as other processing steps, may be used to implement the RFID stamp-based system of the present invention.

What is claimed is:

1. A radio frequency identification-based postage system comprising:

a customer account database comprising a plurality of customer account records, each record including an account identifier, a return address and billing information;

a mailpiece history database including a listing of stamp tag identifiers, where each stamp tag identifier is associated with mailpiece destination information and status information, wherein each stamp tag identifier is also embedded in a passive radio frequency identification tag in a radio frequency identification stamp; and a radio frequency identification stamp account database for linking the stamp tag identifiers with the plurality of customer account records in the customer account database, wherein the customer account database and the mailpiece history database are separate databases, wherein the mailpiece history database is accessible via a stamp tag identifier during a delivery of a mailpiece associated with the stamp tag identifier, and wherein a customer account record associated with the stamp tag identifier is not accessible via the stamp tag identifier for the delivery of the mailpiece.

2. The radio frequency identification-based postage system as defined in claim 1 wherein the mailpiece destination information comprises a destination routing code.

3. The radio frequency identification-based postage system as defined in claim 2, wherein the system is configured to replace a destination routing code with information obtained from the return address stored in the customer account database for returning the mailpiece.

4. The radio frequency identification-based postage system as defined in claim 1 wherein the mailpiece destination information comprises a destination address and a destination routing code.

5. The radio frequency identification-based postage system as defined in claim 4 wherein the system is configured to replace the destination address and the destination routing code with information obtained from the return address stored in the customer account database for returning the mailpiece.

6. The radio frequency identification-based postage system as defined in claim 1 wherein the radio frequency identification stamp account database comprises a paired listing of the stamp tag identifiers and the account identifiers of the customers, wherein each of the stamp tag identifier is useable to access a corresponding record in the mailpiece history database and wherein each of the account identifiers of the customers is useable to access a respective customer account record from the customer account database.

7. The radio frequency identification-based postage system as defined in claim 1 wherein the billing information is obtained from a third-party account.

8. The radio frequency identification-based postage system as defined in claim 7 further comprising a third-party billing database for providing the third-party account.

9. The radio frequency identification-based postage system as defined in claim 1 wherein the status information in the mailpiece history database comprises at least one of:

manufacture information, registration information, activation information, purchase information, enablement information, class of service and ancillary service information, entry information, cancellation information, or delivery information.

10. The radio frequency identification-based postage system as defined in claim 1 further comprising:

customer carried elements, wherein the account identifiers are embedded on the customer-carried elements.

11. The radio frequency identification-based postage system as defined in claim 10 further comprising a customer-facing venue configured to accept a presentation of a customer-carried element and to apprise the system of a customer account record associated with the customer-carried element to be used in activating a radio frequency identification stamp.

12. The radio frequency identification-based postage system as defined in claim 1 further comprising a radio frequency identification stamp event database for storing each stamp tag identifier and a plurality of locations where each stamp tag identifier is retrieved and interrogated.

13. A method of activating a radio frequency identification stamp, the method comprising:

creating a customer account record for a customer in a customer account database, wherein the customer account record includes a customer account identifier and billing information;

interrogating the radio frequency identification stamp and retrieving a tag identifier, wherein the radio frequency identification stamp includes a passive radio frequency identification tag embedded therein having the tag identifier;

creating a record for the radio frequency identification stamp in a mailpiece history database;

storing a monetary value of the radio frequency identification stamp in the record for the radio frequency identification stamp in the mailpiece history database; and recording the tag identifier and the customer account identifier in a radio frequency identification stamp database to associate the customer with the radio frequency identification stamp, wherein the customer account database and the mailpiece history database are separate databases, wherein the record for the radio frequency identification stamp in the mailpiece history database is accessible via the tag identifier during a delivery of a mailpiece associated with the tag identifier, and wherein the customer account record is not accessible via the tag identifier for the delivery of the mailpiece.

14. The method as defined in claim 13, further comprising:

facilitating billing the customer account record for the monetary value of the radio frequency identification stamp.

15. A method of enabling a radio frequency identification stamp, the method comprising:

interrogating the radio frequency identification stamp and retrieving a tag identifier, wherein the radio frequency identification stamp includes a passive radio frequency identification tag embedded therein having the tag identifier;

marking the radio frequency identification stamp as enabled in a mailpiece history database;

recording the tag identifier and an associated customer account identifier in a radio frequency identification stamp database; and crediting a customer account record in a customer account database with a prepaid value of the radio frequency identification stamp, the customer account record including the customer account identifier and billing information, wherein the customer account database and the mailpiece history database are separate databases, wherein the mailpiece history database is accessible via the tag identifier during a delivery of a mailpiece associated with the tag identifier, and wherein the customer account record is not accessible via the tag identifier for the delivery of the mailpiece.

16. The method as defined in claim 15 wherein the crediting the customer account record is performed by looking up an existing customer account record in the customer account database.

17. The method of claim 13, wherein the interrogating is performed by a radio frequency identification tag reader.

18. The method of claim 13, wherein the delivery of the mailpiece associated with the tag identifier comprises a mailpiece handling machine accessing the mailpiece history database.

19. The method of claim 15, wherein the interrogating is performed by a radio frequency identification tag reader.

20. The method of claim 15, wherein the delivery of the mailpiece associated with the tag identifier comprises a mailpiece handling machine accessing the mailpiece history database.

* * * * *